United States Patent
Arledge et al.

(10) Patent No.: US 7,792,256 B1
(45) Date of Patent: Sep. 7, 2010

(54) SYSTEM AND METHOD FOR REMOTELY MONITORING, CONTROLLING, AND MANAGING DEVICES AT ONE OR MORE PREMISES

(76) Inventors: Charles E. Arledge, 1802 Mystic St., Rockwall, TX (US) 75032; Avinash C. Saxena, 609 Snead Dr., Plano, TX (US) 75025; Sriram M. Krishnan, 1416 McKenzie, Allen, TX (US) 75013

( * ) Notice: Subject to any disclaimer, the term of this patent is extended or adjusted under 35 U.S.C. 154(b) by 1414 days.

(21) Appl. No.: 11/089,744

(22) Filed: Mar. 25, 2005

(51) Int. Cl.
*H04M 11/00* (2006.01)

(52) U.S. Cl. .............................. 379/102.01; 379/106.01; 348/143

(58) Field of Classification Search ............ 379/102.01, 379/102.02, 106.01; 348/150
See application file for complete search history.

(56) References Cited

U.S. PATENT DOCUMENTS

| | | | |
|---|---|---|---|
| 4,651,143 A | 3/1987 | Yamanaka | 340/691 |
| 5,086,385 A | 2/1992 | Launey et al. | 364/188 |
| 5,216,502 A | 6/1993 | Katz | 358/108 |
| 5,491,511 A | 2/1996 | Odle | 348/153 |
| 5,625,410 A | 4/1997 | Washino et al. | 348/154 |
| 5,751,345 A | 5/1998 | Dozier et al. | 348/153 |
| 5,751,346 A | 5/1998 | Dozier et al. | 348/153 |
| 5,920,138 A | 7/1999 | Clifton et al. | 310/90.5 |
| 5,982,362 A | 11/1999 | Crater et al. | 345/327 |
| 5,982,418 A | 11/1999 | Ely | 348/153 |
| 6,091,771 A | 7/2000 | Seeley et al. | 375/240 |
| 6,097,429 A | 8/2000 | Seeley et al. | 348/154 |
| 6,163,257 A | 12/2000 | Tracy | 340/506 |
| 6,385,772 B1 | 5/2002 | Courtney | 725/105 |
| 6,438,696 B1 | 8/2002 | Baran et al. | 713/202 |
| 6,476,858 B1 | 11/2002 | Ramirez Diaz | 348/159 |
| 6,504,479 B1 | 1/2003 | Lemons et al. | 340/541 |
| 6,510,350 B1 | 1/2003 | Steen, III | 700/9 |
| 6,513,119 B1 | 1/2003 | Wenzel | 713/200 |
| 6,556,241 B1 | 4/2003 | Yoshimura et al. | 348/211.99 |
| 6,570,496 B2 | 5/2003 | Britton | 340/506 |
| 6,580,451 B2 | 6/2003 | Yonezawa et al. | 348/159 |
| 6,598,056 B1 | 7/2003 | Hull et al. | 707/104.1 |
| 6,628,887 B1 | 9/2003 | Rhodes et al. | 386/46 |

(Continued)

OTHER PUBLICATIONS

"Remote Monitoring System Overview," BuzzVC Remote Video Communication (23 pgs.), Jan. 2003.

(Continued)

*Primary Examiner*—Stella L Woo
(74) *Attorney, Agent, or Firm*—Baker Botts L.L.P.

(57) ABSTRACT

In certain embodiments, a system for remotely monitoring, controlling, and managing one or more remote premises includes a server system operable to communicate with one or more remote client systems, the client systems being remote from the one or more premises. The system further includes a database system associated with the server system and operable to store configuration information for a number of devices located at a premises, the devices including one or more camera devices and one or more facility management devices. The server system is operable to: (1) receive from the one or more premises device data for the one or more facility management devices located at the premises; (2) initiate storage of at least a portion of the received device data in the database system; and (3) communicate, in response to a request received from a particular client system, stored device data responsive to the request to the particular client system.

41 Claims, 20 Drawing Sheets

U.S. PATENT DOCUMENTS

| | | |
|---|---|---|
| 6,633,232 B2 | 10/2003 | Trajkovic et al. ......... 340/573.1 |
| 6,636,256 B1 | 10/2003 | Passman et al. ............. 348/143 |
| 6,768,508 B1 | 7/2004 | Broemmelslek et al. .... 348/143 |
| 2001/0056335 A1 | 12/2001 | Ikeda et al. ................. 702/188 |
| 2002/0016971 A1 | 2/2002 | Berezowski et al. ........ 725/105 |
| 2002/0097322 A1 | 7/2002 | Monroe et al. .............. 348/159 |
| 2003/0004682 A1 | 1/2003 | Abraham et al. ............ 702/183 |
| 2003/0062997 A1 | 4/2003 | Naidoo et al. ............... 340/531 |
| 2003/0067387 A1 | 4/2003 | Kwon et al. ................. 340/540 |
| 2003/0184647 A1 | 10/2003 | Yonezawa et al. ........... 348/143 |
| 2003/0197782 A1* | 10/2003 | Ashe et al. .................. 348/150 |
| 2003/0204371 A1 | 10/2003 | Sciamanna .................. 702/183 |
| 2004/0086090 A1 | 5/2004 | Naidoo et al. ................. 379/37 |
| 2004/0111241 A1 | 6/2004 | Nakamitsu et al. .......... 702/188 |
| 2008/0106597 A1* | 5/2008 | Amini et al. ................ 348/143 |

OTHER PUBLICATIONS

Panda, et al. "Low Cost Remote Management of Video Detectors No. 1158," Image Sensing Systems, presented at the 6th World Congress on ITS Nov. 8-12, 1999, Autoscope, www.imagesensing.com (11 pgs.), Nov. 1999.

* cited by examiner

*FIG. 10*

SYSTEM AND METHOD FOR REMOTELY MONITORING, CONTROLLING, AND MANAGING DEVICES AT ONE OR MORE PREMISES

TECHNICAL FIELD OF THE INVENTION

This invention relates generally to remote monitoring systems and more particularly to a system and method for remotely monitoring, controlling, and managing equipment at one or more premises.

BACKGROUND

It is often desirable to monitor a premises, such as a convenience store, a fast food restaurant or other suitable facility. For example, one or more video cameras may be installed throughout the premises to record activities occurring on the premises. These recordings may be used to monitor activities of employees and for other security-related purposes, for example. As another example, one or more sensors may be installed throughout a premises to detect the occurrence of certain events or to monitor certain conditions. These sensors may include temperature sensors to monitor the temperature at certain locations on the premises, in a refrigerated area for example. Other sensors may detect whether a door is open or closed, the presence of water on surfaces, the humidity in an area, or other suitable events or conditions. As another example, it is often desirable to monitor and record point-of-sale (POS) information, such as transactions processed using a cash register.

SUMMARY OF THE INVENTION

According to the present invention, disadvantages and problems associated with previous systems and methods for remotely monitoring, controlling, and managing a premises may be reduced or eliminated.

In certain embodiments of the present invention, a system for remotely monitoring, controlling, and managing one or more remote premises includes a server system operable to communicate with one or more remote client systems, the client systems being remote from the one or more premises. The system further includes a database system associated with the server system and operable to store configuration information for a number of devices located at a remote premises, the number of devices including one or more camera devices and one or more facility management devices. The server system is operable to: (1) receive from the one or more premises device data for the one or more facility management devices located at the remote premises; (2) initiate storage of at least a portion of the received device data in the database system; and (3) communicate, in response to a request received from a particular one of the one or more remote client systems, stored device data responsive to the request to the particular client system.

In certain embodiments of the present invention, a system for monitoring, controlling, and managing a premises includes a computer system located at the premises and operable to communicate with a remote client computer and a remote server system. The system further includes a number of devices located at the premises and comprising one or more camera devices and a number of facility management devices. The computer system is operable to: (1) poll one or more of the facility management devices at predetermined times to obtain device data associated with the facility management devices; (2) communicate at least a portion of the obtained device data to the remote server system; (3) collect video data corresponding to video images captured by the one or more camera devices; (4) store at least a portion of the collected video data in a memory associated with the computer system; and (5) in response to a request from the remote client system, communicate video data responsive to the request to the remote client system.

In certain embodiments, the present invention comprises software for monitoring, controlling, and managing one or more remote premises, each remote premises comprising a plurality of devices. The software, when executed, is operable to: (1) communicate to a remote server system requests for device data associated with one or more facility management devices located at a first one of the one or more remote premises, the remote server system being remote from the one or more premises; (2) receive device data responsive to the request; (3) display the device data in a first window associated with a client system that is remote from the one or more premises and from the server system; (4) communicate to a second one of the one or more remote premises requests for device data associated with one or more video devices located at the second remote premises, the device data comprising video data; (5) receive video data responsive to the request; and (6) display one or more video images of the video data in a second window associated with the client system.

Particular embodiments of the present invention may provide one or more technical advantages. In certain embodiments, the present invention combines the use of control systems and sensors with video applications; whereas, typical existing systems are either control systems or they are video monitoring systems. In certain embodiments, the present invention provides the ability to synchronize the view of various sensors, POS data, and/or video data. In certain embodiments, the present invention provides the ability to integrate audio files and broadcast them upon predetermined events, at predetermined times, or both. In certain embodiments, the present invention provides a system that operates actively, allowing a user or computer system to actively monitor or control a remote premises. Additionally or alternatively, in certain embodiments, the present invention provides a system that operates passively by receiving events and executing one or more corresponding actions (e.g., communicating an alert, delivering an audio message, turning on a light, or any other suitable action) in response to those events. In certain embodiments, the architecture of the present invention comprising a local client system, one or more computer systems located at a premises, and a high performance registrar system enables conservation of bandwidth in connections to remote premises and management of the large amounts of data acquired from the various devices.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 10 illustrates an example display of an example POS report;

DESCRIPTION OF EXAMPLE EMBODIMENTS

Figure 1:
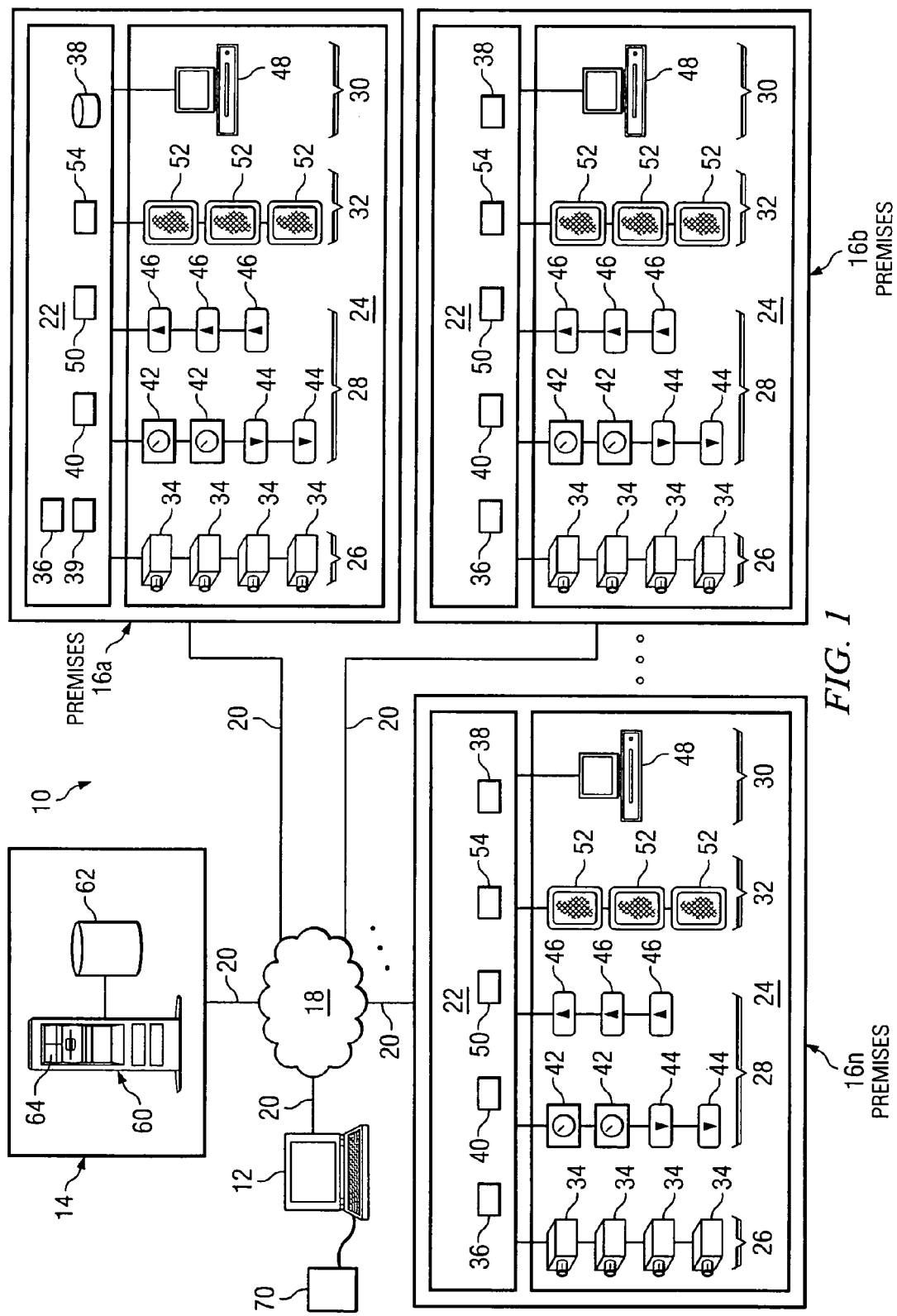
FIG. 1 illustrates an example system for remotely monitoring, controlling, and managing one or more premises and devices at the one or more premises.

FIG. 1 illustrates an example system 10 for remotely monitoring, controlling, and managing one or more premises and devices at the one or more premises. In certain embodiments, system 10 includes one or more client systems 12, a registrar system 14, one or more premises 16, and a network 18. Other embodiments of system 10 may be used without departing from the scope of this description. In general, system 10 allows a user of client system 12 to remotely monitor, control, and manage one or more premises 16 and devices at premises 16 using registrar system 14.

Network 18 may couple client system systems 12, registrar system 14, and premises 16. Network 18 may include one or more computer buses, one or more local area networks (LANs), one or more metropolitan area networks (MANs), one or more wide area networks (WANs), at least a portion of a global computer network such as the Internet, or one or more other suitable wireline, optical, wireless, or other links. Each of client system 12, registrar system 14, and premises 16 may access network 18 via a suitable link 20. Link 20 may include any suitable wireless, wireline, or other suitable communications link. Moreover, each of links 20 may vary in type or capabilities. Additionally, the present invention contemplates any suitable intervening servers between each client system 12, registrar system 14, and premises 16 and network 18. For example, each of client system 12, registrar system 14, and premises 16 may access network 18 via an intervening server such as a server associated with an Internet Service Provider.

Each of client system 12, registrar system 14, and premises 16 are typically remote from each other. In certain embodiments, the term "remote" or "remotely" implies physical remoteness such that the components of system 10 are located at different sites. In certain other embodiments, the term "remote" or "remotely" is not meant to imply physical remoteness, but rather that client system 12, registrar system 14, and premises 16 typically communicate with one another using network 18. In such embodiments, client system 12, registrar system 14, and premises 16 may or may not be physically remote from one another.

In certain embodiments, system 10 may be used to remotely monitor one or more premises 16. Additionally or alternatively, in certain embodiments, system 10 may be used to remotely manage devices at one or more premises 16. For example, system 10 may be used to remotely monitor and manage a number of separate premises 16 such as convenience stores or fast food restaurants.

Premises

Premises 16 may be a store, a retail facility, a restaurant, a warehouse, a manufacturing plant, an office building, or any other premises or facility suitable for monitoring, control, and management. As particular examples, premises 16 may be a convenience store, a department store, a grocery store, a fast food restaurant, or any other suitable premises. Although particular example premises 16 are primarily described, the present invention contemplates premises 16 comprising any suitable type of premises 16, according to particular needs. Additionally, although a particular number of premises 16 are illustrated, system 10 may include any suitable number of premises 16, according to particular needs. For example, a user of client system 12 may remotely monitor, control, and manage equipment at multiple premises 16 using system 10. Premises 16 may be referred to singly as premises 16 and collectively as multiple premises 16.

Users of client system 12 may include any suitable human or computer users. In the case of human users, such human users may include an owner of one or more premises 16, an owner of a portion of system 10 (e.g., registrar system 14), an employee, or any other suitable user according to particular needs. As a particular example, a user of client system 12 may own or otherwise be associated with a plurality of fast food restaurants and may use system 10 to monitor and manage each of the plurality of fast food restaurants and equipment at each of the plurality of fast food restaurants. Throughout this description, the terms "equipment" and "devices" may be used interchangeably to refer to what is being monitored, controlled, and managed at premises 16 using system 10.

Each premises 16 may include one or more computer systems 22 and one or more devices 24 of varying types for monitoring premises 16. Each computer system 22 may include any appropriate input devices, output devices, mass storage media, processors, memory, or other suitable categories for receiving, processing, storing, and/or communicating information. In certain embodiments, computer system 22 may include a computer, such as a personal computer, workstation, network computer, embedded computer, kiosk, wireless data port, datashow, wireless telephone, personal digital assistant (PDA), one or more processors within these devices, or any other suitable device. In particular embodiments, computer system 22 includes an embedded LINUX box. Additionally, each computer system 22 may include any suitable combination of hardware, software, or firmware.

Devices 24 located at or otherwise associated with premises 16 may include one or more video devices 26 (e.g., video cameras), one or more facility management devices 28, one or more point-of-sale (POS) devices 30 (e.g., cash registers), one or more media devices 32, and any other devices suitable for monitoring, controlling, or otherwise managing premises 16, according to particular needs. Communication between computer system 22 and devices 26 at premises 16 may be wireline communication, wireless communication, or any other suitable type of communication. Each device 24 is operable to generate device data, which, depending on the type of device, may include video data, facility management data, POS data, or any other suitable type of data according to particular needs.

As described above, devices 24 at premises 16 may include video devices 26 such as video cameras 34. Although video cameras 34 are primarily described, the present invention contemplates any suitable type of video devices 26 being used to capture video data, according to particular needs. Premises 16 may include one or more video cameras 34 located in or around premises 16. The present invention contemplates premises 16 including any suitable number of video cameras 34 oriented in any suitable manner, according to particular needs. In a particular example in which premises 16 is a fast food restaurant, premises 16 may include one or more video cameras 34 located around the perimeter of the restaurant facility, one or more video cameras 34 located in the parking lot of the restaurant facility, and one or more video cameras 34 located inside the restaurant facility. For example, the one or more video cameras 34 located inside the restaurant facility may be oriented to capture one or more views of a cash register area, a front door or doors, a back door or doors, a kitchen, or any other suitable views inside or outside the restaurant facility. As another particular example in which premises 16 is a convenience store, premises 16 may include one or more video cameras 34 located around the perimeter of the store facility, one or more video cameras 34 located in the parking lot of the store facility, and one or more video cameras 34 located inside the store facility. For example, the one or more video cameras 34 located inside the store facility may be oriented to capture one or more views of a cash register area, a front door or doors, a back door or doors, a storage area, or any other suitable views inside or outside the store facility. Video cameras 34 may include any suitable types of video cameras, according to particular needs.

In certain embodiments, each video camera 34 is associated with a unique identifier that uniquely identifies the video camera and which will be referred to as "device ID." Throughout this description, reference is made to unique identifiers for various devices located at premises 16, and these unique identifiers may be referred to as "device ID." It should be understood that such unique identifiers may comprise any suitable characters, numbers, or other identifiers, according to particular needs. Additionally, each unique identifier may be associated with a label (e.g., cash register camera one"). Additionally, each video camera 34 may capture video images substantially continuously or in any other suitable manner and frequency, according to particular needs.

In certain embodiments, computer system 22 includes a video application 36 operable to collect video data captured by video cameras 34 and to initiate storage of at least a portion of the captured video data. Video application 36 may include any suitable combination of hardware, software, or firmware, according to particular needs. Although described as a single video application, video application 36 may include any suitable number of applications operating alone or collectively to perform the operations of video application 36. Video application 36 may collect and store video data in any suitable manner, according to particular needs. In certain embodiments, the video data comprises one or more video frames, and video application 36 collects and stores one or more video frames captured by video cameras 34. In certain embodiments, a frame of video data includes a single video image. In such embodiments, a plurality of sequential video images may be displayed in sequence to show motion captured by video cameras 34. Throughout the remainder of this description, video data will be described primarily as video images; however, the present invention is not intended to be so limited.

The video images may be captured and stored in any suitable format, such as JPEG format, GIF format, BMP format, MPEG format, or any other suitable format according to particular needs. Video application 36 may store collected video images in a storage device 38 associated with computer system 22. Storage device 38 may include any suitable type of storage mechanism, including both memory and disk-based storage, according to particular needs. In a particular example, storage device 38 comprises a hard disk of computer system 24, and one or more of the collected video images may be stored in the hard disk of computer system 22. Each stored video image may be associated with a time stamp. The time stamp may indicate when the video image was captured by a video camera 34, collected by video application 36, stored by video application 36, or any other suitable time, according to particular needs. The stored video images may be indexed according to the time stamp, which may allow for quick retrieval of images for delivery to a client, deletion, or for any other suitable purposes. The time stamp for a video image may be stored in such a manner that it can be associated with the video image. For example, each stored video image may be stored as an object or any other suitable data structure.

Video images may be stored for any suitable length of time. For example, the length of time video images are stored in storage device 38 may depend on the size of storage device 38, the number of video images stored, or any other suitable factors. In certain embodiments, the length of time that video images are stored in storage device 38 may be configurable, by a user of client system 12 for example. Computer system 22 may include a job or other suitable application that periodically deletes one or more video images from storage device 38. For example, the job may delete one or more video images from storage device 38 when storage device 38 reaches a certain percentage of its capacity. As another example, the video images may be deleted using a first-in, first-out technique in which, for example, the oldest captured video image is deleted first, leaving the system with substantially continuous images for a given period of time.

In certain embodiments, video application 36 stores collected video frames in a directory structure in storage device 38. The directory structure may comprise any suitable format, according to particular needs. For example, the directory structure may include a root directory for each video camera 34 at premises 16, which may be based on the device ID associated with each video camera 34. In this example, under each root directory, video application 36 may create folders organized in a calendar-like structure. For example, a series of folders representing year, month, and day may be created. In this example, the directory structure may be created to any desired granularity in time. For example, the lowest level folder in the directory structure may be represent a minute such that video images collected within a particular minute are stored in the lowest level folder for that minute. At the lowest level of the directory structure, the collected video images may be stored in the desired format.

Video images may be stored in any suitable format, according to particular needs. In certain embodiments, each video image is stored as a video record that comprises the time stamp associated with the video image, the device ID of the video camera 34 that captured the video image, the video image itself (or a pointer to the video image, if the video image is stored in another location for example), and any other suitable information. Additionally, in certain embodiments, a video image may be compressed prior to, during, or after storing the video image. In certain embodiments, whether or not to perform the compression, the amount of compression performed, and the quality of the stored video image are configurable parameters. For example, a user associated with client system 12 may specify values for these configurable parameters, and/or default values may be applied.

Using video application 36, a user of client system 12 may specify configurations for one or more of video cameras 34. For example, a user associated with client system 12 may specify the configuration of cameras 34, and/or default configurations may be applied. As discussed above, each video camera 34 may capture video images substantially continuously or in any other suitable manner and frequency, according to particular needs. These video images may be provided by the video cameras 34 to a video card associated with premises 16. Video application 36 may be configured to collect video images in any suitable manner, according to particular needs.

In certain embodiments, a configuration made using video application 36 may specify the image size or image quality of the video images that are collected and stored by video application 36 for each video camera 34. In certain embodiments, capturing and storing video images of a relatively large size or high quality may burden the storage capacity of computer system 22 or may be otherwise unnecessary. Thus, it may be desirable to specify the particular image size or quality for each video camera 34. For example, video application 36 may be configured to capture video images of a first quality or size for a first video camera 34 and to capture video images of a second quality or size for a second video camera 34. Capturing video images of a relatively high image size or quality may be important in certain areas of premises 16. For example, if premises 16 is a gas station, it may be important for video images capture by a video camera 34 oriented toward the gas pumps to be of a relatively high image size or quality. This may allow for later zooming on the video image for investigative purposes (e.g., for identifying the license plate number of a vehicle that is driven away without someone paying for the gasoline).

In certain embodiments, a configuration made using video application 36 may specify the number of video images that should be collected and stored in a particular time interval. For example, video application 36 may be configured to capture a particular number of video images per second. Such a setting is typically referred to as "frames-per-second." In certain embodiments, capturing and storing an excessive number of video images in a particular time period may burden the storage capacity of computer system 22 or may be otherwise unnecessary. For example, at particular times of the day or at particular camera locations, each video image may be a substantial duplicate (if not identical) to the previous and/or subsequent stored video frame. When premises 16 is closed (e.g., if premises 16 is a store), for example, there will likely be very little motion captured by cameras 34 inside premises 16. Thus, if a high number of video images are collected and stored by video application 36 at such times, storage device 38 may include a potentially large number of duplicate video images.

Using video application 36, cameras 34 may be configured individually or collectively, according to particular needs. In certain embodiments, it may be desirable for each camera 34 to be individually configurable, which may, for example, allow cameras in a particular high motion area to capture more frames per second than cameras in areas of low motion. Additionally, an individual configuration capability may allow different video image capture quality to be set for individual cameras. Moreover, in certain embodiments, different configurations may be specified for different time periods. For example, it may be important to collect images of high quality and at a high frames-per-second from the video camera 34 recording activities around the cash register area during operating hours of a store. However, it may be less important to capture images of such high quality or at such a high frequency when the store is closed. In certain embodiments, the present invention provides this capability.

In certain embodiments, one technique to reduce the amount of memory used for storing video images or to more efficiently use storage device 38 for storing video images is to store video images when motion is detected by video application 36, between subsequent video images for example. In certain embodiments, video application 36 is operable to detect motion and to capture and store video images when motion is detected by video application 36. As described in more detail below, the collected video images may be played back in sequence to show motion, in response to a request from client system 12 for example. In such embodiments, the number of video images stored by video application 36 may depend on a number of factors. For example, the number of frames that are stored may depend on the frames-per-second configuration of video application 36. The frames-per-second configuration may be a default setting or may be specified by a user such as a user associated with client system 12. In embodiments in which video application 36 stores video images in response to the detection of motion, the number of frames that are stored may depend on the amount of motion in the area to which a video camera 34 is oriented.

Video application 36 may detect motion between video images in any suitable manner. For example, in certain embodiments, video application 36 may capture a first image and a second image, and perform a pixel-by-pixel comparison between the two images to determine whether motion has occurred between the two images. However, this pixel-by-pixel comparison technique may burden the processing capabilities of computer system 22 or may be otherwise inefficient.

As another example, in certain other embodiments, video application 36 may capture a first video image and a second video image. Video application 36 may divide each video image into a number of sections. For example, video application 36 may divide each video image into two hundred fifty-six quadrangular sections of substantially equal area, each including a particular number of pixels. Video application 36 may compare the sections of the first video image to corresponding sections of the second video image to determine whether motions has occurred between the two images. The comparison may be performed in any suitable manner, according to particular needs.

As just one particular example, video application 36 may calculate a value for each section of the first and second images. In certain embodiments, the value may be an average brightness for each section of the first and second video images. The average brightness may represent a combination of all the colors in the section. For example, average brightness for a section may be calculated by summing the numeric value of each pixel in the section and then dividing the sum by the total number of pixels in the section. Video application 36 may compare the value (e.g., average brightness) of corresponding sections in the first and second video images to determine whether motion has occurred between the two images. For example, video application 36 may determine that motion has occurred based on a predefined delta value between the value of the (e.g., average brightness) corresponding sections in the first and second video images.

The comparison of corresponding sections of the first and second video images may be performed in a sequence. For example only, video application 36 may compare the value (e.g., average brightness) of the upper left section of the first video image to the value (e.g., average brightness) of the upper left section of the second video image, moving across the upper row until it compares the value (e.g., average brightness) of the upper right section of the first video image to the value (e.g., average brightness) of the upper right section of the second video image, then moving to the second row, and so on. In certain embodiments, when video application 36 is performing the section-to-section comparison, once the predefined delta is met or exceeded for corresponding sections of the first and second video image, video application 36 may determine that motion has occurred and cease to perform the comparison. The predefined delta may be specified in any suitable manner, by a user of system 10 or as a default value specified in video application 36 for example. In certain embodiments, each video camera 34 may be associated with its own predefined delta. For example, it may be desirable for video cameras 34 oriented to areas of typically high motion to be associated with a relatively high delta to slightly reduce the number of video images captured, while video cameras 34 oriented to areas of typically low motion may be associated with a relatively low delta to increase the number of video images captured.

This technique of dividing video images into sections and comparing corresponding sections in two video images to determine whether motion has occurred may reduce the processing burden on the one or more processors of computer system 22. For example, calculating the average brightness of a section may be a more efficient calculation relative to performing a comparison operation. The technique of dividing each video image into a number of sections may reduce the number of comparisons for determining whether motion has occurred relative to a pixel-by-pixel approach. For example, instead of performing millions of comparisons in the pixel-by-pixel technique described above, only two hundred fifty-six comparisons or less may be performed to determine whether motion has occurred between two images.

Certain operations may be initiated in response to detection of motion. For example, video application 36 may determine to store a video image when motion is detected between that video image and the previous video image. In certain embodiments, it may be desirable for video application 36 to collect and store a video image at a predetermined interval, regardless of whether motion is detected between that video image and the previous video image. The predetermined interval may be any suitable length of time (e.g., every five minutes). This may help ensure that even slight motion that occurs slowly over time is captured and stored, if desired. For example, if a video camera 34 is oriented to the front of premises 16 and there are one or more windows at the front of the premises 14, video camera 34 may need to capture and store sufficient video images to show the daybreak process, which is a relatively slow process. Video application 36 may test for the presence of motion at any suitable interval, according to particular needs. As just one example, video application 36 may test for motion approximately twelve times per second.

Second, in certain embodiments, one or more alerts may be triggered in response to monitoring video devices 26 at premises 16. For example, such alerts may be triggered in response to the detection of motion, the detection of no motion, the detection of a signal to the video device 26, the detection of no signal to the video device 26, or any other suitable event. An action in response to an alert may include, for example, communicating a notification to a user such as a user of client system 12, initiation of a particular operation, or any other suitable action, according to particular needs. The notification may be automatically communicated to the user via a telephone call, an email message, a page, a text message, or in any other suitable manner according to particular needs. An operation initiated by an alert may include automatically causing a particular device at premises 14 to operate in a particular way in response to the alert. In certain embodiments, this capability of system 10 may allow a premises 16 to be somewhat self-monitoring, without requiring a user of client system 12 or other user to take action to cause a desired or otherwise appropriate action in response to an alert. For example, in response to a particular alert, one or more lights in the premises 16 may be turned on automatically. The configuration of an alert may include when an alert should be initiated, what action, if any, is to be initiated or performed when the alert is triggered (e.g., communicating a notification to a user), or any other suitable information. As an example, the configuration of an alert may indicate that the alert should be triggered when a predefined amount of motion is detected or when a sensor device detects a certain condition.

Alerts may be detected and triggered in any suitable manner, according to particular needs. In certain embodiments, an alert module 39 associated with computer system 22 at premises 16 may maintain a directory of alerts configured for each video camera 34. Alert module 39 may include any suitable combination of software, firmware, and hardware, according to particular needs. When motion is detected for a particular camera 34, video application may communicate an alert file into the alert directory for the particular camera 34. The alert file may include the time at which the motion was detected, the amount of motion that was detected, and any other suitable information. Computer system 22 may include a job that runs at predetermined times (e.g., automatically once per minute), searching for any alert files that satisfy a condition of an alert definition for a particular alert. If an alert file satisfies a condition of an alert definition, an alert notification may be communicated to registrar system 14, which may further process the alert. The notification of the alert communicated to registrar system 14 may include a unique identifier for the alert (e.g., "alert ID") and an indication that the alert has been triggered. Registrar system 14 may perform further processing in response to receipt of an alert notification, as described below with reference to registrar system 14.

In certain embodiments, video application 36 is operable to communicate one or more video images to client system 12. For example, in response to a request initiated by client system 12, video application 36 may communicate one or more video images to client system 12. The request to view video initiated by client system 12 may include a request to view the video in substantially real-time (i.e., substantially as the video is captured and stored), in which case video application 36 may communicate the video images to client system 12 substantially at the same time as video application 36 stores the video images. In certain embodiments, video application 36 communicates the entire video record for the video image to client system 12. For example, as described above, the video record for a video image may include a time stamp for the video image, the device ID of the video camera 34 that captured the video image, the video image, or any other suitable information. Additionally, in certain embodiments, the video image may be compressed prior to being communicated to client system 12. In embodiments in which video application 36 stores video images in response to the detection of motion, in the event that no motion is detected from one video image to the next, video application 36 may communicate a time stamp and the device ID without also transmitting an associated video image.

As another example, the request to view video initiated by client system 12 may include a request to view stored video images (i.e., after the video images have been stored by video application 36), which may be referred to as a request to download video images. The request may include the request to download video data, a device ID for a particular camera, a start time, an end time, and any other suitable information. In response to a request to download video images, video application 36 may retrieve a set of video images (or video records) from the memory in accordance with the request and communicate the retrieved set of video images (or video records) to client system 12.

As described above, devices 24 at premises 16 may include one or more facility management devices 28. Facility management devices 28 may include sensors or any other devices suitable for use in monitoring, controlling and managing premises 16. Facility management devices 28 may include any suitable types of devices, according to particular needs. For example, facility management devices 28 may include sensors operable to detect occurrence of one or more events, sensors to detect the presence of one or more conditions, sensors to monitor one or more conditions, and switches operable to initiate one or more actions or to detect a change in state. As particular examples, facility management devices 28 may include temperature sensors, on/off switches, door open/close switches, humidity sensors, barometer sensors, pressure difference sensors, water sensors, check-in/check-out sensors, input switches, output switches, chemical sensors, motion sensors, fluid level sensors, infrared sensors, radiation sensors, photovoltaic sensors, or any other suitable sensors, switches, or devices according to particular needs. Facility management devices 28 may be located in or around premises 16 at any suitable location. Additionally, facility management devices 28 may be coupled to computer system 22 in any suitable manner, according to particular needs. In certain embodiments, facility management devices 28 may include one or more devices that operate using one or more serial communication protocols such as RS-232, RS-422, RS-485, Ethernet, I²C, Centronix, 1-Wire, CEBus, X10, LonWorks. While these devices are described as examples of facility management devices 28, facility management devices 28 may include any suitable devices, according to particular needs.

Facility management devices 28 may be coupled to computer system 22 in any suitable manner, according to particular needs. In certain embodiments, one or more of facility management devices 28 may be coupled to one or more ports of computer system 22 and may use any suitable communication protocol. As just one non-limiting example, one or more facility management devices may be coupled to one or more serial ports of computer system 22 and may use a standard serial communication protocol. Additionally, one or more of the facility management devices may be coupled on a single connection, which is coupled to one or more of the ports, such as the serial ports, of computer system 22. Any number of facility management devices 28 may be plugged into the one or more serial ports of computer system 22 and may include varying types of devices. In certain embodiments, facility management devices 28 include a laser etched identification number on the device that software associated with computer system 22 is operable to read. A part of this identification number may indicate a "device type code," which indicates a device type for the facility management device 28. Moreover, each facility management device 28 may be assigned a unique identifier, referred to as a device ID.

Certain types of facility management devices, such as sensors and input switches, are operable to report status or state information, generally referred to as device data. Such facility management devices 28 may be operable to upload their corresponding data to computer system 22 in a suitable manner. In certain embodiments, a facility management application 40 on computer system 22 is operable to collect data from facility management devices 28. Facility management application 40 may include any suitable combination of hardware, software, or firmware, according to particular needs. Although described as a single facility management application, facility management application 40 may include any suitable number of applications operating alone or collectively to perform the operations of facility management application 40.

Facility management application 40 may collect and store data from facility management devices 28 in any suitable manner, according to particular needs. For example, facility management application 40 may be operable to poll one or more facility management devices 28 at one or more predetermined times. Facility management devices 28 may be polled based on the device type code of the devices (e.g., poll_all devices in family X) or in any other suitable manner. In certain embodiments, the facility management application includes a job such as a "cron job," which is operable to run locally at premises 16 and to poll certain facility management devices 28 for device data. A cron job is an automated process that operates at predefined times. The cron job may parse a communications link coupling any suitable number of facility management devices 28. In certain embodiments, the cron job parses through the communication link searching for devices 28 of a particular type (e.g., having a specified device type code), and when it locates a device 28 of the particular type, it may record device data for the device 28. The device data may include the status of the device or any other suitable information. The predefined times at which the cron job polls devices 28 may be any suitable times according to particular needs. As an example, the cron job may poll devices 28 by device type (e.g., device type code), and it may poll a particular type of device 28 once every minute.

Facility management application 28 may time stamp the recorded device data and communicate the device data to registrar system 14. The device data may be communicated to registrar system 14 as a facility management data record, which may be a file comprising the device ID for the device 28 to which the device data corresponds, the time stamp of the device data, the device data itself, or any other suitable information.

A particular type of facility management device 28 that may be used at premises 16 is a temperature sensor 42. In certain embodiments, premises 16 may include one or more temperature sensors 42 at one or more locations in or around premises 16. In certain embodiments, temperature sensors 42 are coupled to computer system 22 using one or more ports, such as one or more serial ports, of computer system 22.

Temperature sensors 42 may be associated with a device type code. For example, the device type code of temperature sensors 42 may be 15.

Another particular type of facility management device that may be used at premises 16 is an input switch 44. Input switch 44 may include a device 28 operable to report a status. For example, a particular input switch 44 may indicate whether a door is open or closed. In certain embodiments, input switches 28 operate in a substantially similar manner as temperature sensors 42. Like other facility management devices, in certain embodiments, input switches 44 may be associated with a device type code. For example, the device type code of input switches 44 may be 18.

In certain embodiments, input switches 44 may also include a latch state. For example, a first reading of an input switch 44 may be taken at a first time having a first state, and a second reading of the input switch 44 may be taken at a second time also having the same first state. Although the first and second readings of the input switch 44 both indicate the first state, it is possible that the state of the input switch 44 changed at least once between the first and second readings. The latch state may indicate that the state of the input switch 44 changed at least once between the first and the second readings. For example, an input switch may be used to determine whether a door is open or closed. The first reading may be taken at time zero and the second reading may be taken at time 1, twenty seconds later for example. In the twenty second interval, the door may have been opened and closed, while the first and second readings may both indicate that the door is closed. The latch state indicates that the door was open or closed at least once in the twenty second interval. In certain embodiments, the latch state may be included in each data reading taken by the cron job. For example, the data reading taken by the cron job may indicate the current state of the input switch 44 (the state) and whether or not the state changed (the latch state).

Certain types of facility management devices 28, such as output switches, may be operable to change state in response to a command to do so. For example, in response to a command received by computer system 22 from registrar system 14, facility management application 40 may cause certain devices associated with premises 16 to operate in a particular manner. Facility management application 40, which may include a command line utility, may be operable to turn a device on or off by affecting the state of an output switch 28 and/or an external electrical or electromechanical relay coupled to the device, using the unique identifier of the output switch associated with the device to direct the command to the appropriate output switch 46. In certain embodiments, facility management application 40 receives a command to affect the state of an output switch 46 from registrar system 14. Such commands may be issued based on a schedule stored at registrar system 14 or may be issued by registrar system 14 in response to a request from client system 12. In certain embodiments, commands for affecting the state of output switches 28 may initially be established on registrar system 14. Once established, those commands may be communicated to premises 16 and run and issued by system 22 at premises 16.

Premises 16 may include one or more output switches 46 located in or around the premises. Generally, output switches 46 are devices whose state can be affected (e.g., the switch can be turned on or off). Output switches 46 may be coupled to one or more devices located through premises 16. As an example, an output switch 46 may be used to turn one or more lights, one or more grills, or one or more televisions on or off.

Like other facility management devices, in certain embodiments, each output switch 46 may be associated with a device type code.

In certain embodiments, devices 24 at premises 16 may include one or more point-of-sale (POS) devices 48 operable to record or otherwise process POS data associated with transactions performed at premises 16. For example, POS devices 48 may include cash registers, change machines, vending machines, public pay phones, or other suitable POS devices. POS devices 48 may be used, for example, in embodiments in which premises 16 is a retail facility such as a convenience store or department store. Each POS device 30 may be associated with a unique identifier, referred to as a device ID. Facility management application 40 may be operable to collect POS data from POS devices 48.

As an example, premises 16 may include one or more cash registers. Although cash registers are primarily described, it should be understood that any suitable types of POS devices 48 may be included in system 10 without departing from the scope of the present invention. Cash registers may be coupled to computer system 22 in any suitable manner. For example, each cash register may plug into a port, such as a serial port, of computer system 22. Although a port is primarily described, any other suitable connection may be used for connective POS devices 48 to computer system 22. Each cash register may process transactions, such as purchase transactions, and print a summary of the transaction on one or more receipts. The summary of the transaction is one example of POS data. Although transaction data is primarily described, the present invention contemplates any suitable type of POS data. In other words, POS data is not limited to sale transactions only, but may included any suitable data generated by a POS device 30. For example, POS data may include summary reports run at a cash register or other POS device 30, payroll reports run at POS device 30, or any other suitable POS data. The transaction data may also be communicated via a link (e.g., the port connection) to computer system 22. The transaction data may be communicated to computer system 22 in any suitable format, text format being just one example. Additionally, a cash register may print summaries of employees' shifts or other suitable data, which is also considered POS data for purposes of this description.

Computer system 22 may include a POS application 50 operable to process the POS data, such as the transaction data. POS application 50 is operable to receive the POS data communicated by the one or more cash registers or other suitable POS devices 48. POS application 50 may parse the received POS data. POS application 50 can be configured to parse POS data received from any suitable POS device 30. In the cash register example, each brand or model of cash register may output data in a different format or having different information, and POS application 50 may be configured to process that POS data.

POS data may include one or more delimiters. In a stream of POS data, a delimiter may indicate an end to one transaction and/or the beginning of a new transaction. For example, receipts typically include one or more lines of text at the top of the receipt that provide the name and address of the premises 16. As another example, receipts typically include one or more lines of text at the end of the receipt that read "Thank you. Please come again." Such delimiters may be particular to the particular brand or model of cash register used by premises 16, or may be otherwise configured for premises 16. The present invention contemplates any suitable delimiter, according to particular needs. The delimiter may be used to separate transactions in a POS data stream received by POS application 50 from the one or more cash registers or other POS devices 48. In certain embodiments, POS application 50 reads the POS data stream line-by-line and buffers the POS data stream in memory. POS application 50 may determine that it has read a complete transaction when it recognizes a delimiter.

In certain embodiments, POS application 50 stores the POS data associated with each complete transaction in a data structure. The data structure may be organized in any suitable manner, according to particular needs. As just one example, computer system 22 may maintain a data structure, with POS devices as the root directory. Cash registers may be a directory under the POS devices directory, and each cash register (identified by its associated device ID) may be a directory under the cash registers directory. Each cash register directory may also include directories for one or more dates. The POS data associated with each transaction may be saved in an appropriate date directory under the directory for the cash register that generated the POS data. The POS data may be time stamped with the time at which the POS data was generated. In certain embodiments, the name of the POS file in which the POS data is stored in the data structure is the time stamp of the POS data. In certain embodiments, each line in the POS data is time stamped as a POS transaction, since the transaction in its entirety (e.g., a sale transaction of multiple goods to a single customer) may take several minutes. For example, a delimiter for time-stamping each line of a POS transaction may be a character return or other suitable delimiter. The POS file may include any suitable information, including for example, the POS data for the transaction, which may be stored in any suitable format.

In certain embodiments, computer system 22 is operable to communicate POS data to registrar system 14. Computer system 22 may communicate POS data to registrar system in any suitable manner, according to particular needs. For example, computer system 22, using POS application 50 for example, may communicate POS data to registrar system 14 as the POS data is generated. Such communication may occur after POS application 50 has parsed the POS data to determine individual transactions or at any other suitable time. This substantially real-time communication of POS data may not be optimal, however, because it may overburden the bandwidth of link 20 coupling computer system 22 to network 16, and may also overburden the bandwidth of link 20 coupling registrar system 14 to network 16. As another example, POS application 50 may upload POS data to registrar system 14 at various time intervals, which may reduce the burden on the bandwidths of links 20. For example, POS application 50 may upload POS data to registrar system 14 at scheduled intervals, every minute for example. In certain embodiments, POS application 50 may include a job, such as a cron job, that periodically runs (e.g., every minute) to determine if any new POS data is stored at premises 16. If so, POS application 50 may upload the new POS data to registrar system 14. In certain embodiments, once POS data has been uploaded to registrar system 14 or after a suitable interval, the POS data may be deleted from the memory associated with computer system 22. As discussed in greater detail below with respect to registrar system 14, the POS data may be stored in a database, such as an ORACLE database, associated with registrar system 14 for later reporting, querying, or other suitable purposes. In certain embodiments, in response to a request from client system 12 to view POS data in substantially real time for example, POS application 50 is operable to communicate POS data to client system 12 in substantially real time. POS application 50 may be operable to communicate this substantially real-time POS data to client system 12 in addition to communicating the POS data to registrar system 14 for storage at registrar system 14.

In certain embodiments, as described above with reference to video devices 26, computer system 22 is operable to determine the occurrence of one or more alerts associated with facility management devices 28 or POS devices 30. For example, alert module 39 or another suitable application associated with computer system 22 may determine the occurrence of one or more alerts. In certain embodiments, computer system 22 at premises 16 may be operable to communicate the occurrence of the alert to registrar system 14 or to communicate a notification to the appropriate client system 12. Registrar system 14 may receive the alert and determine one or more appropriate actions to take in response to the alert. The notification of the alert received from premises 16 may include a unique identifier for the alert (e.g., "alert ID") and an indication that the alert has been triggered. As described below, registrar system 14 may perform further processing in response to receipt of an alert notification.

In certain embodiments, devices 24 at premises 16 may include one or more media devices 52 operable to play media at premises 16. For example, media devices 52 may include a software media player, a stereo system, an intercom system, a television, or any other suitable media device. Although media in the form of audio is primarily described, the present invention contemplates media including audio, video, or any other suitable type of media, alone or in combination.

In certain embodiments, premises 16 may include the capability of playing one or more audio files, using one or more media devices 52 at premises 16 for example. As one example, premises 16 may include an audio system operable to play audio files to the entire premises 16. Such an audio system may be used by premises 16 to play music and to make announcements throughout premises 16. As another example, premises 16 may include one or more audio output devices local to particular devices throughout premises 16. Such audio output devices may be located near an ATM machine, near an employee's work area (at the check-out counter for example), near a gas pump, or in any other suitable location according to particular needs.

System 10 may enable one or more audio files to be played over the audio system. Computer system 22 may be operable to receive commands or requests to play one or more audio files, over the audio system of premises 16. In certain embodiments, such commands or requests may be communicated to computer system 22 from registrar system 14 for example. Computer system 22 may include a media application operable to play the audio file at premises 16. Such audio files may be useful for playing marketing messages such as announcing specials, motivating employees, playing music, playing advertisements, and other suitable purposes.

Any suitable media files may be stored at premises 16. In response to a command to play a particular media file received from registrar system 14, a media application 54 may interrupt any currently playing media and play the media file specified in the command. The command to play the media file may include the media file or the media file may already be stored at premises 16.

Although certain devices 24 have been described with respect to premises 16, the present invention contemplates premises 16 including any suitable types of devices 24 being coupled to computer system 22 and being monitored, controlled, or otherwise managed using system 10. The various applications associated with computer system 22 of premises 16 (e.g., video application 36, facility management application 40, and POS application 50) may be referred to generally as premises applications. Additionally, the various premises applications, to the extent that those applications incorporate software, may be written in any suitable programming language, such as JAVA, C++, or any other suitable programming language, according to particular needs.

Registrar System

As described briefly above, system 10 includes registrar system 14. In certain embodiments, registrar system 14 is located remotely from client system 12 and premises 16. Registrar system 14 is operable to facilitate remote monitoring, control, and management of one or more premises 16 and one or more devices at one or more premises 16 from one or more client systems 12. In certain embodiments, an operator of registrar system 14 may provide access to system 10 or to certain features of system 10 for a fee, such as a one-time fee, a periodic subscription fee, or in any other suitable arrangement. Registrar system 14 may comprise a server system 60 and a database system 62.

Server system 60 may include one or more electronic computing devices operable to receive, transmit, process, and store data associated with system 10. For example, server system 60 may include a general purpose personal computer (PC), a Macintosh, a workstation, a UNIX-based computer, a server computer, wireless data port, datashow, wireless telephone, PDA, or any other suitable device. Server system 60 may be operable to communicate with client system 12 and computer system 22 of premises 16, using network 18. Server system 60 may run any suitable operating system. In certain embodiments, server system 60 includes ORACLE software, although the present invention is not intended to be so limited.

Registrar system 14 may include or be coupled to database system 62. Although described as a database, database system 62 may include any memory or database module and may take the form of volatile or non-volatile memory including, without limitation, magnetic media, optical media, random access memory (RAM), read-only memory (ROM), removable media, or any other suitable local or memory component. In certain embodiments, database system 62 comprises one or more ORACLE databases.

Registrar system 14 may include one or more management applications 64 on server system 60 operable to facilitate remote monitoring, control, and management of premises 16 and one or more devices at premises 16 using client system 12. Each management application 64 may include software, hardware, and firmware in any suitable combination. To the extent that the management applications incorporate software, each management application may be written in any suitable programming language, such as JAVA, C++, or any other suitable programming language, according to particular needs.

In certain embodiments, registrar system 14 is operable to maintain a master clock on which the various times, time stamps, and schedules employed by system 10 are based. For example, when a computer system 22 of a premises boots up or when a client system 12 logs in to registrar system 14 (as described below), the clocks of each of those systems may be synchronized with the master clock of registrar system 14.

In certain embodiments, registrar system 14 is operable to store configuration information for the various components of system 10, such as for computer system 22 at premises 16, devices 24 at premises 16, and client system 12. For example, registrar system 14 may maintain accounts for users of client system 12 and for premises 16. The configuration information may be organized according to its associated user and premises 16. The configuration information may be specified by a user of client system 12. Additionally or alternatively, registrar system 14 may assign default configuration settings. In certain embodiments, the configuration information may be stored as tables in database system 62. For example, registrar system 14 may maintain one or more tables of configuration information for users of client system 12 and for one or more premises 16. In certain embodiments, registrar system 14 may maintain, for each user or set of users, a hierarchy in database system 62. The hierarchy may include all premises 16 associated with the user, organized by geographical location, for example. The lowest level of the hierarchy may include a folder for each of the individual premises 16 associated with the customer. The folder for a premises 16 may include, for example, each device 24 located at the premises 16 and a current IP address associated with premises 16. This information may be updated and modified as desired or needed.

In certain embodiments, when a user of client system 12 logs in to registrar system 14, registrar system 14 may communicate configuration information to client system 12. Client system 12 may communicate modifications to the configuration information to registrar system 14, and registrar system 14 is operable to receive the modifications and to update the configuration information as appropriate. For example, registrar system 14 may update the appropriate configuration tables in database system 62 with the modifications to the configuration information. If a user of client system 12 communicates a request to modify the configuration information for particular devices 24 at a premises 16 associated with the user, such request may include an identification of the particular devices 24.

Registrar system 14 may lock the configuration information when a user of a client system 12 is attempting to enter modifications to the configuration information. This may help prevent multiple users of one or more client systems 12 from modifying the configuration information at the same time. In certain embodiments, each time a client system 12 attempts to modify its associated configuration information, registrar system 14 may communicate the latest version of the configuration information to the client system 12 so that the client system 12 will be modifying the current configuration information. This may be useful, for example, if multiple users of client systems 12 have access to the same configuration information. For example, although a first client system 12 is communicated the current configuration information when the first client system 12 logs in to registrar system 14, that configuration information may be modified by a second client system 12 after the first client system 12 logged in to registrar system 14. If the first client system 12 now attempts to change the configuration information, it would be beneficial for the first client system 12 to have the most recent configuration information prior to modifying such information. When registrar system 16 updates the configuration information for a particular device 24 at premises 16 (in response to a request from client system 12 or otherwise), registrar system 14 may communicate the updated configuration information to computer system 22 of premises 16, if appropriate.

In certain embodiments, registrar system 14 is operable to support the monitoring, control, and management of video devices 34. To support these operations, registrar system 14 may store certain configuration information in database system 62. For example, registrar system 14 may store in database system 62 the configuration information of video cameras 34 and video applications 36 located at premises 16. Such configuration information may include any suitable configuration information according to particular needs. In certain embodiments, this configuration information may include a frames-per-second setting for a particular video camera, quality information for storing video images, sensitivity, video image size, or any other suitable information.

Registrar system 14 may store in database system 62 the configuration of one or more alerts associated with premises 16. For example, registrar system 14 may store information for each alert identifying one or more users who should be notified that the alert has been triggered, the appropriate means for communicating notifications of alerts to the user (e.g., email, phone, pager, text message), and any other suitable information. In certain embodiments, an alert may also trigger certain events. For example, receipt of a particular alert may prompt registrar system 14 to issue one or more commands to the premises 16 that generated the alert. As a particular example, receipt of an alert indicating that a grill at premises 16 has exceeded a threshold temperature may prompt registrar system 14 to communicate a command to computer system 22 at premises 16. The command may be directed to an output switch 46 associated with the grill and may direct computer system 22 to change the state of the output switch to "off" (thereby, turning off the grill).

In certain embodiments, registrar system 14 is operable to support the monitoring, control, and management of facility management devices 28 associated with premises 16. For example, registrar system 14 may be operable to support the monitoring, control, and management of temperature sensors 42, input switches 44, output switches 46, POS devices 48, or any other suitable facility management devices 24. Registrar system 14 may store in database system 62 the configuration information for facility management devices 24. Registrar system 14 may receive device data for one or more of devices 24 (e.g., temperature data, input switch state, or other suitable information) from computer system 22 at premises 16. Registrar system 14 may also store the device data in database system 62. In certain embodiments, registrar system 14 stores the device data in one or more tables in database system 62. Each entry in a table may include the device ID of the particular device 24 associated with the data, the time stamp associated with the data, the device data, and any other suitable information. Registrar system 14 may be further operable to communicate the device data for facility management devices 24 to one or more client systems 12, at scheduled times, in response to a request from client system 12, or in any other suitable manner.

In operation of an example embodiment, registrar system 14 may receive a request from client system 12 for device data for a particular facility management device 24. The request may include a device ID, a start time, and an end time. As an example, the request may include a request for the temperature data of temperature sensor four from 3:30 p.m. to 4:15 p.m. Registrar system 14 may retrieve the device data responsive to the request in any suitable manner. For example, registrar system 14 may access the appropriate one or more tables in database system 62 and retrieve the appropriate device data. Registrar system 14 may return the device data responsive to the request to client system 12.

In certain embodiments, registrar system 14 is operable to support the monitoring, control, and management of one or more temperature sensors located at premises 16. For example, registrar system 14 may store in database system 62 the temperature data retrieved at premises 16 by computer system 22 and communicated to registrar system 14 by facility management application 40 at premises 16. The temperature data may be stored in a table of database system 62. For each data record in the table for temperature data, registrar system 14 may store the device ID for the temperature sensor from which the temperature data was taken, the time stamp of the temperature data, the temperature data, and any other suitable information. Registrar system 14 may communicate the temperature data to client system 12 in response to a request from client system 12, at scheduled times, or in any other suitable manner.

In certain embodiments, registrar system 14 is operable to support the monitoring, control, and management of one or more input switches 44 located at premises 16. Such operation may be substantially similar to the operation of registrar system 14 with respect to the temperature sensors, as described above.

In certain embodiments, registrar system 14 is operable to support the monitoring, control, and management of one or more output switches 46 located at premises 16. For example, registrar system 14 may communicate commands to affect the state of one or more output switches 46 to computer system 22 at premises 16. Such commands may include the device ID of an output switch 46 and the appropriate action to be taken (e.g., change the state of output switch 46). As an example, the command may instruct computer system to affect the state of output switch eleven to turn off one or more lights associated with the output switch. Registrar system 14 may communicate such commands in response to a request from client system 12. Additionally or alternatively, registrar system 14 may communicate such commands in response to one or more schedules stored at registrar system 14.

In certain embodiments, registrar system 14 may store one or more schedule files in database system 62 or in any other suitable location. An advantage of storing schedule information at registrar system 14 may include that multiple premises 16 can be operated in accordance with that schedule and commands can be issued to each of the premises 16 at the same time, automatically by registrar system 14. Furthermore, if a change in a schedule is needed or desired, the schedule can be modified in a single location (i.e., at registrar system 14).

In certain embodiments, registrar system 14 includes one or more jobs, such as a cron job, that runs at one or more predetermined times to determine whether a schedule stored at registrar system 14 calls for a certain command or other action to be initiated by registrar system 14. For example, registrar system 14 may include multiple such jobs each corresponding to one or more users and operable to review schedules for the one or more users. The cron job may, for example, determine that at 9:00 a.m. for a first user, registrar system 14 should communicate a command to a particular premises 16 to cause computer system 22 to turn on one or more lights. The command communicated to premises 16 may include an identification of the particular premises 16, the command, and any other suitable information.

In certain embodiments, registrar system 14 is operable to support the monitoring, control, and management of POS devices 48 located at premises 16. For example, registrar system 14 may support the monitoring, control, and management of one or more cash registers at premises 16. In certain embodiments, registrar system stores the POS data communicated to registrar system 14 by computer system 22 at premises 16. For example, registrar system may store the POS data in one or more tables in database system 62 or in any other suitable format.

In certain embodiments, registrar system 14 is operable to process the POS data received from premises 16. For example, registrar system 14 may process the POS data received from premises 16 in order to store the POS data in one or more tables of database system 62 in an organized manner, which may be searchable or otherwise processed. Processing the POS data may include parsing the POS data received from premises 16 to determine what particular data is included in the POS data, what information to store in database system 62, what information, if any, to discard, and in which table to store the particular data included in the POS data. As described above with reference to the premises 16, POS data for cash registers may include the data that is printed on a receipt for each transaction. Each transaction may be separated by one or more delimiters. In certain embodiments, the POS data file received by registrar system 14 from premises 16 is already divided into transactions, and may include an identification of premises 16, an identification of the item that was purchased (if applicable), the time stamp assigned to the POS data, the dollar amount of a purchase, or any other suitable information. Typically, different types of POS devices (e.g., cash registers) may employ different formatting techniques, as described above. In certain embodiments, registrar system 14 may be programmed to process POS data associated with any suitable POS device 30.

Registrar system 14 is operable to communicate POS data to client system 12, in response to a request from client system 12 or on a scheduled basis for example. The request received from client system 12 may include the device ID of a POS device, a start time, an end time, a request for the POS data, and any other suitable information. Registrar system 14 may access the POS data responsive to the request in database system 62 and communicate the responsive data to client system 12. The responsive data communicated to client system 12 may include the device ID of the POS device that generated the data (which would typically match the device ID included in the request), time stamp information, the responsive POS data, and any other suitable information.

Registrar system 14 may also receive a request from a client system 12 to view POS data in substantially real time. In certain embodiments, as described above with reference to premises 16, POS data is only updated to registrar system 14 at predetermined intervals. Thus, in such embodiments, the delay associated with the predetermined time intervals may make it difficult or impossible for registrar system 14 to provide POS data to client system 12 in substantially real-time. To address this problem, in certain embodiments, when a client system 12 communicates a request to registrar system 14 to view POS data in substantially real time, registrar system may prompt computer system 22 at premises 16 to communicate the POS data directly to client system 12, in substantially real time. For example, registrar system 14 may communicate a request to computer system 22 of premises 16 indicating that a particular client system 12 has requested to view POS data in substantially real time. Computer system 22 may then communicate the POS data line-by-line to the requesting client system 12 as the responsive POS data is generated. Client system 12 may include a suitable application for parsing the received POS data and displaying such POS data. Communicating POS data directly from premises 16 to client system 12 may allow POS data to be viewed by client system 12 in substantially real time, if desired. In certain embodiments, communication of POS data directly from premises 16 to client system 12 is performed in addition to communicating the POS data to registrar system 14 for processing and storage at registrar system 14.

In certain embodiments, registrar system 14 is operable to support one or more media functions for facilitating the playback of media at premises 16. For example, registrar system 14 may store one or more media files, in a media library on database system 62 for example. The media files may be organized in any suitable manner, according to particular needs. For example, the media files may be organized by one or more of premises 16, user, media type, a combination of these, or in any other suitable manner. In certain embodiments, a copy of substantially all media files for premises 16 is stored at registrar system 14. Registrar system 14 may also communicate a copy of each media file to the appropriate premises 16.

As described above, registrar system 14 may maintain various schedules, stored in database system 62 for example. Certain of these schedules may specify particular times at which registrar system 14 should prompt computer system 22 at premises 14 to play certain media files. These schedules may be configured by a user of client system 12, for example. A schedule could indicate that a particular media file should be played at one or more particular premises at one or more particular times (e.g., daily at 9:00 a.m., once every thirty minutes between 9:00 a.m. and 5:00 p.m., or at any other suitable times). Media files may also be played back at stores in response to particular events. Registrar system 14 stores the configuration of such events and may prompt computer system 22 at the appropriate premises 16 to play a media file in when certain events are triggered. As a particular example, an alert may be communicated to registrar system 14 by computer system 22 when a customer is using an ATM machine at premises 16. The alert may trigger an event at registrar system 14, and the configuration for the event may indicate that a particular media file should be played to the customer at the ATM (e.g., offering a one-time special on a particular item at premises 16). Registrar system 14 may prompt computer system 22 to initiate playback of the appropriate media file.

In operation, registrar system 14 communicates a message to computer system 22 at a premises 16 when a schedule or event indicates that a particular media file should be played. Computer system 22 may then arrange for the media file to be played. Each media file may be associated with a unique identifier, and that identifier may be included in the request to play the file communicated by registrar system 14. If the computer system 22 determines that it does not have the appropriate media file, computer system 22 may contact registrar system 14 and request the media file.

In certain embodiments, registrar system 14 is operable to process one or more alerts received from premises 16. Such processing may include identifying the type of alert received and initiating an appropriate operation in response to the alert. As described above, computer system 22 at premises 16 may be operable to detect one or more alert conditions (e.g., alerts associated with video devices 26) and communicate the occurrence of the alert to registrar system 14. Registrar system 14 may receive the alert and determine one or more appropriate actions to take in response to the alert. The notification of the alert received from premises 16 may include a unique identifier for the alert (e.g., "alert ID") and an indication that the alert has been triggered. Registrar system 14 may perform further processing in response to receipt of an alert notification.

Additionally or alternatively, registrar system 14 may be operable to determine the occurrence of one or more types of alerts. For example, registrar system 14 may be operable to analyze device data communicated from premises 16 and determine whether one or more alert conditions are present. As particular examples, registrar system 14 may be operable to analyze sensor data, input switch data, output switch data, POS data, or any other suitable type of device data, according to particular needs. Such analysis may include determining whether certain threshold conditions have been met, whether a certain condition has existed for a particular time, or any other suitable type of analysis. As with premises 16, alerts may be detected and triggered in any suitable manner according to particular needs.

A user of client system 12 may configure the types of alerts, what events should cause the detection of an alert, and the suitable action or actions to take in response to the detection of an alert. An action in response to an alert may include, for example, communicating a notification to a user such as a user of client system 12, initiation of a particular operation, or any other suitable action, according to particular needs. The notification may be automatically communicated to the user via a telephone call, an email message, a page, a text message, or in any other suitable manner according to particular needs.

An operation initiated by an alert may include automatically causing a particular device at premises 14 to operate in a particular way in response to the alert. In certain embodiments, this capability of system 10 may allow a premises 16 to be somewhat self-monitoring, without requiring a user of client system 12 or other user to take action to cause a desired or otherwise appropriate action in response to an alert. For example, in response to a particular alert, registrar system 14 may issue a command to one or more output switches at premises 16 to cause one or more lights in the premises 16 to be turned on automatically. The configuration of an alert may include when an alert should be initiated, what action, if any, is to be initiated or performed when the alert is triggered (e.g., communicating a notification to a user), or any other suitable information. As an example, the configuration of an alert may indicate that the alert should be triggered when a predefined amount of motion is detected or when a sensor device detects a certain condition.

As just one particular example, the heating, ventilation, and air-conditioning (HVAC) system at a premises 16 may be controlled based on the monitoring of one or more temperatures at the premises 16. For example, in response to determining that the temperature at a particular premises 16 has exceeded a threshold temperature for a predetermined time (i.e., by monitoring a temperature sensor at the premises 16), registrar system 14 may communicate a command to premises 16 to cause the HVAC system at the premises 16 to adjust its temperature setting as desired. As another particular example, if registrar system 14 determines that a particular door has been open for a predetermined period of time (as specified in the configuration information for the premises 16), registrar system 14 may cause a particular audio file to be played at the premises 16 (e.g., "Please close refrigerator door number five.").

In certain embodiments, registrar system 14 (or alert module 39 at premises 16, if appropriate) may be operable to determine whether a notification has already been sent or whether a particular action has been initiated in response to a particular detected alert. For example, if registrar system 14 determines that a particular temperature sensor has detected a temperature that exceeds a threshold temperature for a predetermined period of time, it may communicate a notification to a user of the appropriate client system 12. Although registrar system 14 may be operable to correct the problem automatically without human intervention (e.g., by communicating a command to adjust the temperature), the configuration information for the premises 16 may specify that the notification be sent to the user. Of course, it may take some time for the temperature to return to an acceptable level in response to the command from registrar system 14, and registrar system 14 may continue to detect the alert condition until that acceptable temperature is reached. Rather than communicate a notification to the user of an appropriate client system 12 each time the alert condition is detected, registrar system 14 may determine that a notification has already been sent within the past 30 minutes and wait a predetermined period of time before communicating a follow-up alert.

Although a single registrar system 14 has been described, the present invention may include any suitable number of registrar systems 14, local or remote from one another. In certain embodiments, each of a plurality of registrar systems 14 may cooperate to perform the functions described above. In certain embodiments, each of a plurality of registrar systems may be dedicated to certain client systems 12, users of client systems 12, and/or premises 16 or types of premises 16. In certain embodiments, each of a plurality of registrar systems 14 may be dedicated to performing certain of the above-described or other functions. For example, a particular registrar system could be dedicated as a media center of system 10.

Client System

As described above, system 10 includes one or more client systems 12. Each client system 12 may include any appropriate input devices, output devices, mass storage media, processors, memory, or other suitable categories for receiving, processing, storing, and/or communicating information. In one embodiment, client system 12 may include one or more computers, such as a personal computer, laptop, workstation, network computer, kiosk, wireless data port, datashow, wireless telephone, personal digital assistant (PDA), one or more processors within these devices, or any other suitable device. It should be understood that system 10 may include any suitable number of client system 12. In one embodiment, client systems 12 may be associated with one or more users. Throughout this description, references to the client system 12 and users of the client system 12 may be used interchangeably. Additionally, although human users are primarily described, the present invention contemplates any actions that may be performed by a human user of client system 12 being performed automatically by client system 12. Client systems 12 may be referred to generally in the singular as client system 12 or in the plural as client systems 12.

Client system 12 may include a client application 70 that is operable to facilitate monitoring, management, and control of one or more premises 16 and one or more devices at one or more premises 16. For example, client application 70 may, in some cases, interact with the registrar system 14 to facilitate monitoring, management, and control of one or more premises 16 and one or more devices at premises 16. As another example, client application 70 may, in other cases, interact directly with premises 16 to facilitate monitoring, management, and control of premises 16 and one or more devices at premises 16. Client application 70 may be an interactive application, and a user of client system 12 may interact with the client application using a user interface (UI) provided by client application 70. Any other type of interface could be used without departing from the scope of the invention.

Client application 70 may include any suitable combination of software, hardware, and firmware. To the extent that the client application comprises software, the client application may be written in any suitable language according to particular needs. For example, the client application may be written in C++, JAVA, or any other suitable language.

In operation of an example embodiment of system 10, a user may start client application 70, by double-clicking an icon representing client application 70 or by selecting client application 70 from a menu of available applications for example. Client application 70 may display a login screen to the user, requesting that the user submit appropriate authentication information (e.g., login ID, username, password, domain) to gain access to the functionality available in system 10 via client application 70. Client application 70 may communicate the authentication information to registrar system 14, which may validate the authentication information based on user configuration information stored at registrar system 14 (e.g., in database system 62). If registrar system 14 determines that the authentication information is invalid, registrar system 14 may return an error to client system 12. If registrar system 14 determines that the authentication information is valid, registrar system 14 may communicate a message indicating that the login attempt was successful, and the display on client system 12 may be refreshed. In certain embodiments, upon determination of a valid login attempt, registrar system 14 may return the current configuration information for devices 24 at one or more premises 16 associated with the user of client system 12. This configuration information may be organized by location and/or premises 16, or in any other suitable manner.

In certain embodiments, once a client system 12 has successfully logged in to registrar system 14, client application 70 may display a list of one or more premises 16 associated with the user of client system 12, a list of one or more devices 24 at each of one or more premises 16 associated with the user of client system 12, or any other suitable information. For example, such information may be displayed in an expandable/collapsible tree structure organized by premises 16 or in any other suitable manner.

A user of client system 12 may configure one or more devices 24 located at premises 16 using client application 70. This may be described as "configuration mode." For example, a user may prompt client application 70 to communicate one or more modifications to the configuration information to registrar system 14, and registrar system 14 may update the configuration information in database system 62.

In certain embodiments, the user interface UI associated with client application 70 may be used to monitor, control, and manage one or more premises 16 and devices 24 at the one or more premises 24. The UI may include one or more windows, each providing certain information to the user. Example displays are described below with reference to FIGS. 4 through 16. In certain embodiments, client application 70 may employ drag-and-drop functionality for instantiating displays of certain information related to devices 24.

Client application 70 is operable to support the display of video data associated with video devices 26 located at premises 16. For example, client application 70 may be operable to support substantially real-time video monitoring of one or more premises 16. In certain embodiments, client system 12 communicates directly with premises 16 to view substantially real-time video data. For example, client system 12 may communicate one or more requests for video data to computer system 22 at premises 16. The request may be communicated in any suitable format and using any suitable protocol, according to particular needs. In certain embodiments, the request is communicated using the HTTP protocol.

The request may include one or more parameters. For example, the request may include a device ID of a camera 34 located at premises 16, an identification of the last video image from the identified video camera 34 that was received by client system 12 (which may be identified by the time stamp information of the video image, for example), and any other suitable information. If client system 12 has not received any images for the identified video device 26 (during the current login session or at start-up, for example), the request may include a parameter indicating that client system 12 has not yet received any images for the identified device 26 (e.g., −1).

In certain embodiments, client system 12 may communicate a request for the video data of multiple video devices 26. This request may be, for example, a single request that includes the unique identifier of each video device 26 desired, as well as any other suitable information. In certain embodiments, client system 12 communicates a new request for each video image. For example, to view video images in substantially real time, client system 12 may communicate requests for video images captured by one or more video devices 26 in rapid succession. The requests may be communicated at any suitable interval, according to particular needs. As just one example, client system 12 may communicate requests for video images every three seconds.

In response to a request for substantially real-time video data, client system 12 may receive from computer system 22 at premises 16 one or more video packets. Each video packet may include one or more of a time stamp of the video image (e.g., video frame) in the packet, the device ID of the video device 26 that captured the video image, the video image, and any other suitable information. Client system 12 is operable to process each received video packet. For example, client system 12 may parse each received video packet to determine the time stamp of the received video image and the device ID of the video device 26 that captured the image. Client system 12 is further operable to display the video image (e.g., in a window of client system 12). In certain embodiments, client system 12 also displays the device ID of the video device 26 that captured the video image (e.g., bathroom, cash register, conference room, etc.), the time indicated by the time stamp of the video image, and any other suitable information.

In operation of an example embodiment of system 10, client system 12 communicates to computer system 22 a first request for a first video image captured by a first video device 26. In response, computer system 22 may communicate a video packet responsive to the request. Client system 12 may parse the received video packet and display the video image. In certain embodiments, client system 12 may also display the device ID of the device 26 that captured the video image, the time identified by the time stamp of the video image, and any other suitable data. Client system 12 may communicate a second request to computer system 22 for a new video image. The request may include the time stamp of the previous video image received from premises 16. Computer system 22 may communicate a next video packet responsive to the request for the next video image.

In certain embodiments, as described above with reference to premises 16, video application 36 at premises 16 may determine whether motion has occurred since the last video image received by client system 12 (as identified by the time stamp included in the request). If video application 36 determines that no motion has occurred since the time stamp included in the request, video application 36 may communicate a video packet that does not include a new video image, but which may include an indication that no motion has occurred since the previous image. The request packet communicated in such a case may also include time stamp information (e.g., for the time stamp of the video image to which the previous video was compared to determine whether motion had occurred) and the device ID. When no motion has occurred, client system 12 may display the previous video image again, possibly updating the time information in accordance with the time stamp included in the video packet. If video application 36 determines that motion has occurred since the time stamp included in the request, video application 36 may communicate a video packet that includes a new video image (e.g., the video image to which the previous video was compared to determine whether motion had occurred), time stamp information for the new video image, the device ID, and any other suitable information.

It should be understood that, in certain embodiments, client system 12 may be communicating requests for video data to computer system 22 in rapid succession such that a second request is communicated before a response to a first request is received. As such, requests for video data and responses to requests for video data may be communicated between client system 12 and premises 16 substantially simultaneously. In certain embodiments, however, client system 12 may not issue a new request for video data until a responsive request packet has been received for the previous request for video data.

In certain embodiments, to preserve disk space for example, received video images included in received video packets are not stored on the hard drive when viewing video images in substantially real time. Instead, each video image may be deleted when a new video image is displayed. However, it should be understood that the present invention is not intended to be so limited. In certain embodiments, viewing video images in substantially real-time may sacrifice some degree of video quality. For example, detailed, fine motion may be degraded or lost. The quality of substantially real-time motion may depend, for example, on the quality of the connection (e.g., link 20) between client system 12 and network 18, and between computer system 22 and network 18. The quality of substantially real-time motion may also depend on the quality of the video images that are communicated (e.g., the amount of compression used), which may affect the amount of time it takes to communicate such video images of links 20 and network 18.

In certain embodiments, client system 12 supports downloading of video data from computer system 22 at premises 16. As an example, a user of client system 12 may wish to view the video images capture from a first time (e.g., 12:00 p.m.) to a second time (e.g., 12:10 p.m.). Client system 12 may communicate a request to computer system 22 to view the video images from a first time to a second time. The request may include the device ID of a video device 26, a first time, a second time, and any other suitable information. The request may be communicated in any suitable format and using any suitable protocol, according to particular needs. In certain embodiments, the request may be communicated using HTTP protocol, although the present invention is not intended to be so limited.

As described above with reference to premises 16, video images may be stored at premises 16, on the hard drive of computer system 22 for example. Additionally, as described above with reference to premises 16, computer system 22 may retrieve stored video images responsive to the request. For example, computer system 22 may retrieve the video images captured by the device 26 specified in the request, from the start time to the end time specified in the request. Computer system 22 may communicate one or more video packets comprising the responsive video images. In certain embodiments, each video image in the one or more video packets may be associated with a time stamp. Additionally, for times when no motion was determined by video application 36 to have occurred, the video packet may include a time stamp without an associated video image. This time stamp information may be used by client system 12 to determine when to display the images in the one or more video packets. The responsive video images may each be communicated in its own video packet or collectively as a single video packet. In this way, a user of client system 12 may be able to download substantially all available images for a particular time frame.

In certain embodiments, client system 12 stores the received video images. For example client system 12 may store received video images in a single folder. Client system 12 may mark the folder with a time stamp and may also name the folder (e.g., "Downloaded Video, Front Camera, 4:00). Client system 12 may play the responsive video frames in order and at the appropriate times (e.g., based on the time stamp associated with each video image).

In certain embodiments, downloading video data to client system 12 in the manner described above may improve the playback of video images captured by video equipment at premises 16 when viewed from remote client system 12. For example, any latency in the various connections between client system 12 and computer system 22 will likely be irrelevant because the images are being played from the hard drive of client system 12, which may improve the fluidity of movement when playing back the video images. In this manner, the above-described technique may provide remote, on-demand, retrieved, substantially full-motion video. Additionally, the downloaded video images are saved on the hard drive of computer system 12 and may remain stored until a user associated with client system 12 deletes them. This may be useful, for example, if the video provides evidence of a certain event, such as a crime or negligent activity/inactivity. The downloaded videos may also be recorded from the hard drive onto a suitable recordable medium such as a CD-ROM.

In certain embodiments, client application 70 may be integrated with an email application, so that downloaded video data may be mailed electronically. For example, if a user of client application 70 downloads a video that show a particular event such as a crime, the downloaded video may be emailed to one or more appropriate email addresses (e.g., of law enforcement or a private security company). In certain embodiments, a user may right-click on an icon representing the downloaded video, a menu will be displayed, and the user may select to email the downloaded video associated with the icon. This may reduce or eliminate the need to first record the downloaded video to a recordable medium before forwarding the video to one or more particular persons. The email application may include any suitable email application such as Microsoft Outlook, Novell Groupwise, or any other suitable email application. Additionally, if appropriate or desired, a suitable compression algorithm or application may be used in conjunction with this email feature, to reduce the size of the file or files being transmitted by email for example.

Client application 70 may display video data, whether downloaded video or real-time video, in one or more windows on a display associated with client system 12. A user of client application 70 may be able to perform various video control operations such as rewind, fast-forward, pause, and so on, on the video data being displayed in a window.

In certain embodiments, client application 70 is operable to support the retrieval and display of POS data. For example, client system 12 may be operable to initiate retrieval of transaction data generated by one or more cash registers at premises 16.

Client application 70 may be operable to support both substantially real-time display of POS data and display of stored POS data. In certain embodiments, to support the display of substantially real-time data, client application 70 may communicate one or more requests to computer system 22 at premises 16 for the retrieval of POS data associated with a particular POS device 30. The request may include the device ID of the POS device 30 from which client system 12 is requesting to display the associated POS data. In particular embodiments, client system 12 communicates a single request to computer system 22 to view substantially real-time POS data for a particular POS device 30. A connection for supporting the transmission of the POS data from computer system 22 to client system 12 may remain open until client system 12 closes the particular POS device 30, indicating a desire to stop receiving POS data for the POS device 30. This may reduce the number of requests being communicated between client system 12 and computer system 22.

Client application 70 may also be operable to support the display of stored POS data. In certain embodiments, client system 12 communicates requests for stored POS data to registrar system 14. For example, client system 12 may communicate to registrar system 14 a request for POS data for a particular time period. Client system 12 may receive the responsive POS data, and client application 70 may parse and display the received POS data in any suitable manner.

Client application 70 may be operable to generate one or more reports based on the POS data stored at registrar system 14. For example, in certain embodiments, a user of client application 70 can search the POS data stored at registrar system 14 based on one or more parameters. These parameters may include any suitable parameters, depending on the configuration of the system and the format in which POS data is stored at registrar system 14. As just one example, a user of client system 12 may search for all transactions in the past two days involving a particular type of product.

Client system 12 may include the ability, when parsing received POS data, to identify certain types of transactions. For example, certain transactions may be predefined as high-risk, fraudulent, or otherwise notable. As a particular example, transactions exceeding a predefined dollar amount may be identified. As another example, a transaction involving a single purchase of a high number of products of the same type may be identified (e.g., ten cases of beer). As another example, a "void" or "no-sale" transaction may be identified. Client application 70 may highlight or otherwise mark those identified transactions when displaying the responsive POS data. This may allow a user of client system 12 to easily identify those transactions when reviewing the display of the POS data.

In certain embodiments, client application 70 is operable to support retrieval and display of facility management device data associated with facility management devices 28 located at premises 16. Although the support of certain example facility management devices 28 is described below, client system 12 may support the retrieval and display of any suitable facility management data for any suitable facility management device 28 in a substantially similar manner.

Client application 70 may support the retrieval and display of temperature data for one or more temperature devices 42 located at premises 16. Client application 70 may communicate a request to registrar system 14 for temperature data relating to a temperature device, and registrar system 14 may return the responsive temperature data to client system 12. Client application 70 may display the responsive temperature data in any suitable manner, according to particular needs. As one non-limiting example, temperature data for a particular temperature device 42 may be displayed in a line graph, the x-axis representing time, the y-axis representing temperature. In certain embodiments, temperature data for multiple temperature devices 42 may be displayed on a single graph.

Client application 70 may also support the retrieval and display of input switch data of one or more input switches 44 located at premises 16. Client application 70 may communicate a request to registrar system 14 for input switch data relating to an input switch 44, and registrar system 14 may return the responsive input switch data to client system 12. Input switch data may be displayed in any suitable manner, according to particular needs. As one non-limiting example, input switch data for a particular input switch 44 may be displayed as a band on a graph, with the x-axis representing time. The band may represent the state of the input switch 44 and may extend from the y-axis perpendicular to the y-axis. The band may be color-coded such that a first color indicates a first state of the switch (e.g., green indicates a closed state) and a second color indicates a second state of the switch (e.g., red indicates an open state). The band may also indicate a latch state, if appropriate. For example, a diamond or other marker may be displayed on the band to indicate a latch state. In certain embodiments, input switch data for multiple input switches 42 may be displayed on a single graph. Additionally, input switch data may be displayed on a single graph with temperature or other data.

Client application 70 may be operable to support the monitoring and control of one or more output switches 46 located at premises 16. For example, a user of client application 70 may be able to request the state of an output switch 46. In certain embodiments, such requests are communicated to registrar system 14. If registrar system 14 does not already have the responsive device data for the output switch 46 that is identified in the request, registrar system 14 may request the state of the output switch 46 (e.g., on or off) from computer system 22, and may return the result to client system 12. As another example, a user of client application 70 may be able to issue commands to affect the state of one or more output switches 46 or other suitable devices 24 located at premises 16. Such a command may be communicated to registrar system 14, which may then communicate the command to computer system 22. As an example, a particular output switch 46 may control the state of one or more lights (e.g., on or off). The user may issue a command to turn the one or more lights associated with the output switch 46 on or off by issuing a command to registrar system 14 that identifies the appropriate output switch 46. Additionally or alternatively, such commands may be communicated directly to computer system 22 at premises 16.

As described above, client application 70 may display video data, device data of one or more facility management devices, POS data, and any other suitable data in one or more windows on a display of client system 12. For example, the client application may display a plurality of tiled windows on a display of client system 12, each comprising data for one or more devices located at premises 16. One window may display video data for a particular video device, while another window may display data associated with one or more sensors, for example. In certain embodiments, client application 70 can simultaneously display device data for devices 24 at different premises 16.

Client application 70 may be operable to correlate in time the display of information for one or more devices 24 located at one or more premises 16. It may be desirable to correlate in time two or more of the displays such that the data displayed in one window matches in time the data displayed in another window. As an example, a user of client application 70 may review a particular event by correlating in time the display for an input switch 42 associated with a door and the displays of one or more cameras devices 34 depicting various angles of the appropriate scene. For example, if a particular input switch 42 indicates that a door has been left open that was supposed to be closed and some problem resulted from the open state of the door, the user of client application 70 can correlate in time the displays of one or more camera devices 34 and of one or more other devices 24, allowing the user to determine what had happened at that location when the door was left open. In this manner, any of the displays associated with any of devices 24 located at premises 16 may be correlated in time and viewed simultaneously.

In certain embodiments, to facilitate this correlation-in-time functionality, client application 70 enables a user to create one or more display groups. For example, a user may click on the display associated with a first device 24 and select to add the display for the first device 24 to a display group. A list of available display groups may be provided to the user, and the user may select one or more of those display groups. Client application 70 may maintain an object or other suitable data structure for each group, identifying which displays associated with which devices 24 should be correlated in time.

The correlation-in-time functionality may allow a user to select a particular time within a display for a particular device 24, and the displays of all devices belonging to the display group of the particular time may be updated to the particular time. For example, if a user is simultaneously viewing temperature data in one window and video data in another window, if the user rewinds the video display, the temperature display will also back up in time. As another example, if the user is viewing three different scenes captured by three different camera devices 34 all selected to be in the same display group, the user can move around in the scene (e.g., rewind, fast forward, pause, slow down, spatially move, etc.) by controlling one display for one camera device 24, and the displays of all three cameras 34 will move in the same manner, correlated in time. As another example, POS data for a POS device 30 may be displayed in one window and a video view of an area around the POS device 30 at premises 16 may be displayed in another window. A user may add the views of both of these devices 24 to a single display group and be able to see what is occurring at a particular time.

In certain embodiments, correlating in time the displays associated with devices 24 may be performed based on the time stamp information associated with the data for the various devices 24. For example, when two or more device displays are correlated in time, a new request type may be used by client application 70. When a user makes a request for device data associated with a particular device 24 in a display group, requests for device data for each of the devices 24 in the display group may be substantially simultaneously made, each specifying the same time stamp information. Suppose, for example, a display group includes a display for a particular video device 26 and a display for a particular POS device 30. If the user rewinds the display for the video device 26 by one minute, a new request for video data may be made requesting video data with the appropriate time stamp. Substantially simultaneously, a new request for POS data may be made requesting POS data with the same time stamp. In certain embodiments, a user may also be able to correlate in time the display of device data for devices 24 at multiple premises 16, which operates in a substantially similar manner.

Client system 12 may also support what may be referred to as reverse correlation in time. For example, suppose a customer calls the owner of premises 16 (who may also be a user of a client system 12) and claims that yesterday he received an incorrect amount of change. The user of client application 12 may request the POS data for the appropriate cash register 48 and scroll through the data until the appropriate transaction is identified. Suppose that the user then would like to see the video data for a video device 30 capturing the area around the cash register 48 that processed the identified transaction. From the window displaying the POS data for cash register 48, the user can select to correlate in time the video display for the appropriate video device 34 by adding the appropriate video device 26 to the display group of the POS data.

Correlation-in-time functionality may provide a valuable tool to users of client application 70. For example, this functionality may allow users to recreate scenes by viewing device data for various video devices 26, facility management devices 28, POS devices 30, and any other suitable devices 24. This may allow users of client application 70 to determine many of the circumstances or activities that led up to a particular event. A user may be able to create any suitable number of groups simultaneously, each correlated to a different time if desired. Additionally, the displays that are correlated in time may be associated with a number of geographically disperse premises 16, each operating in any time zone. Moreover, each display within a group may be associated with a different device or device type, and such displays may be correlated in time.

Client application 70 may also support the creation of reports for POS data. For example, using client application 70, a user may communicate a query for POS data to registrar system 14. The query may include any suitable parameters, according to particular needs. For example, the parameters may specify a dollar amount, an item type, a date/time range, or any other suitable parameters. As a particular example, a user may submit a query requesting all transactions involving the purchase of a particular item during yesterday's business hours.

Registrar system 14 may return the appropriate POS data responsive to the query, and client application 70 may display the responsive POS data in any suitable format. For example, client application may generate and display one or more spreadsheets that include the responsive POS data. In the displayed spreadsheet, each parameter included in the query (and any other suitable fields) may be associated with a column in the spreadsheet. A variety of operations such as sorting may be performed on the POS data displayed in the spreadsheet.

Client application 70 may allow a user to select a particular transaction in the spreadsheet, by dragging and dropping the line of transaction data in the spreadsheet corresponding to the transaction into a window for a cash register device 48, and a request for the POS data corresponding to the particular transaction may be communicated to registrar system 14. Registrar system 14 may communicate the responsive POS data, which may include a copy of the information included in the receipt generated for the selected transaction. Client application may then display a copy of the POS data included in the receipt for the selected transaction. Additionally, a user may request the video data corresponding to the transaction, and a request for the video data, including the appropriate device ID and time stamp information corresponding to the time of the transaction, will be communicated to computer system 22 at the appropriate premises 16.

Client application 70 may be operable to support the media capabilities of system 10, described above with reference to registrar system 14 and premises 16. For example, a user of client application 70 may specify one or more media files to be played at one or more appropriate times. As one particular example, a user of client system 12 can communicate a media file to registrar system 10. The media file could be recorded by the user of client system 12. For example, if the user wants to broadcast a particular message, such as a marketing message, at premises 16, the user may record the audio message at client system 12 and communicate the audio file to registrar system 14 with instructions specifying when to play the audio file at premises 16 (e.g., play this media file immediately or play it at one or more scheduled times). The media file could be any file accessible to client system 12. In certain embodiments, the media file is communicated to registrar system 14, which handles the received media file in the manner described above with reference to registrar system 14.

A user of client application 70 may also create schedules specifying one or more times at which media files should be played. For example, the user may request that a particular media file be played at one or more particular times (e.g., every morning at 9:00 a.m., once every hour, once every thirty minutes from 9:00 a.m. to 5:00 p.m., etc.), along with an identification of which premises should play the media file. As another example, the user of client application 70 may request that a particular media file be played upon the occurrence of one or more events. The playback of a particular media file could be triggered by one or more of the sensors at premises 16. For example, the presence of a customer at an ATM might trigger an audio broadcast welcoming the customer to a particular branch of the bank and informing the customer of a special offer that is good for that day only.

In certain embodiments, the configuration of some or all of the devices 24 and premises 16 supported by system 10 may be specified using client application 70 at client system 12. For example, a user may specify schedules for one or more of devices using the client application 70. The configuration may include the configurations for playback of media files, the configuration and scheduling of alerts for video, the configuration of a hierarchy of premises and devices associated with a user, the configuration of user information, and any other suitable configurations, according to particular needs.

Using client application 70, a user can create any number of users who have access client application 70 and its associated functionality. Each user may be assigned one or more user permission levels. For example, a user may be granted permission to view particular devices 24 at one or more premises, to configure devices 24 at one or more premises, to modify user settings, to schedule and record media for playback, or any other suitable permissions according to particular needs. In certain embodiments, a user may be granted a permission level granting the user the rights to perform any suitable operations using client application 70 (e.g., a "super user").

Communications between the various components of system 10 may be according to any suitable protocol and in any suitable format, according to particular needs. As just one example, certain communications may be sent using HTTP protocol and the content of the communications may be in XML format. As another example, the format of the content of the communications may be in text format.

In certain embodiments, system 10 may include any suitable types of security capabilities to maintain the confidentiality of communications and data sent and stored throughout system 10. For example, communications sent throughout computer system may be communicated in HTTP-S or another secure format. Additionally or alternatively, one or more headers may be added to communications to allow for authentication at each of the components of system 10.

Although system 10 has been described primarily as allowing a user of client system 12 to monitor, control, and manage one or more premises 16 or one or more devices at premises 16 using registrar system 14, in certain embodiments, the present invention contemplates allowing a client system 12 to connect directly to one or more premises 16, in an offline or local mode for example, without requiring a connection to registrar system 14 by client system 12. This feature may allow the user of client system 12 to remotely monitor, control, and manage the one or more premises 16 and devices at premises 16 directly without using registrar system 14. This may be useful, for example, if registrar system 14 needs to be taken down for maintenance or is otherwise unavailable, although the present invention contemplates using this feature for any suitable purposes, according to particular needs. When connecting directly to premises 16, it may be desirable for client system 12 to log on to registrar system 14 for authentication and to download configuration information. This log on may be performed as often as desired. Additionally, in certain embodiments, it may be desirable to limit the amount of time (e.g., one week) that a client system 12 can connect directly to premises 16 without first logging on to registrar system 14. For example, if the operator of registrar system 14 is charging a fee for the use of system 10, it may be desirable for that operator to be able to block access by a client system 12 to a premises 16.

Particular embodiments of the present invention may provide one or more technical advantages. In certain embodiments, the present invention combines the use of control systems and sensors with video applications; whereas, typical existing systems are either control systems or they are video monitoring systems. In certain embodiments, the present invention provides the ability to synchronize the view of various sensors, POS data, and/or video data. In certain embodiments, the present invention provides the ability to integrate audio files and broadcast them upon predetermined events, at predetermined times, or both. In certain embodiments, the present invention provides a system 10 that operates actively, allowing a user or computer system to actively monitor or control a remote premises 16. Additionally or alternatively, in certain embodiments, the present invention provides a system 10 that operates passively by receiving events and executing one or more corresponding actions (e.g., communicating an alert, delivering an audio message, turning on a light, or any other suitable action) in response to those events. In certain embodiments, the architecture of the present invention comprising a local client system 12, one or more computer systems 22 located at a premises 16, and a high performance registrar system 14 enables conservation of bandwidth in connections to remote premises 16 and management of the large amounts of data acquired from the various devices.

Figure 2:
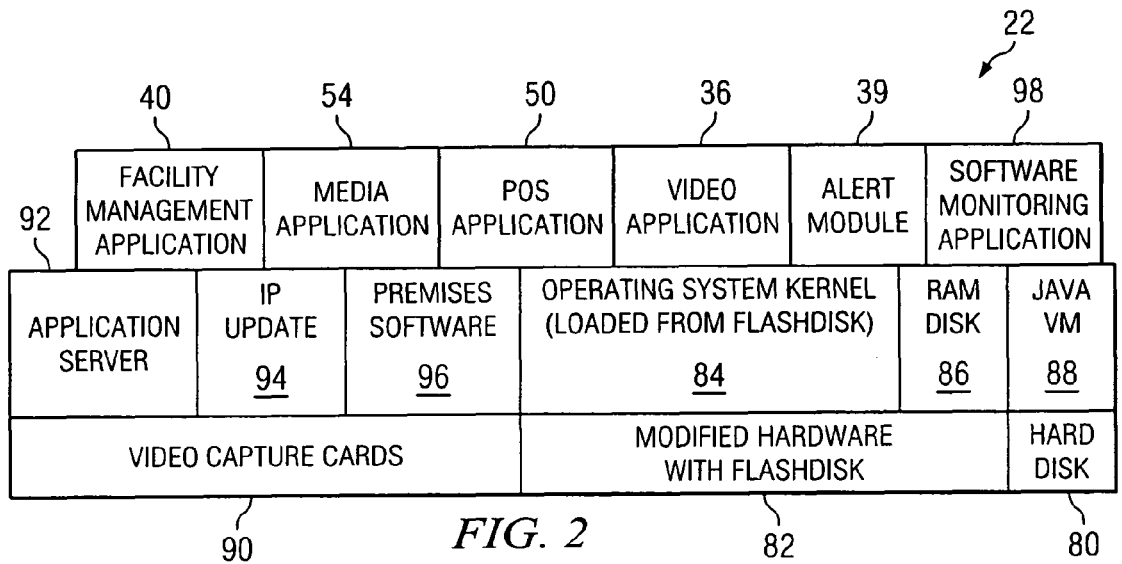
FIG. 2 illustrates a software and hardware stack diagram of an example computer system located at a premises.

FIG. 2 illustrates a software and hardware stack diagram of an example computer system 22 located at premises 16. Although computer system 22 is described as including particular components, the present invention contemplates computer system 22 comprising any suitable components according to particular needs.

Computer system 22 comprises a hard disk 80, which may be any suitable size according to particular needs. In certain embodiments, computer system 22 may include a flashdisk 82 inserted in a hard disk slot of computer system 22. Computer system 22 further includes operating system software 84. In certain embodiments, operating system software 84 comprises LINUX operating system software, although the present invention contemplates operating system software 84 being any suitable software, according to particular needs. Operating system software 84 and its associated utilities may be installed on flashdisk 82, which may help prevent the operating system from crashing or otherwise failing. In certain embodiments, computer system 22 creates a RAM disk 86 at run-time from which operating system software 84 may run. Computer system 22 may also include a JAVA Virtual Machine 88, if appropriate (e.g., if one or more applications stored on computer system 22 are written in JAVA for example).

Computer system 22 may include one or more video capture cards 90, each operable to collect video data captured by one or more video devices 26. Each video capture card 90 may include any suitable number of video boards each operable to be connected to a video device 26 in any suitable manner. Video application 36 may interact with one or more video capture cards 90 to access the video images captured by each video device 26.

In certain embodiments, computer system 22 includes an application server 92 operable to handle communication and receipt of messages from client system 12, registrar system 14, or any other suitable component of system 10. In certain embodiments, application server 92 comprises a web application server, such as a Tomcat server or any other suitable type of web application server. Although application server 92 is described as handling communication and receipt of messages for computer system 22, the present invention contemplates computer system 22 communicating and receiving messages using any suitable tool and in any suitable manner.

In certain embodiments, computer system 22 includes an IP address update module 94. For example, in certain embodiments, each time computer system boots up or establishes a new connection with network 18, computer system 22 may be assigned a new IP address. IP address update module 94 may communicate the new IP address to registrar system 14, which may update the IP address information for premises 16 stored in database system 62 of registrar system 14.

Computer system 22 may include various types of premises software 96. For example, as described above with reference to FIG. 1, premises software 96 may include one or more video applications 36, one or more facility management applications 40, one or more POS applications 50, one or more media applications 54, one or more alert modules 39, and any other suitable applications according to particular needs.

In certain embodiments, computer system 22 may include a software monitoring application 98 operable to monitor one or more applications (e.g., premises software 96) running on computer system 22. Software monitoring application 98 may be operable to determine whether an application being monitored by software application 98 encounters a problem. If such a problem is detected by software monitoring application 98, software monitoring application 98 may initiate a restart of the application that encountered the problem, or otherwise resolve the problem. In certain embodiments, software monitoring application 98 may initiate communication of a notification to one or more appropriate recipients, indicating that such a restart or other resolution was performed. The notification may also include certain details related to the encountered problem.

Figure 3:
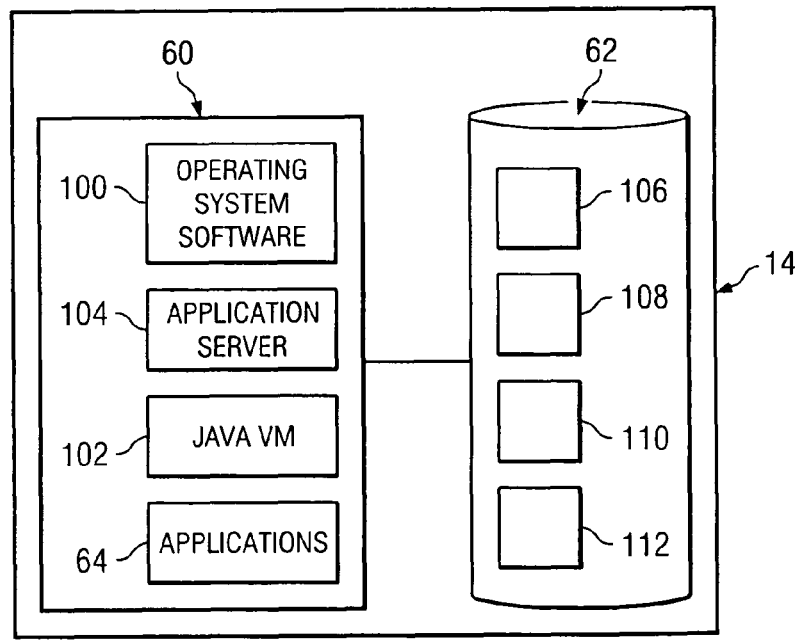
FIG. 3 illustrates an example registrar system, which may be used in certain embodiments of the system.

FIG. 3 illustrates an example registrar system 14, which may be used in certain embodiments of system 10. Although registrar system 14 is described as including particular components, the present invention contemplates registrar system 14 comprising any suitable components operable to perform the appropriate functions described herein.

Registrar system 14 includes server system 60 and database system 62, as described above with reference to FIG. 1. Server system 60 may include any suitable operating system software 100, such as WINDOWS 2003, according to particular needs. Server system 60 may also include a JAVA Virtual Machine 102, if appropriate (e.g., if one or more applications stored on server system 60 are written in JAVA for example).

In certain embodiments, server system 60 includes an application server 104 operable to handle communication and receipt of messages from client system 12, computer system 22 at premises 14, or any other suitable component of system 10. In certain embodiments, application server 104 comprises a web application server, such as a Tomcat server or any other suitable type of web application server. Although application server 104 is described as handling communication and receipt of messages for registrar system 14, the present invention contemplates registrar system 14 communicating and receiving messages using any suitable tool and in any suitable manner.

Server system 60 may include one or more management applications 64 supporting the various functionalities described in the present disclosure. For example, management applications 64 may include applications supporting the parsing and storing of data received from premises 16 or from client system 12. As another example, management applications 64 may include applications supporting the control of one or more devices at premises 16, in response to commands received from client system 12 or based on one or more schedules stored at registrar system 14 for example.

Database system 62 may be operable to store any suitable information associated with the remote monitoring, control, and management of premises 14. This information stored in database system 62 may be organized in any suitable manner, such as in one or more tables database system 62.

In certain embodiments, database system 62 stores user configuration information 106 for one or more users of client system 12. User configuration information 106 may include an identification of what user rights have been assigned to the users. These user rights may include one or more of: which of multiple premises 16 the user may view using client application 70; which locations of particular premises 16 the user may access; an identification of which particular devices 24 a user can view; an identification of which particular devices 24 for which the user can modify the configuration; or any other suitable rights according to particular needs. As just one example, a user may be granted user rights to view and modify all video devices 26 in all Dallas locations of a particular fast food restaurant. In certain embodiments, a super user may be granted user rights to view and modify all devices 24 at all premises 16 in system 10 associated with that user. User configuration information 106 may also include user authentication information for users of client systems 12. For example, each user may be associated with a user name, a password, a customer name, a domain name, or any other suitable information. User configuration information 106 may be organized in database system 62 in any suitable manner.

In certain embodiments, database system 62 stores premises configuration information 108 for each premises 16. Premises configuration information 108 may be organized in database system 62 according to the premises 16 with which it is associated. Premises configuration information 108 for premises 16 may include configuration information for computer system 22 located at premises 16, including the current IP address associated with premises 16. Premises configuration information 108 may also include configuration information for each device 24 at each premises 16. Storing premises configuration information 108 for each premises 16 at registrar system 14 may increase the robustness of system 10. For example, the premises configuration information 108 for a particular premises 16 may be preserved in the event that devices 24 or computer system 22 at the particular premises 16 encounters a failure or other system crash. A new computer system 22 may be installed at the particular premises 16 and configured based on the premises configuration information 108 stored at registrar system 14 for the particular premises 16.

Premises configuration information 108 for each premises 16 may also include the configuration information for the various schedules described in the present disclosure. The schedules may include, for example, schedules for communicating commands to certain premises 16 to cause certain devices 24 to operate in a particular manner. For example, the schedules may specify when certain media files should be played at premises 16. As another example, the schedules may specify when the state of a particular output switch 46 should be affected. Additionally, premises configuration information 108 may include the configuration of alerts, including what events may trigger alerts and what actions should be taken in response to identification of an alert.

Database system 62 may also store device data 110 reported by the various devices 24 at premises 16, as described above with reference to FIG. 1. Device data 110 may be organized according the premises 16 with which it is associated. Database system 62 may also store one or more media libraries 112 each storing one or more media files. Media libraries 112 may be organized according the premises 16 with which they are associated.

Table 1.1 below includes a list of example tables that may be used to organize some or all of the configuration data, device data, or other suitable data stored in database system 62. The tables listed in Table 1.1 merely represent a non-limiting example. Certain of the tables listed may not be required and others not listed may be included and still fall within the spirit and scope of the present invention. Additionally, although an indication of whether the tables are partitioned or not is included in Table 1.1, each table listed in Table 1.1 may be either partitioned or not, according to particular needs.

TABLE 1.1

| Table | Tablespace | Partitioned |
|---|---|---|
| ADDRESS | VMS_DATA1 | No |
| ADVSCHEDULE | VMS_DATA1 | No |
| ALERT | VMS_DATA1 | No |
| ALERTADVSCHEDULE | VMS_DATA1 | No |
| ALERTADVSCHEDULECONTACT | VMS_DATA1 | No |
| ALERTATTRIBUTES | VMS_DATA1 | No |
| ALERTCONTACT | VMS_DATA1 | No |
| ALERTHISTORY | VMS_DATA1 | No |
| ALERTSCHEDULE | VMS_DATA1 | No |
| ALERTSCHEDULECONTACT | VMS_DATA1 | No |
| ALERTSCHEDULEDEVICE | VMS_DATA1 | No |
| ATTRIBUTE | VMS_DATA1 | No |
| CONFIGLOCK | VMS_DATA1 | No |
| CONTACT | VMS_DATA1 | No |
| COUNTRY | VMS_DATA1 | No |
| COUNTRYLANGUAGE | VMS_DATA1 | No |
| COUNTRYTIMEZONE | VMS_DATA1 | No |
| COUNTRYZONE | VMS_DATA1 | No |
| CURRENCY | VMS_DATA1 | No |
| CUSTOMER | VMS_DATA1 | No |
| CUSTOMERADDRESS | VMS_DATA1 | No |
| CUSTOMERCONTACT | VMS_DATA1 | No |
| CUSTOMERNOTES | VMS_DATA1 | No |
| DEVICE | VMS_DATA1 | No |
| DEVICEADVSCHEDULE | VMS_DATA1 | No |
| DEVICEATTRIBUTE | VMS_DATA1 | No |
| DEVICEATTRIBUTESCHEDULE | VMS_DATA1 | No |
| GROUPS | VMS_DATA1 | No |
| HIERNODE | VMS_DATA1 | No |
| LANGUAGE | VMS_DATA1 | No |
| LASTRUN | VMS_DATA1 | No |
| LOGIN_TRACE | VMS_DATA1 | No |
| MEDIA | VMS_DATA1 | No |
| MEDIASCHEDULE | VMS_DATA1 | No |
| MEDIATRANSCRIPT | VMS_DATA1 | No |
| NOTES | VMS_DATA1 | No |
| OW_DATA | VMS_DATA1 | No |
| POS_TEMPERATURE_ALERTS | VMS_DATA1 | No |
| POS_TEMPERATURE_DTLS | VMS_DATA1 | No |
| POS_TRANSACTION | VMS_DATA1 | No |
| POS_TRANSACTION_BODY | VMS_DATA1 | No |
| POS_TRANSACTION_DETAILS | VMS_DATA1 | No |
| POS_TRANSACTION_ITEM | VMS_DATA1 | No |
| STORE | VMS_DATA1 | No |
| STOREADDRESS | VMS_DATA1 | No |
| STORECONTACT | VMS_DATA1 | No |
| STORENOTES | VMS_DATA1 | No |
| STORESHIFTS | VMS_DATA1 | No |
| STORETEST | VMS_DATA1 | No |
| USERCONTACT | VMS_DATA1 | No |
| USERRIGHTS | VMS_DATA1 | No |
| USERS | VMS_DATA1 | No |
| USERSTORE | VMS_DATA1 | No |
| USERVISIBILITY | VMS_DATA1 | No |
| ZONE | VMS_DATA1 | No |

Although certain components of registrar system 14 have been described, the present invention contemplates registrar system including any suitable components, according to particular needs. Additionally, although particular example components of server system 60 have been described, the present invention contemplates server system 60 comprising any components suitable for facilitating remote monitoring, control, and management of one or more premises 16 using one or more client systems 12. Furthermore, although database system 62 has been described as storing particular information, database system 62 may store any suitable information according to particular needs.

FIGS. 4-17 illustrate example displays that may be generated by client application 70 at client system 12. For example, client application 70 may display one or more of these displays during user interaction with client application 70. It should be understood that the displays illustrated in FIGS. 4-17 merely provide example displays. Any suitable displays may be generated by client application 70 without departing from the spirit and scope of the present invention.

Figure 4:
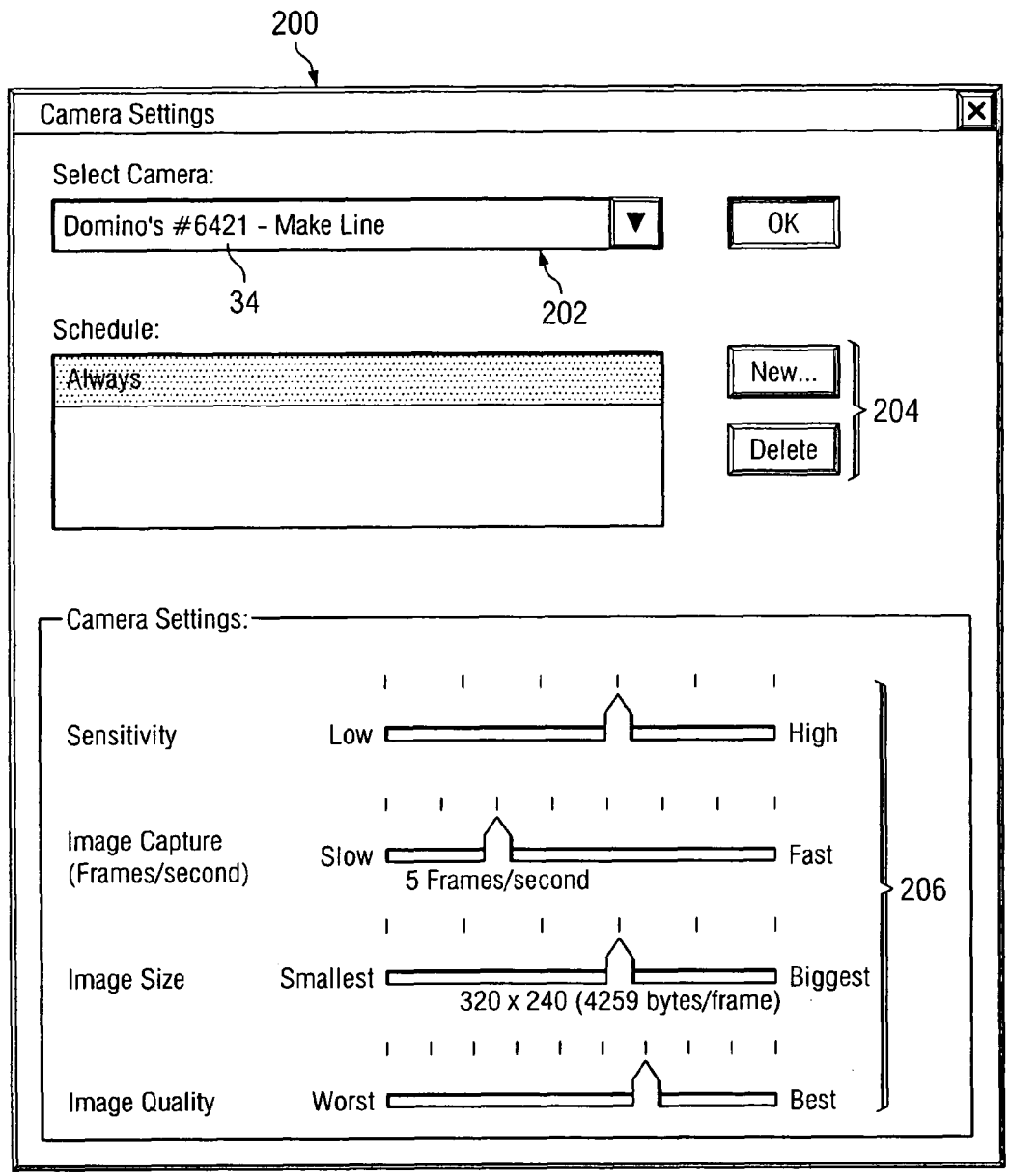
FIG. 4 illustrates an example display for configuring a video camera located at a premises.

FIG. 4 illustrates an example display 200 for configuring a video camera 34 located at a premises 16. Display 200 includes a camera-selection menu 202 for selecting a camera 34 to be configured. Display 200 also provides scheduling tools 204 for selecting, creating, and modifying schedules at which times the selected configuration will apply. Display also includes a plurality of configurable camera settings 204. In example display 200, configurable camera settings include sensitivity, image capture frequency (e.g., frames-per-second), image size, and image quality. The present invention contemplates any suitable configurable camera settings 204, according to particular needs.

Figure 5:
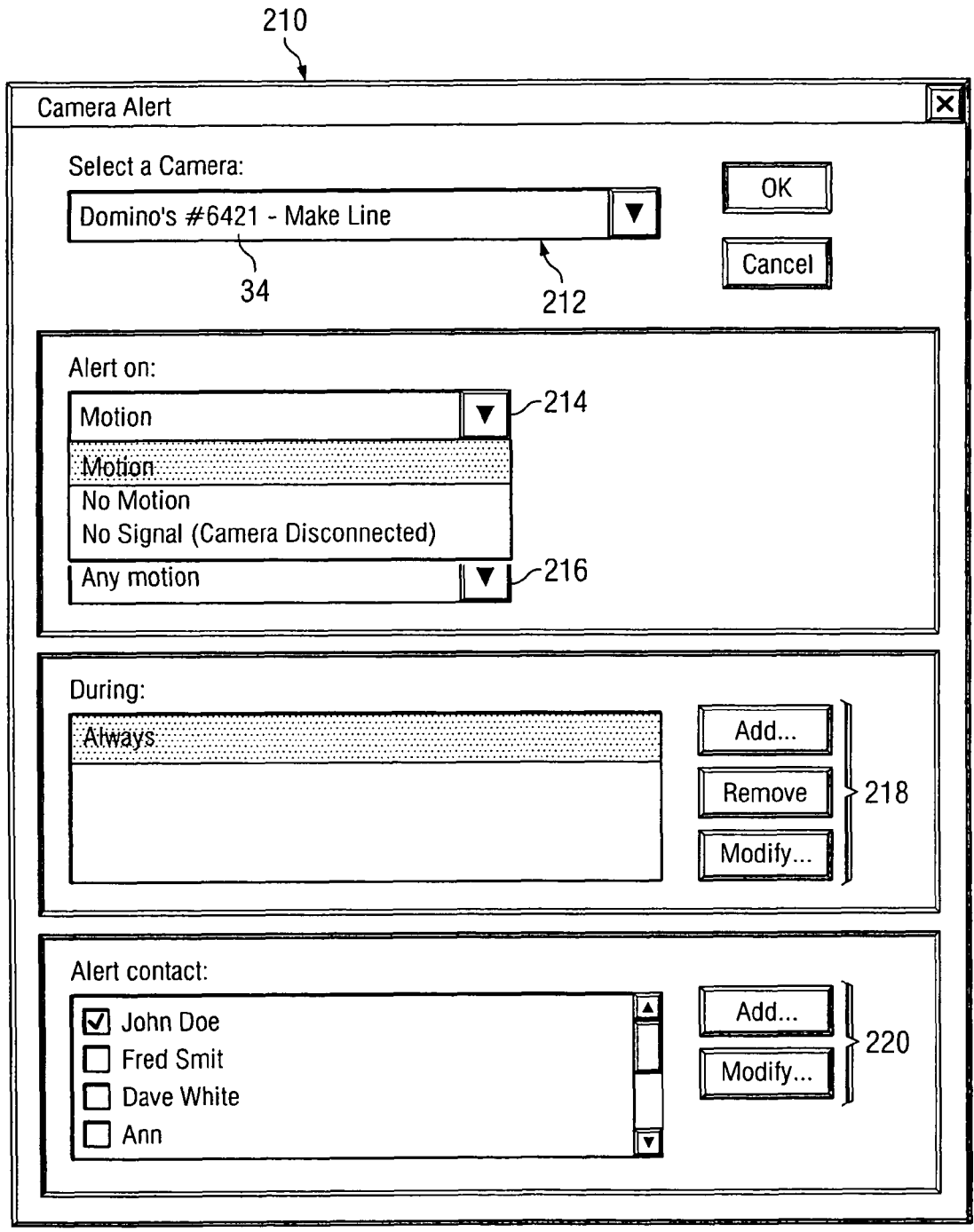
FIG. 5 illustrates an example display for configuring camera alerts for a camera located at a premises.

FIG. 5 illustrates an example display 210 for configuring camera alerts for a camera 34 located at a premises 16. Display 210 includes a camera-selection menu 212 for selecting a camera 34 for which alerts are to be configured. Display 210 also includes selection menus 214 and 216 for selecting when an alert should be generated and what degree of motion should generate the alert, respectively. Display 210 includes a scheduling tool 218 for specifying when a particular alert should be active. Additionally, display 210 includes notification tools 220 for selecting one or more users or other individuals to be notified when an alert is generated.

Figure 6:
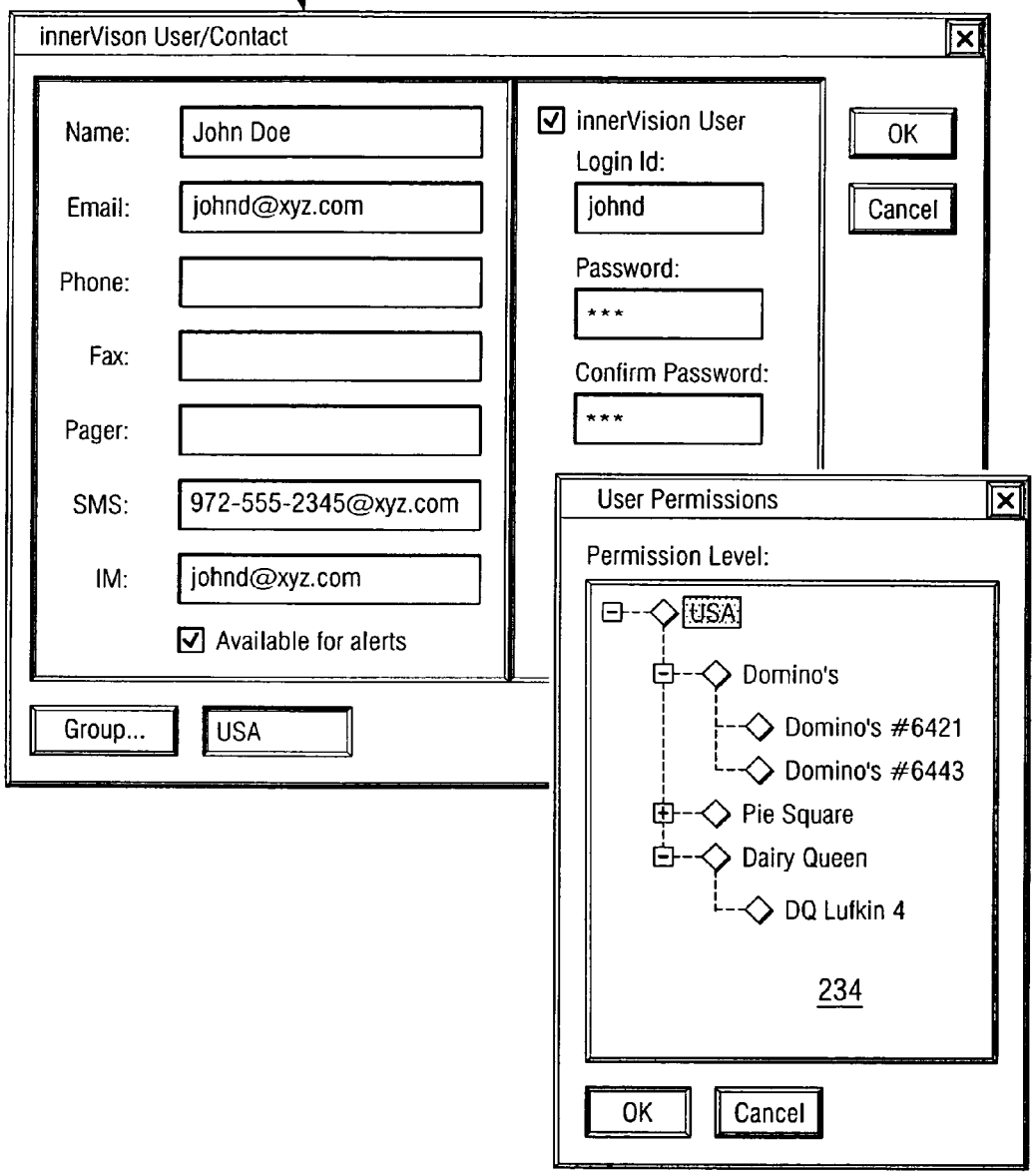
FIG. 6 illustrates an example display for specifying certain user configuration information for a user of a client system.

FIG. 6 illustrates an example display 230 for specifying certain user configuration information for a user of client system 12. Display 230 includes a user contact information panel 232 and a user permissions window 234. User contact information panel 232 includes text boxes for modifying user contact information and other information associated with a user. User permissions window 234 displays an expandable tree of premises 16 for which permissions for this user may be modified.

Figure 7:
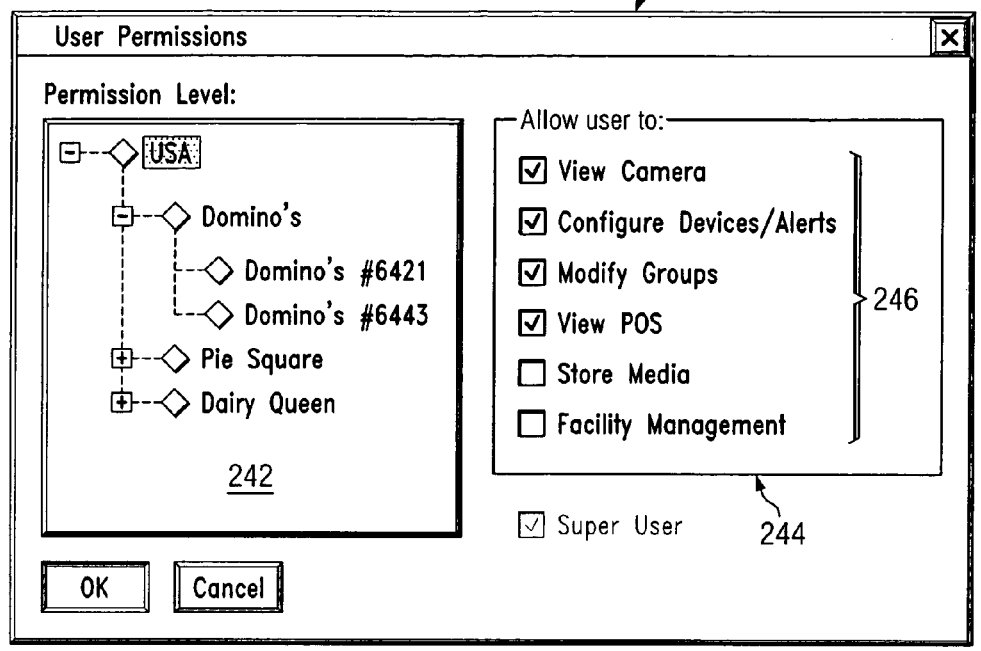
FIG. 7 illustrates an example display for specifying permission levels for a user of a client system.

FIG. 7 illustrates an example display 240 for specifying permission levels for a user of client system 12. Display 240 includes an expandable tree 242 of premises 16 for which permissions for this user may be modified. Area 244 includes a list of example permission levels 246 that may be selected or de-selected. In this example, permission levels 246 include rights to view cameras 34, rights to configure devices 24 and alerts, rights to modify groups, rights to view POS data, rights to store media files, and rights to perform facility management operations. The present invention contemplates permission levels 246 including any suitable permission levels, according to particular needs. In operation, a user may select a level in expandable tree 242 (e.g., a particular premises 16 or a group of premises 16), and then select the permission levels 246 to be applied to the user for the selected level.

Figure 8:
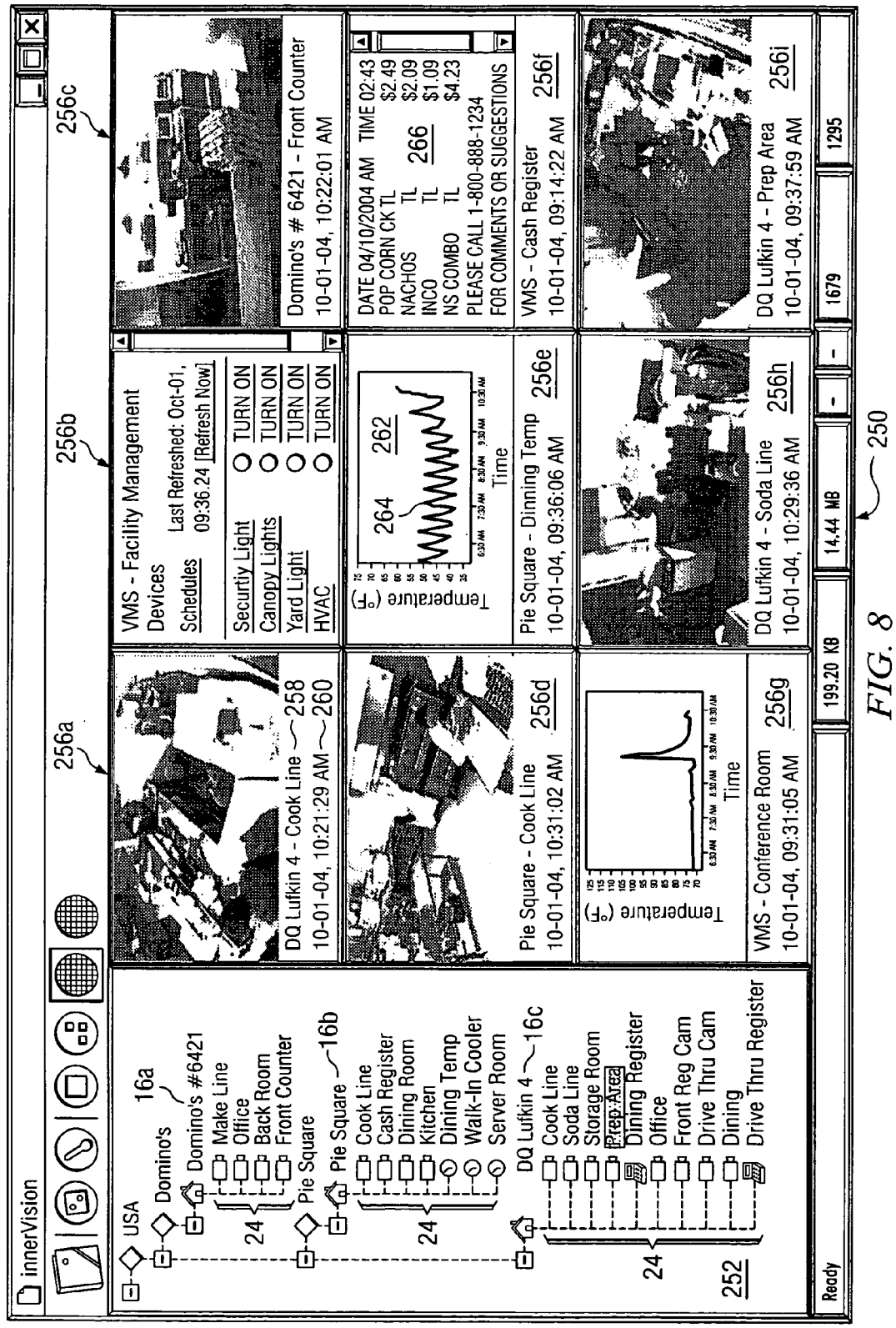
FIG. 8 illustrates an example display for monitoring, controlling, and managing one or more premises.

FIG. 8 illustrates an example display 250 for monitoring, controlling, and managing one or more premises 16. Display 250 comprises a window 252 displaying a expandable/collapsible tree structure 254. Tree structure 254 may comprise a list of premises 16 available to the user of client application 70 and the devices 24 available at each of those premises 16. In certain embodiments, tree structure 254 only includes those devices 24 that the user of client application 70 has permission to view, configure, or both. Each device 24 listed may be identified by a label (e.g., Make Line), which may or may not match the device ID or device ID of the device 24, but may be associated with the device ID or device ID. Display 250 also comprises a number of tiled windows 256a-256i. Although a particular number of windows 256 are illustrated, display 250 may include any suitable number windows 256, according to particular needs. Each window 256 displays one or more devices 24 located at a premises 16. In certain embodiments, a user may select a particular device 24 in tree structure 254, and a window 256 will be opened that displays the device data for the selected device 24. For example, the user may double-click on a device 24 in tree structure 254, or the user may drag and drop a device 24 from tree structure 254 to a particular window 256.

Window 256a, for example, illustrates the display of video data for a particular video camera 34 at a particular premises 16. Window 256a may also include a premises and device label 254 for the premises 16 and camera 34 with which the video data displayed in window 256a is associated. Window 256a may also include data and time information 260, which may be determined based on the time stamp information included in video packets received from computer system 22 at premises 16.

Window 256b, as another example, illustrates the display of a facility management window. The facility management window may include a list of one or more facility management devices 24 at a particular premises 16, and the substantially-current status of each of those devices 24. For example, the facility management window displayed in window 256b includes a list of devices that includes security lights, canopy lights, yard lights, and the heating and air condition unit, along with a status indicator for each of those devices. The user may also control the status of these devices by clicking on the "turn on" or "turn off" text. As described above, in response to the user issuing such a command, the command may be communicated by client application 70 to registrar system 14. The command may include a device ID, premises ID, and the command to be performed. Registrar system 14 may then communicate a command to computer system 22 at the appropriate premises 16 requesting that the computer system 22 perform an appropriate action in response to the command. In this example, the command may instruct computer system 22 to affect the state of an output switch 46 coupled to the security lights, to turn the security lights on or off for example. The user may also select the particular devices listed in facility management window to modify the configuration of those devices (assuming the user has the appropriate permissions). Additionally, the user may click on "Schedules" to configure one or more schedules for the devices listed in the facility management window.

Window 256e, as another example, includes an example display 262 showing temperature data. Display 262 includes a line graph that includes an x-axis representing time and a y-axis representing temperature. A line 264 corresponding to the temperature data for a particular temperature sensor at a particular premises 16 is displayed in the graph. A more detailed example display of temperature data is described below with reference to FIG. 9.

Window 256f, as another example, includes an example display showing POS data 266 for a particular POS device 30 at a particular premises 16. The user may scroll through the displayed POS data 266, as desired.

As can be seen in example display 250, a user can view device data from a plurality of devices 24 located at a plurality of premises 16 simultaneously. For example, window 256c includes video data from a particular camera device 34 at a first premises 16a, window 256e includes temperature data from a particular temperature sensor 42 at a second premises 16b, and window 256h includes video data from a particular camera device 34 at a third premises 16c.

Additionally, as described above with reference to FIG. 1, a user can correlate in time the displays of device data for various devices 24 located at various premises 16. For example, the user could create a display group that includes one or more of windows 256a-256i, and the data displayed in each of the windows included in the display group would be correlated in time.

Figure 9:
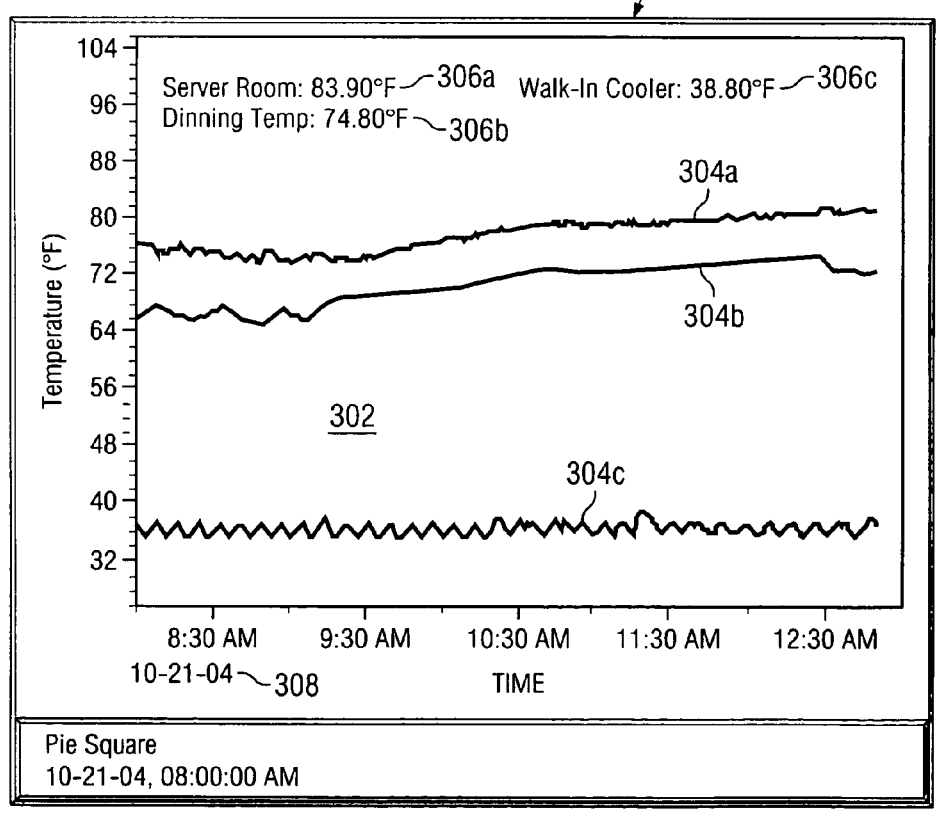
FIG. 9 illustrates an example detailed display of an example window showing temperature data.

FIG. 9 illustrates an example detailed display 300 of an example window showing temperature data. Display 300 includes a line graph 302 that includes an x-axis representing time and a y-axis representing temperature data. A plurality of lines 304 are displayed in graph 302, each corresponding to the temperature data for a particular temperature sensor 42. Each line may be color coded to indicate the temperature sensor 42 with which it is associated. For example, device IDs 306a-306c displayed at the top of graph 302 may be color-coded to match the color of the lines 304 to which they correspond. In operation of an example embodiment, when a user first requests temperature data, temperature data for a default time range (e.g., two hours) may be displayed in graph 302. The user may then select a particular region in the graph, by creating a box around portion of graph 302 using a mouse for example, to view that portion of graph 302 in greater detail. A date 308 corresponding to the temperature data may also be displayed. A user can also drag and drop, from tree 254 shown in FIG. 8 for example, additional temperature sensors 42 into graph 302, and the device data for the additional temperature sensors 42 will also be displayed in graph 302, along with the device IDs for the additional temperature sensors. When viewing temperature data in substantially real time, the times displayed on the x-axis may advance and lines 304 may move, as appropriate.

Figure 10:
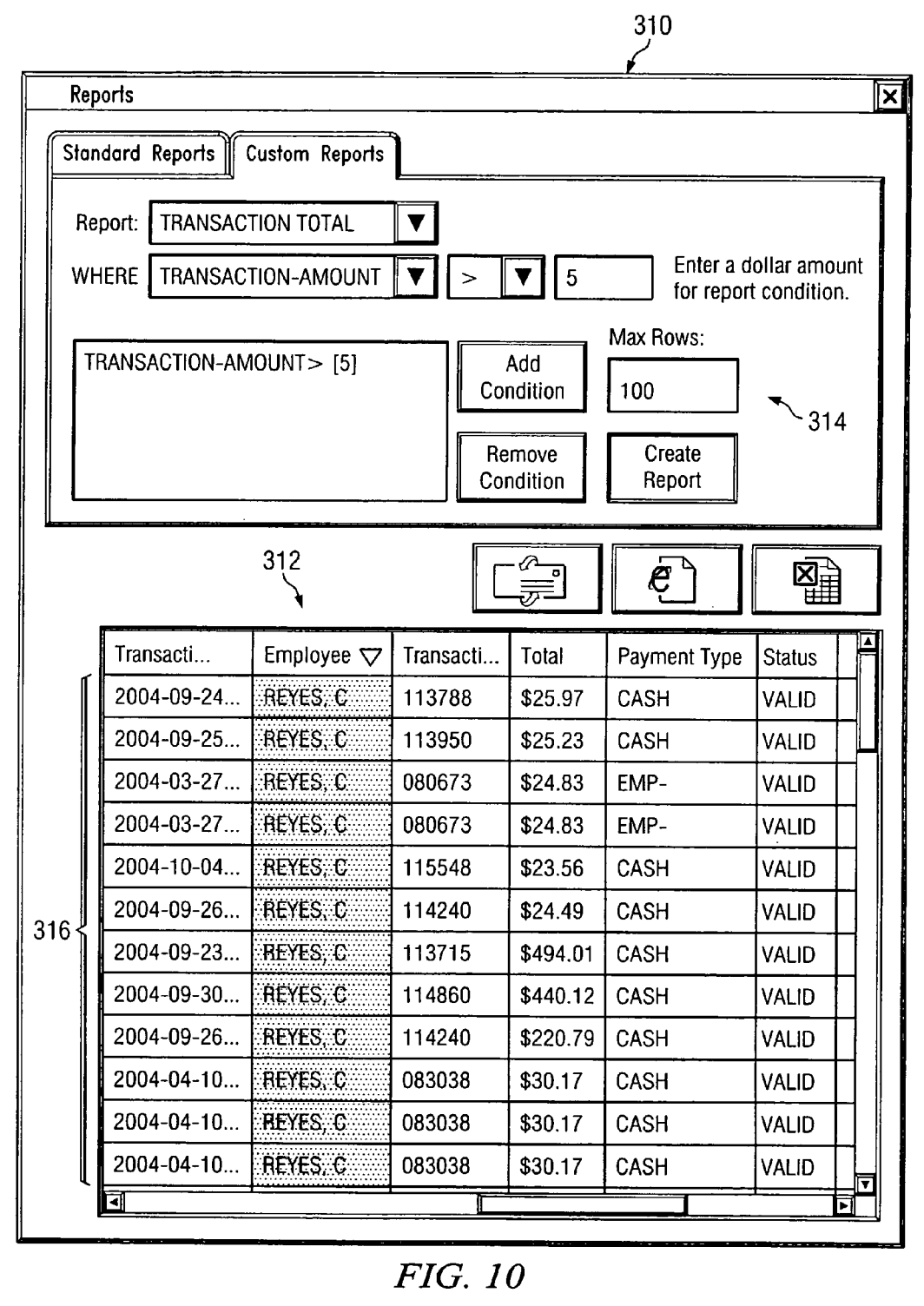

FIG. 10 illustrates an example display 310 of an example POS report 312. A user may specify any appropriate parameters in area 314 for generating report 312. Report 312 includes POS data responsive to the parameters specified in area 314. Additionally, a user may select a particular transaction from the list of transactions 316 in report 312. For example, when a user double-clicks or otherwise selects a particular transaction, a new window may be opened (in display 250 for example) that displays the details for the transaction. Such details may include POS data associated with the receipt for the transaction. POS report 312 may be viewed online, printed, or otherwise accessed by a user of client system 12.

Figure 11:
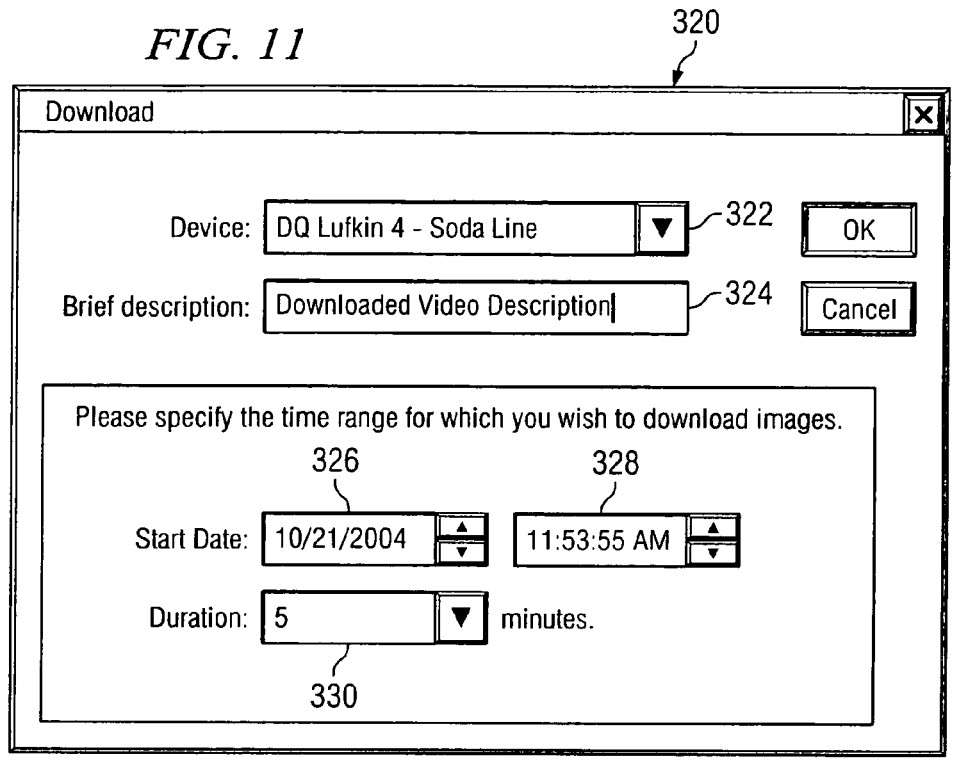
FIG. 11 illustrates an example display for downloading video data from a premises.

FIG. 11 illustrates an example display 320 for downloading video data from premises 16. Display 320 includes a camera-selection menu 322 for selecting a camera 34 whose video data is to be downloaded. Display 320 also includes a text box 324 in which a user may type a description of the video to be downloaded. This description may be assigned as the file name for the video file that is communicated from premises 16 in response to the download request. Display 320 also includes boxes 326 and 328 for specifying the start date and start time, respectively, for the video data to be downloaded. Additionally, a selection menu 330 may be used to select the duration of the of the time interval for which video data should be downloaded. When the user selects "OK," a request is communicated to premises 16 for the specified video data.

Figure 12:
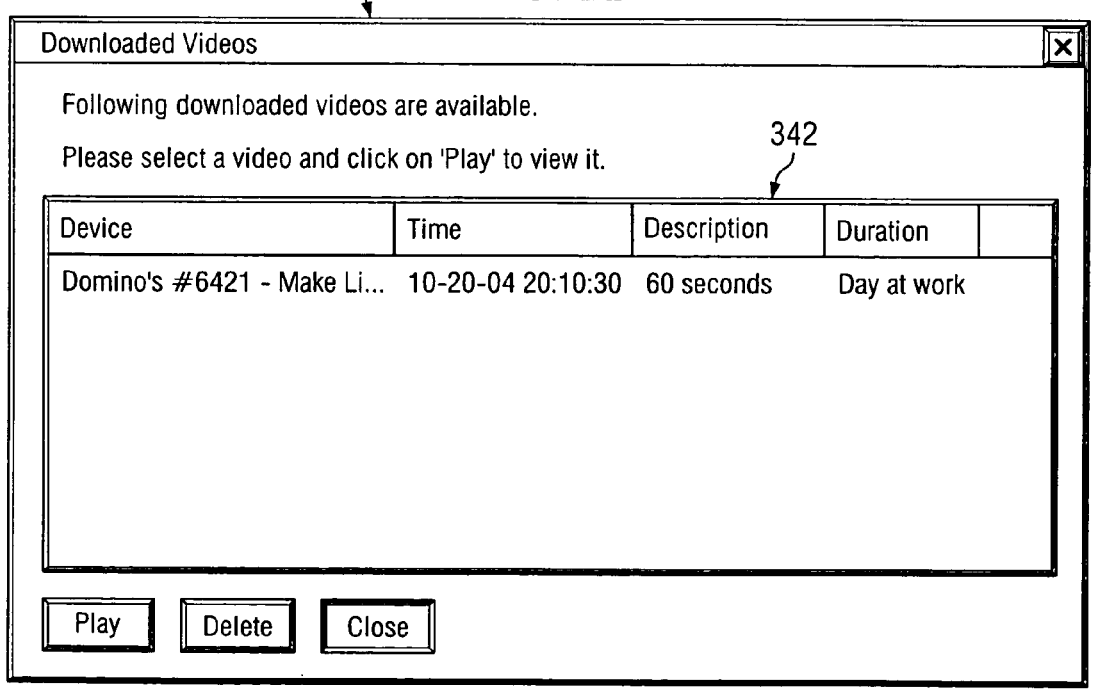
FIG. 12 illustrates an example display for selecting one or more downloaded videos to be played or deleted.

FIG. 12 illustrates an example display 340 for selecting one or more downloaded videos to be played or deleted. Although referred to as downloaded video, downloaded video may comprise a collection of downloaded video images, which, when played in sequence, recreate a scene. The user may select a downloaded video (e.g., collection of video images) from the list displayed in window 342, and then select the play button to view the selected downloaded video (e.g., collection of video images) or the delete button to delete the selected downloaded video. Additionally, although not shown, a user may right-click on a particular downloaded video (e.g., collection of video images), and a selection menu will be displayed. One option in the selection menu may be to send the selected downloaded video to one or more recipients via email. The user may select the email option and client application 70 may automatically interface with the user's email application installed on client system 12 to initiate sending of an email with the downloaded video as an attachment. As another option in the selection menu, the user may be able to save the downloaded video to a particular location (e.g., hard disk, CD-ROM, or any other suitable location or device).

Figure 13:
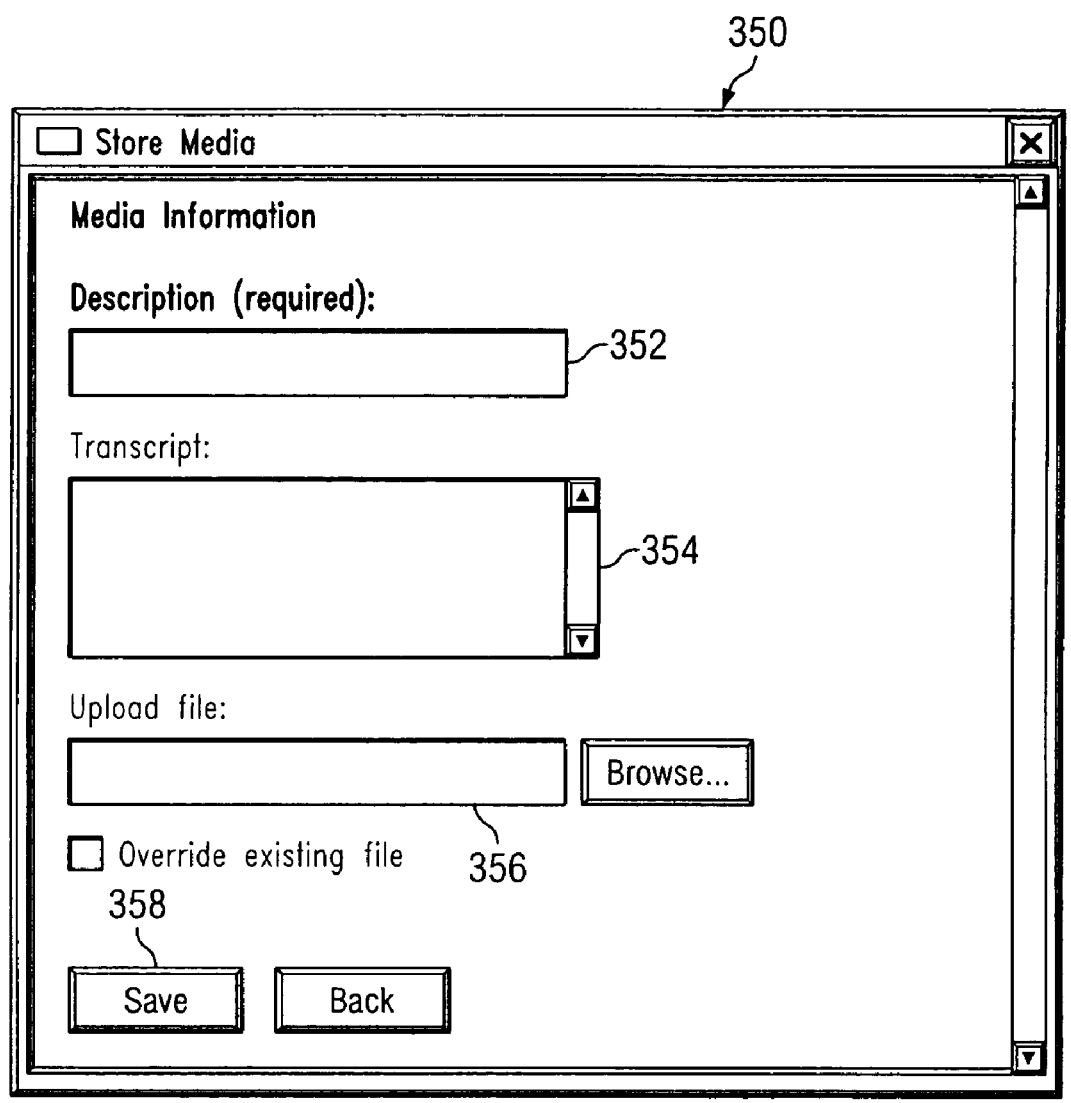
FIG. 13 illustrates an example display for communicating one or more media files to the registrar system.

FIG. 13 illustrates an example display 350 for communicating one or more media files to registrar system 14. The user may enter a description of the media file in box 352, a transcript of the media file (if appropriate) in box 354, and enter or browse for the location of the selected media file in box 356. In certain embodiments, when the user selects a "save" button 358, the media file will be automatically communicated to registrar system 14.

Figure 14:
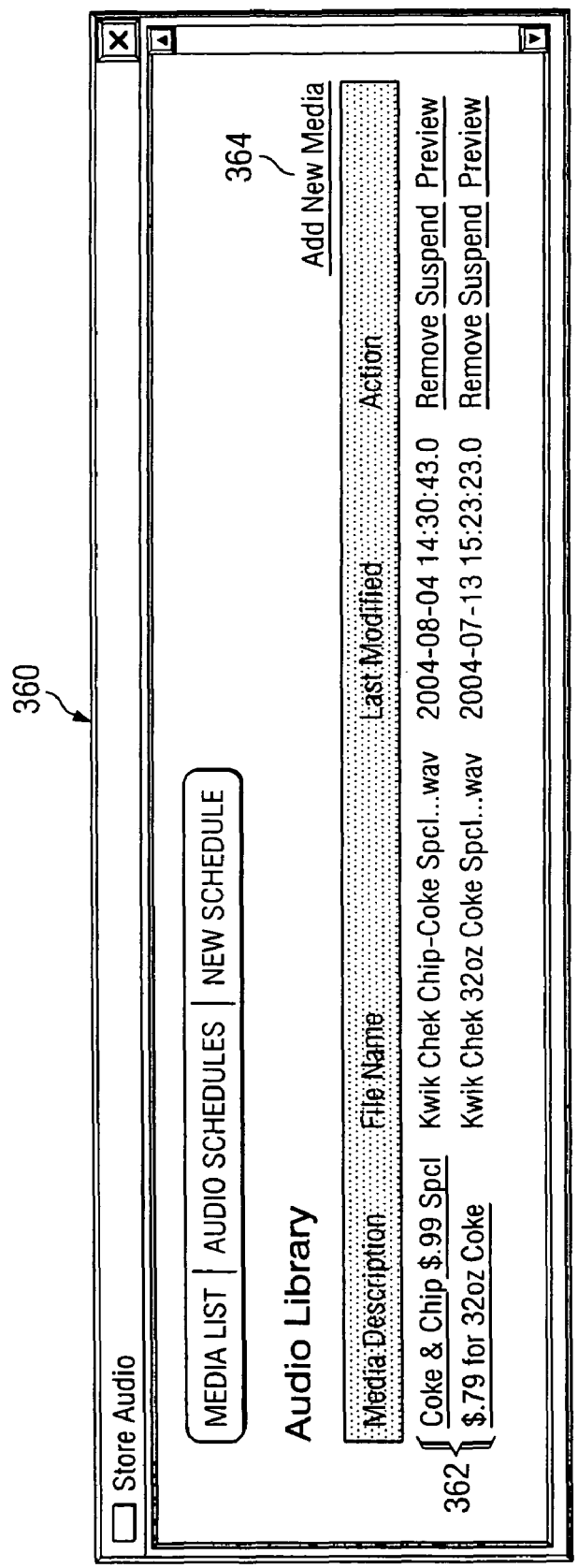
FIG. 14 illustrates an example display showing one or more media files in a user's media library.

FIG. 14 illustrates an example display 360 showing one or more media files 362 in a user's media library. Various details relating to media files 362 may also be displayed. A user may select an "add new media" hyperlink 364 to add new media files 362 to the user's media library.

Figure 15:
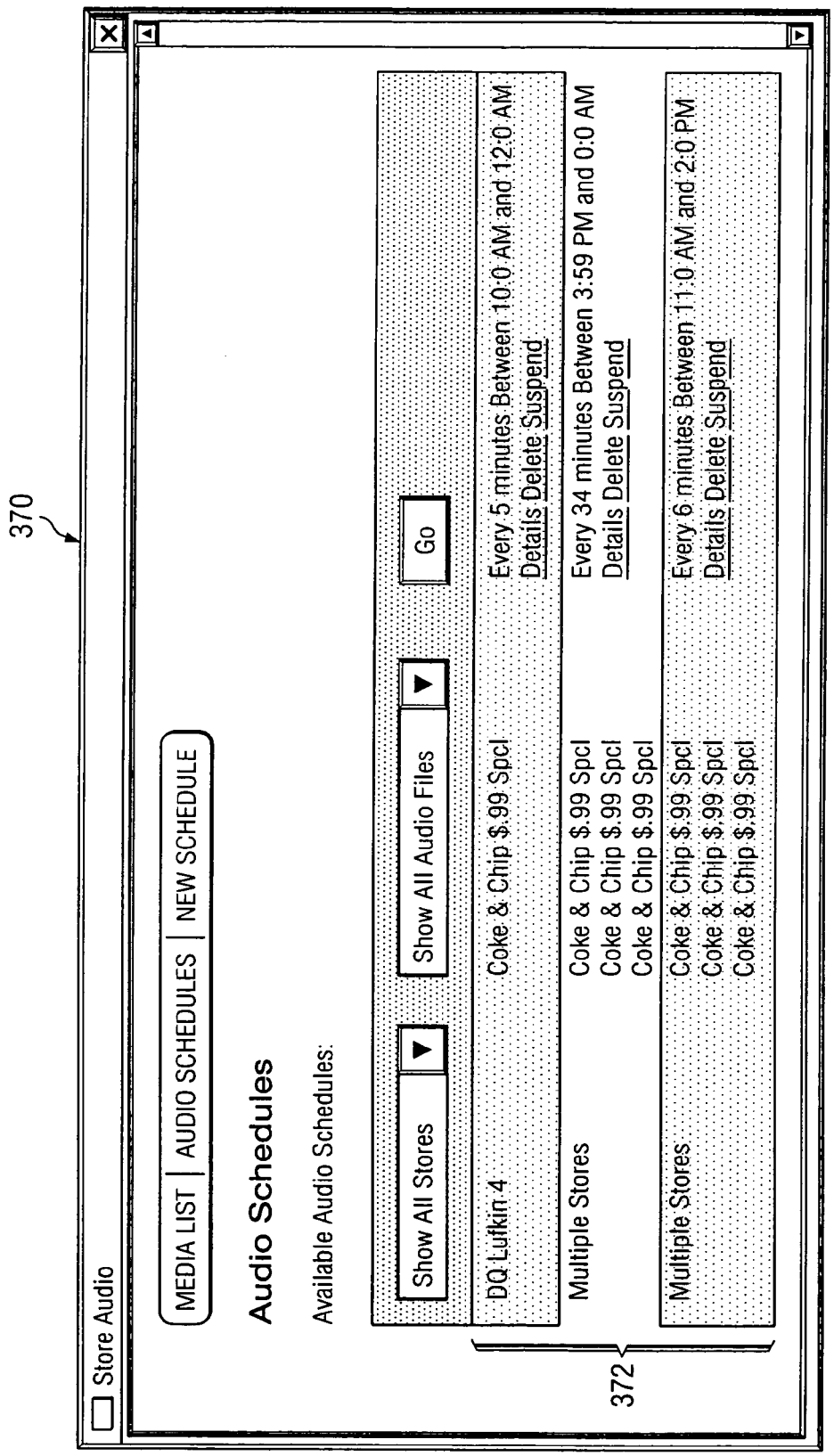
FIG. 15 illustrates an example display showing one or more media schedules associated with a user.

FIG. 15 illustrates an example display 370 showing one or more media schedules 372 associated with a user. Various details relating to media schedules 372 may also be displayed, including, for example, a description of the media and a brief summary of the schedule.

Figure 16:
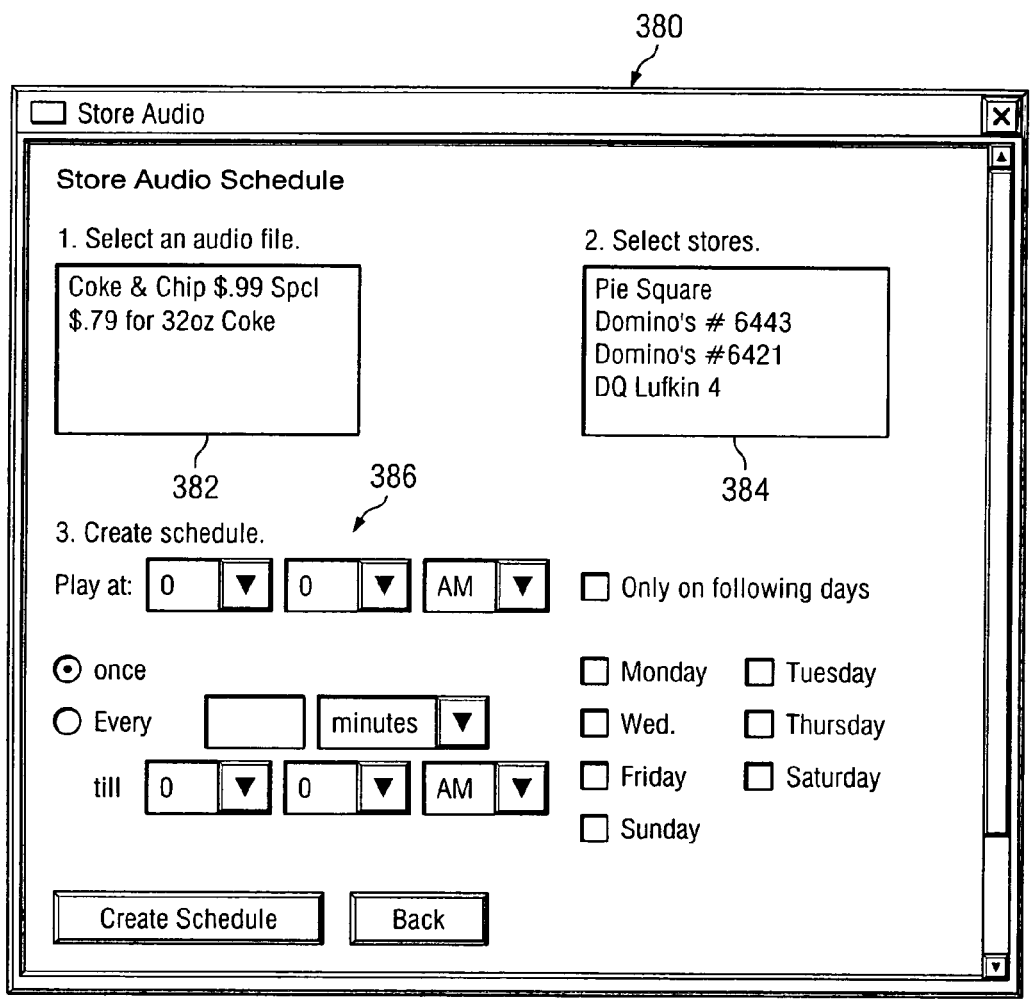
FIG. 16 illustrates an example display for creating a new media schedule.

FIG. 16 illustrates an example display 380 for creating a new media schedule 372. A user may select one or more audio files to be associated with the schedule 372 in box 382, select one or more premises 16 to which schedule 372 will apply in box 384, and select details relating to the schedule in area 386.

Figure 17:
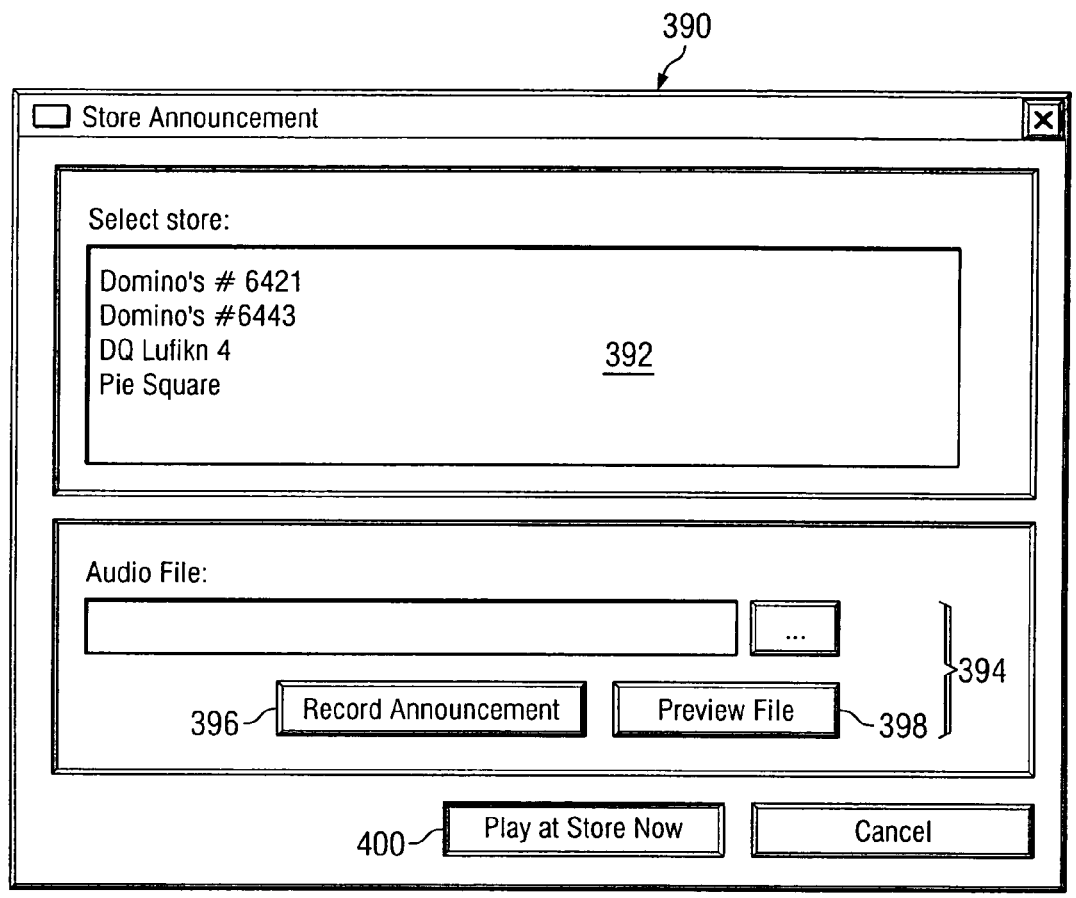
FIG. 17 illustrates an example display for recording a premises announcement.

FIG. 17 illustrates an example display 390 for recording a premises announcement. For example, a user may interact with display 390 to record a marketing announce for a premises 16. The user may select in box 392 one or more premise 16 at which the announcement is to be displayed. The user may specify the announcement to be played using the tools in area 394. Additionally, the user may select to record a new announcement using button 396. The user may preview the file to be played by selecting preview file button 398. To play the file at the selected premises 16 by selecting play at store now button 400.

Figure 18A:
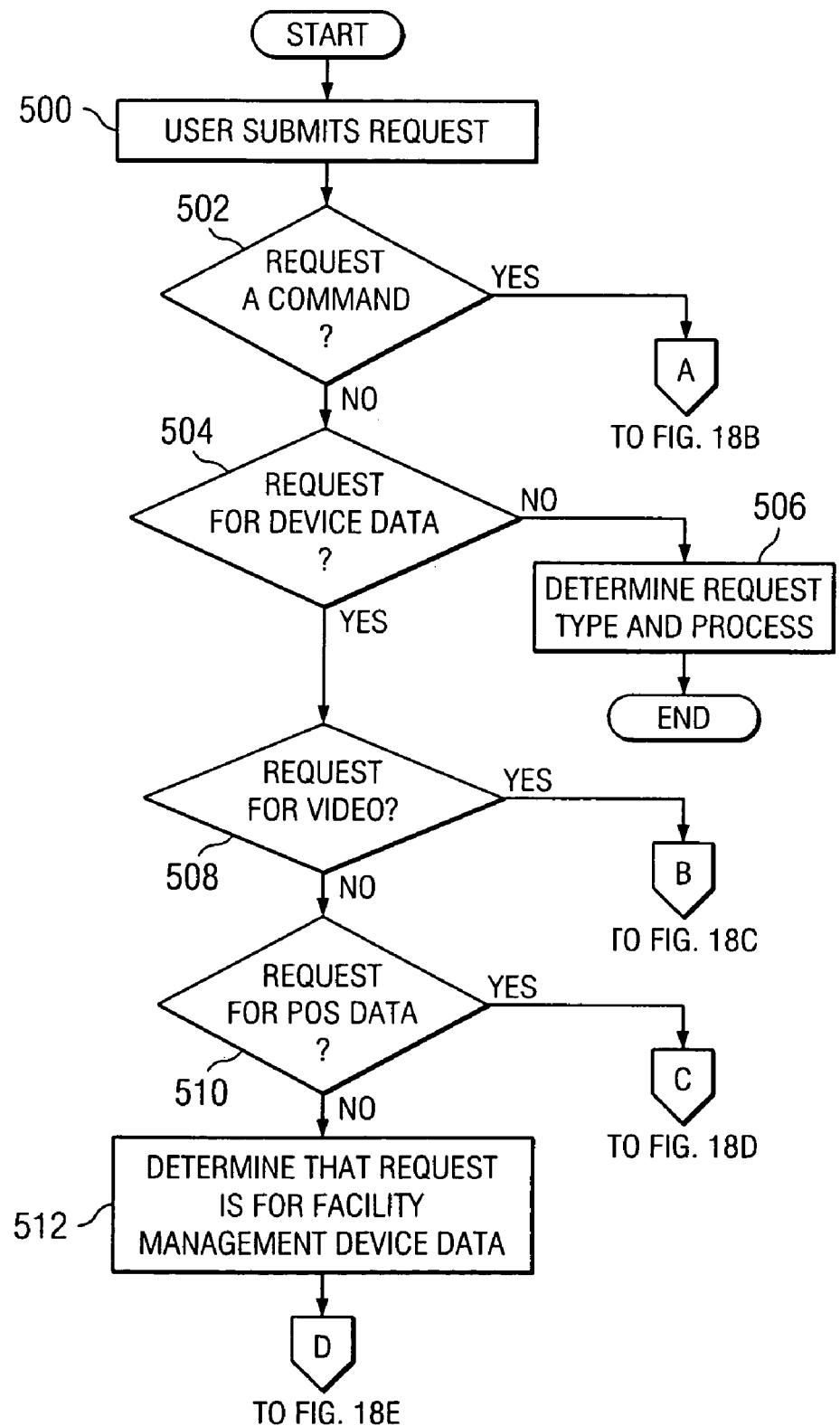
FIGS. 18A-18E illustrate an example method for processing requests communicated by a remote client system for device data associated with a device located at a premises.

FIGS. 18A-18E illustrate an example method for processing requests communicated by remote client system 12. FIG. 18A illustrates an example method for determining the type of request and what actions initially to perform based on that determination. At step 500, a user of client system 12 submits a request, using client application 70 for example. The request may include a request for device data, such as video data, facility management data, POS data, or any other suitable type of data. Additionally or alternatively, the request may include a command. In certain embodiments, if the request is associated with a device 24 at premises 16, then the request may include the device ID of the device 24 at premises 16 associated with the request.

At step 502, client application 70 determines whether the request submitted by the user of client system 12 is a command. For example, the request may include a request to affect one or more facility management devices 28 or other equipment located at premises 16. Such a request may include, for example, a request to affect the state of one or more output switches 46. As another example, the request may include a request to play one or more media files at a premises 16 or to store one or more media files at premises 16 or at registrar system 14. As another example, the request may include instructions to change one or more configurations of one or more facility management devices 28, video devices 26, media devices 32, user configuration information 106, premises configuration information 108, one or more schedules, or any other suitable components or information of system 10, as appropriate. Although these example commands have been described, the present invention contemplates a user of client system 12 being able to submit any suitable type of command, according to particular needs. In certain embodiments, the method may include determining whether the user who submitted the command has the appropriate authority to submit such a request. If at step 502 the request is determined to be a command, then the method proceeds to FIG. 18B, described below. If at step 502 the request is determined not to be a command, then the method proceeds to step 504.

At step 504, client application 70 determines whether the request is a request for device data associated with a device 24 at a premises 16. The request may include a request for device data, such as video data, facility management data, POS data, or any other suitable type of data. In certain embodiments, the request also includes the device ID of the device 24 at premises 16 associated with the device data requested. If at step 504, the request is determined not to be for device data associated with a device 24 at premises 16, then the method proceeds to step 506. At step 506, client application 70 determines the type of request submitted by the user, and processes the request appropriately. For example, the request may include a request to process the user's authentication information. If at step 504 the request is determined to be a request for device data, then the method proceeds to step 508.

At step 508, client application 70 determines whether the request submitted by the user of client system 12 is a request for video data associated with a video device 26 located at one of premises 16. If client application 70 determines at step 508 that the request is a request for video data, then the method proceeds to FIG. 18C, described below. If client application determines at step 508 that the request is not for video data, then client application 70 determines at step 510 whether the request is a request for POS data associated with a POS device 30 located at one of premises 16. If client application 70 determines at step 510 that the request is a request for POS data, then the method proceeds to FIG. 18D, described below. If client application 70 determines at step 510 that the request is not a request for POS data, then in certain embodiments, client application 70 determines at step 512 that the request is a request for facility management device data associated with a facility management device 28 located at one of premises 16.

In certain embodiments, the determinations made at steps 502 through 512 may be a single determination. For example, the request may include an identifier indicating the type of the request (i.e., whether it is a command; a request for video data, POS data, or facility management device data; or any other suitable type of request). In such embodiments, client application 70 may determine from the identifier the type of the request in a single determination, and proceed accordingly. Additionally or alternatively, requests of particular types or for particular types of device data may each comprise a different format, and client application 70 may be able to determine the type of the request based on the format of the request. In any event, the present invention contemplates client application 70 determining the type of the request in any suitable manner, according to particular needs. Although the determination of the type of request is described primarily as being performed by client application 70, the present invention contemplates any suitable component of system 10 making this determination.

Figure 18B:
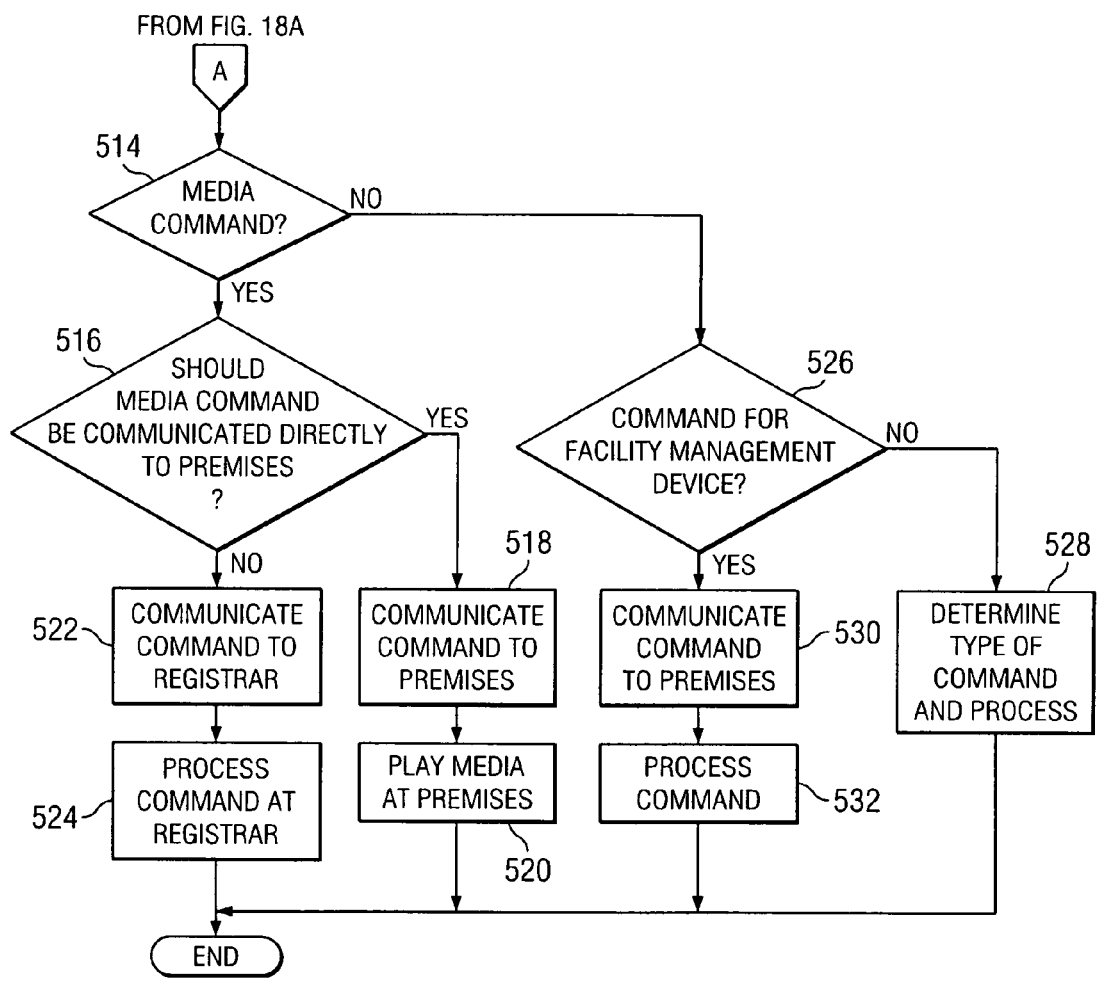

Returning to step 502 in FIG. 18A, if client application 70 determines that the request is a command, then the method proceeds to FIG. 18B. FIG. 18B illustrates an example method for processing example commands submitted by a user of client system 12. Although certain example commands are described with reference to FIG. 18B, the present invention contemplates system 10 being capable of processing any suitable commands, according to particular needs.

At step 514, client application 70 may determine whether the command is a media command, requesting that media be played at one or more premises 16 using a media device 32. For example, the command may request that a certain audio or video file be played at one or more premises 16 at one or more times. The command may include the device ID of the media device 32 with which the user desires the media file to be played. In certain embodiments, the command may include the media file to be played.

If the command is determined at step 514 to be a media command, then at step 516, client application 70 may determine whether the media command should be communicated to registrar system 14 or directly to one or more desired premises 16. For example, in certain embodiments, requests to play immediately a recorded message may be communicated directly to one or more desired premises 16. As another example, requests to play media at one or more scheduled times may be communicated to registrar system 14.

If it is determined at step 516 that the media command should be communicated directly to one or more premises 16, then at step 518, client application 70 may communicate the media command to one or more specified premises 16. At step 520, the one or more specified premises 16 plays the media file using one or more media devices 32, in accordance with the media command. If it is determined at step 516 that the media command should be communicated to registrar system 14, then at step 522, client application 70 may communicate the media command to registrar system 14. At step 524, registrar system 14 may process the media command in any suitable manner. For example, registrar system 14 may store the media file associated with the media command and any associated scheduling information.

Returning to step 514, if it is determined at step 514 that the command is not a media command, then the method proceeds to step 526. At step 526, client application 70 may determine whether the command is a command for a facility management device 28 associated with a premises 16. In certain embodiments, the command may include a command to affect the state of an output switch 46 at a premises 16. As just one example, a particular output switch may control the state of one or more lights at premises 16. In this example, the command may specify that the state of the output switch be changed to turn the light on, assuming the current state of the light is off.

If it is determined at step 526 that the command is not a command for a facility management device 28, then at step 528, client application may determine the type of the command and process the command appropriately. The command in this case may include any suitable type of command, according to particular needs.

If it is determined at step 526 that the command is a command for a facility management device 28, then at step 530, client application 70 may communicate the command to one or more premises 16. Although the command for a facility management device 28 is described primarily as being communicated directly to the one or more premises 16, the command may be communicated to registrar system 14, which may then forward the command to the one or more premises 16 or otherwise process the command, without departing from the spirit and scope of the present invention. At step 532, the one or more premises 16 to which the command was communicated may process the command. For example, assuming the command is for a single premises 16, computer system 22 at the premises 16 may issue a command to a facility management device 28 specified in the command. The computer system 22 may communicate an updated device status for the affected facility management device 28 to registrar system 14. Registrar system 14 may then update the device status of the facility management device 28 and, in certain embodiments, communicate the updated to client system 12.

Figure 18C:
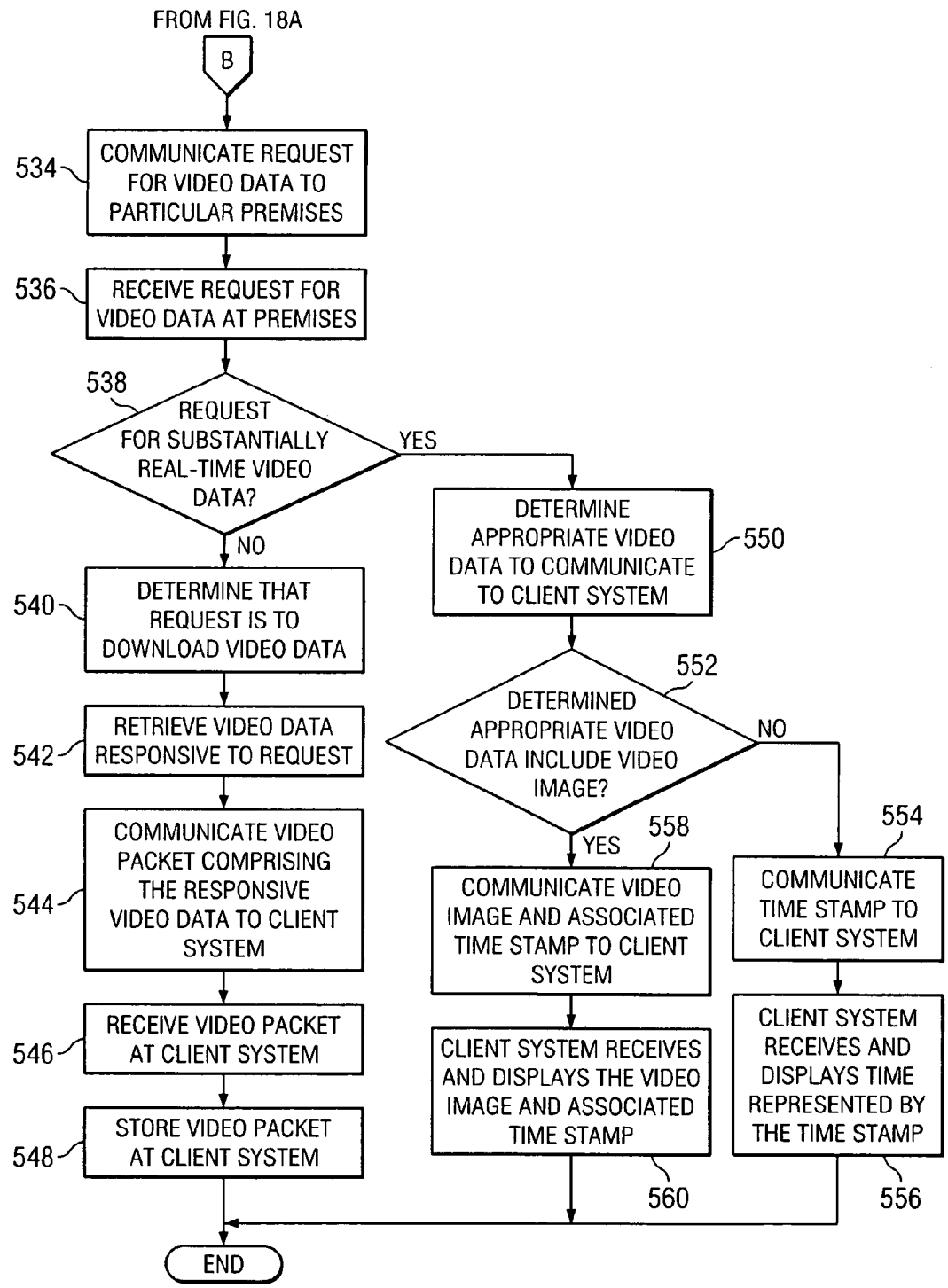

Returning to step 508 in FIG. 18A, if client application 70 determines that the request is a request for video data, then the method proceeds to FIG. 18C. FIG. 18C illustrates an example method for processing a request for video data associated with a video device 26 located at one of premises 16. At step 534, client application 70 communicates the request to a particular premises 16 identified in the request. Client application 70 may determine the particular premises 16 that is the intended recipient of the request in any suitable manner. Additionally, client application 70 may communicate the request to premises 16 in the same format as it was submitted by the user or in a different format than it was submitted by the user, according to particular needs.

At step 536, the particular premises 16 receives the request communicated by client application 70. For example, computer system 22 at the particular premises 16 may receive the request. At step 538, computer system 22 determines whether the request is a request for substantially real-time video data. If computer system 22 determines that the request is not for substantially real time video data, then at step 540, computer system 22 determines that the request is a request to download video data. As described above with reference to FIG. 1, a request to download video data may include one or more parameters, including, for example, a device ID of a video device, a start time, an end time, and any other suitable information.

At step 542, computer system 22 retrieves video data responsive to the request. For example, video application 36 may retrieve the video data responsive to the request. The responsive video data may be retrieved from the hard drive or other suitable memory associated with computer system 22. Additionally, video application 36 may retrieve the responsive video data base, at least in part, on the device ID, start time, and end time included in the request. For example, video application 36 may access an appropriate data structure for the video device 26 associated with the device ID specified in the request. Based on the start time and end time, video application 36 may determine a first video image or time stamp responsive to the request, a last video image or time stamp responsive to the request, and any intervening video images or time stamps responsive to the request.

At step 544, computer system 22 communicates a video packet to client system 12 that includes the responsive video images and time stamps. For example, the video packet may be a file that includes the responsive video images and time stamps. At step 546, client system 12 receives the video packet that includes the responsive video images and time stamps. At step 548, client system 12 stores the video packet. For example, client application 70 may store the received video packet in a memory associated with client system 12.

Returning to step 538, if computer system 22 determines that the request received from client system 12 is a request for substantially real-time video data, the method proceeds to step 550. The request for substantially real-time video data may include a device ID of a particular video device 26, an indicator of whether client system 12 has received a previous video image during the current login session for the particular video device 26, an identification (e.g., a time stamp and/or other suitable information) of the last video image received by client system for that particular video device 26, if appropriate, or any suitable other information according to particular needs. At step 550, video application 36 determines the appropriate video data to communicate to client system 12 in response to the request. Video application 36 may determine the appropriate video data in any suitable manner.

In certain embodiments, video application 36 determines whether client system 12 has previously received video data for the particular video device 26 during the current login session, based on the indicator included in the request for example. If video application 36 determines that client system 12 has not previously received video data for the particular video device 26 during the current login session, video application 36 may determine that the appropriate video data is a next collected video image and its associated time stamp. If video application 36 determines that client system 12 has previously received video data for the particular video device 26 during the current login session, video application 36 may retrieve the video image identified in the request as the last video image received by client system 12, based on the time stamp information for example. Video application 36 may collect a next video image captured by the particular video device 26. It will be understood that the collection of the next video image by video application 36 in some cases may not be in response to the request. For example, video application 36 may be substantially continuously collecting video images captured by the particular video device 26, and the next video image may be any video image collected substantially at the time the request is received (e.g., slightly before, at the same time, or slightly after receipt of the request).

Video application 36 may determine whether the appropriate video data to communicate to client system 12 should include the next collected video image. For example, in certain embodiments, video application 36 determines whether motion has occurred since the last video image received by client system 12 and the collected next video image, and if so, video application 36 may determine that the appropriate video data to communicate to client system 12 should include the collected next video image and its associated time stamp. In this example, if video application 36 determines that no motion has occurred since the last video image received by client system 12 and the collected next video image, video application 36 may determine that the appropriate video data to communicate to client system 12 should not included the collected next video image but should include the time stamp of the collected next video image.

At step 552, video application 36 determines whether the determined appropriate video data includes a video image. If the determined video data does not include a video image, at step 554 video application may communicate a time stamp to client system 12. Such a result may occur, for example, when client system 12 is currently displaying a video image and not motion has occurred since that currently displayed video image. At step 556, client system 12 receives the time stamp and may display the time represented by the time stamp. For example, client application 70 may update a time displayed for the currently displayed video image at client system 12 with the time represented by the time stamp information. If video application 36 determines at step 552 that the determined appropriate video data includes a video image, then at step 558 video application 36 communicates the video image and its associated time stamp to client system 12. At step 560, client system 12 receives the video image and its associated time stamp, and may display the video image and the time represented by the time stamp.

Figure 18D:
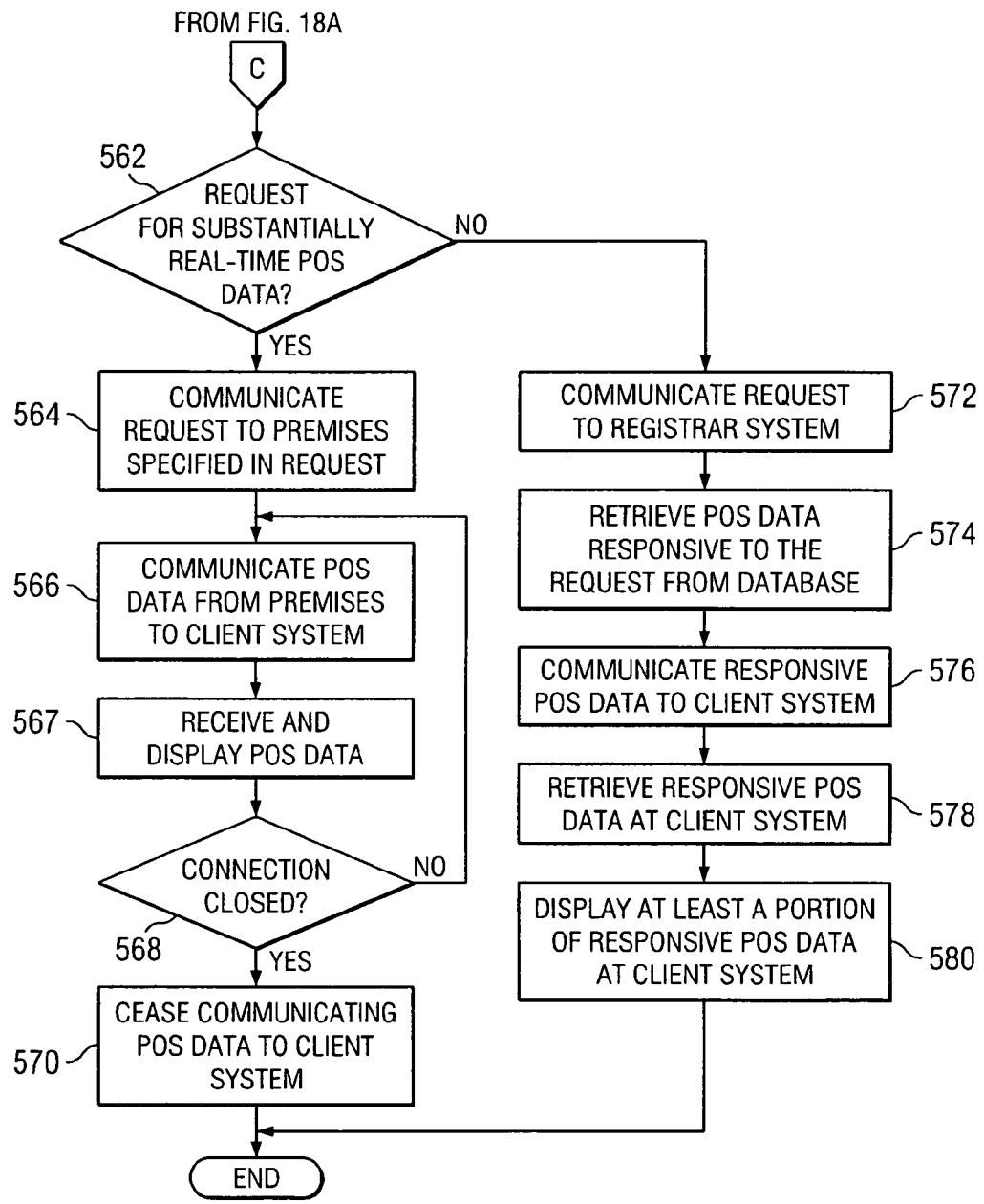

Returning to step 510 in FIG. 18A, if client application 70 determines that the request is a request for POS data, then the method proceeds to FIG. 18D. FIG. 18D illustrates an example method for processing a request for POS data associated with a POS device 30 located at one of premises 16. At step 562, client application 70 determines whether the request for POS data is a request for substantially real-time POS data.

If client application 70 determines that the request is a request for substantially real-time POS data, then the method proceeds to step 564. The request for substantially real time POS data may include any suitable parameters, including a premises ID of a particular one of premises 16 and the device ID of a particular POS device 30 located at the particular premises 16. At step 564, client application 70 initiates communication of the request for substantially real-time POS data to the particular premises 16 specified in the request. For example, client application 70 may determine the identity of the particular premises 16 based on the premises ID included in the request. At step 566, computer system 22 at the particular premises 16 communicates POS data for the POS device 30 identified in the request to client system 12 in substantially real time. For example, POS application 50 may receive and process POS data from the POS device 30 identified in the request, and may communicate the received POS data to client system 12 in substantially real time. At step 567, client application 70 receives and displays at least a portion of the POS data received from computer system 22 at the particular premises 16.

At step 568, computer system 12 at the particular premises 16 determines whether the communications connection between computer system 12 and client system 12 is closed. For example, in certain embodiments, when a client application requests substantially real-time POS data, a communications connection may be established between client system 12 and computer system 22 at the appropriate premises 16, using network 18 and the appropriate links 20. This connection may remain open until the client decides to no longer receive POS data in substantially real time, by closing a cash register display at client system 12 for example. Although this technique has been described, the present invention contemplates substantially real-time POS data being communicated to client system 12 in any suitable manner.

If computer system 22 determines at step 568 that the connection is not closed, then POS application may continue to communicate POS data to client system 12 in substantially real time. If computer system 22 determines at step 568 that the connection is closed, then POS application may cease communicating POS data to client system 12.

Returning to step 562, if client application 70 determines that the request received from client system 12 is not a request for substantially real-time POS data, then the method proceeds to step 572. For example, client application 70 may determine that the request for POS data is a request for POS data stored in database 52 at registrar system 14. As another example, client application 70 may determine that the request for POS data is a request for one or more historical reports of POS data. At step 572, client application 70 may initiate communication of the request to registrar system 14. At step 574, registrar system 14 retrieves POS data responsive to the request. For example, registrar system 14 may retrieve the POS data responsive to the request from database system 62 associated with registrar system 14. This retrieval of POS data may be based on one or more parameters specified in the request, such as one or more time parameters, one or more date parameters, one or more device ID parameters, one or more premises ID parameters, or any other suitable parameters according to particular needs.

At step 576, registrar system 14 communicates the retrieved POS data responsive to the request to client system 12. At step 578, client system 12 receives the POS data communicated by registrar system 14, and at step 580, client system 12 displays at least a portion of the POS data received from registrar system 14 at client system 12. For example, client application 70 may perform any suitable processing on the received POS data and then display at least a portion of the POS data on a display of client system 12.

Figure 18E:
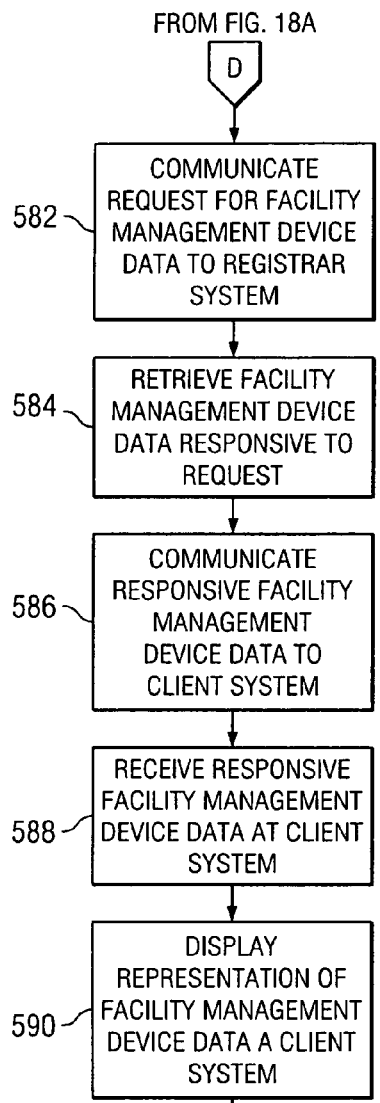

Returning to step 510 in FIG. 18A, if client application 70 determines that the request received from client system 12 is not a request for POS data, then, at step 512, client application 70 may determine that the request is a request for facility management device data and the method proceeds FIG. 18E. FIG. 18E illustrates an example method for processing a request for facility management device data associated with a facility management device 28 located at one of premises 16. The request may one or more parameters, including for example a premises ID of a particular premises 16, a device ID of a facility management device 28 located at the particular premises 16, or any other suitable information.

At step 582, client application 70 may initiate communication of the request for facility management device data to registrar system 14. In certain embodiments, at least requests for facility management device data associated with input switches and sensors are communicated to registrar system 14, although the present invention contemplates any suitable types of requests for facility management device data being communicated to registrar system 14. At step 584, registrar system 14 may retrieve facility management device data responsive to the request. For example, based on the one or more parameters included in the request, management application 64 at registrar system 14 may access one or more tables stored on database 62 to retrieve the facility management device data responsive to the request. At step 586, registrar system 14 communicates the retrieved facility management device data responsive to request to client system 12. At step 588, client system 12 receives the facility management device data responsive to the request. Client application 70 may display the facility management device data responsive to the request at step 590.

While the steps of the example methods described with reference to FIGS. 18A-18E are described in a particular order, the present invention contemplates the steps of the methods being performed in any suitable order according to particular needs. Additionally, while a single client system 12 is described with reference to FIGS. 18A-18E, it should be understood that registrar system may receive requests from multiple client system 12 for device data associated with devices 24 at a plurality of premises 16. It will be understood that the requests communicated from client systems 12 may include any suitable identifier(s) to enable registrar system 14 to determine the client application 12 that communicated the request.

Figure 19:
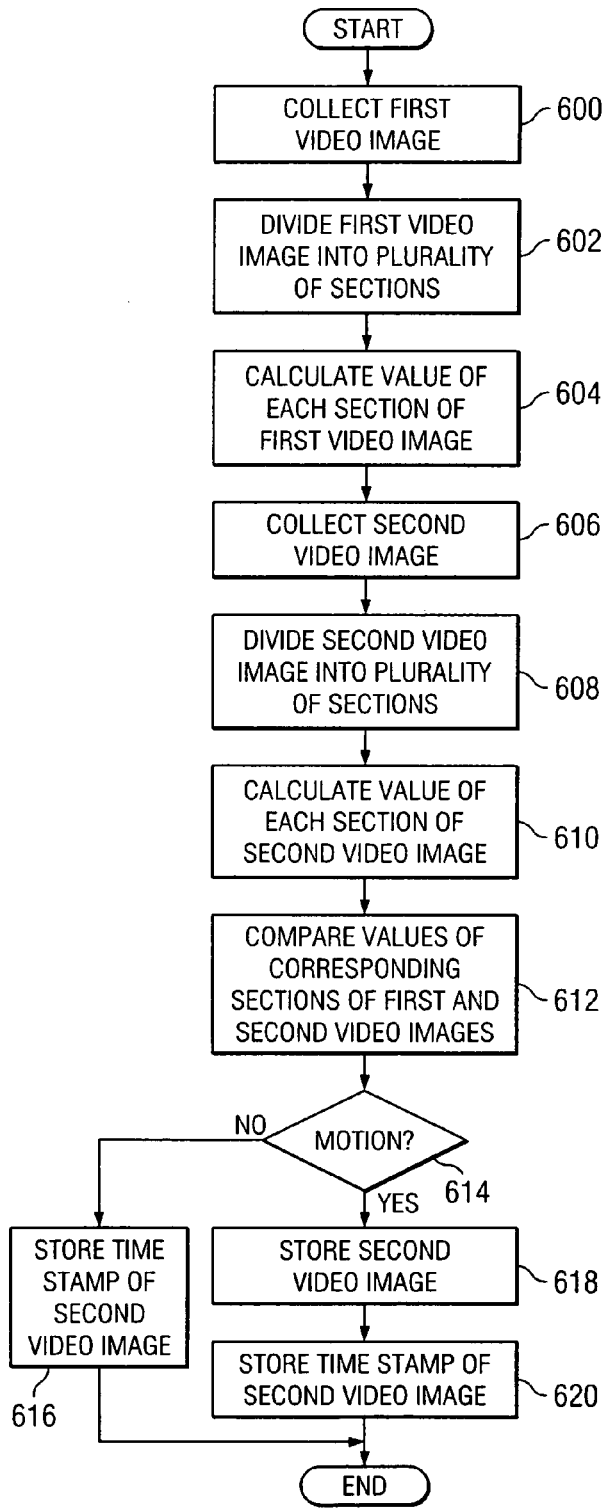
FIG. 19 illustrates an example method for determining whether to store a video image collected from a video device at a premises.

FIG. 19 illustrates an example method for determining whether to store a video image collected from a video device 26 at premises 16. Although this example method is described, the present invention contemplates determining whether to store video images collected from video devices 26 in any suitable manner, including storing every video image collected from video devices 26. At step 600, video application 36 collects a first video image captured by a particular video device 26. In certain embodiments, the first video image may be the last stored video image collected from the video device 26. At step 602, video application 36 divides the first video image into a plurality of sections. At step 604, video application 36 calculates a value of each section of the first video image. For example, video application 36 may calculate the average brightness of each section of the first video image. At step 606, video application 36 collects a second video image captured by the particular video device 26. At step 606, video application 36 divides the second video image into a plurality of sections. At step 610, video application 36 calculates a value of each section of the second video image. For example, video application 36 may calculate the average brightness of each section of the second video image.

At step 612, video application 36 may compare the value of each section of the first video image to the value of a corresponding section of the second video image. At step 614, video application 36 determines whether motion has occurred between the first and second video images based on the comparison. In certain embodiments, video application 36 may make this determination after all values of each section of the first video image have been compared to the values of corresponding sections of the second video image. In certain other embodiments, the determination may be made after each comparison of a value of a section of the first video image to a value of a corresponding section of the second video image. In such embodiments, the determination may be repeated until motion is determined for particular corresponding sections of the first and second video images or until the last corresponding section of the first and second video images are compared and no motion is determined to have occurred. The comparison may be made by determining whether values of section of the first image differ from values of corresponding sections of the second image by at least a predefined delta value.

If client application 36 determines at step 614 that no motion occurred between the first and second video images, then at step 616, client application 36 may determine that the second video image should not be stored, but may store a time stamp for the second video image. If client application 36 determines at step 614 that motion has occurred between the first and second video images, then at steps 618 and 620, client application 36 may store the second video image and a time stamp for the second video image, respectively.

While the steps of the example method described with reference to FIG. 19 are described in a particular order, the present invention contemplates the steps of the method being performed in any suitable order and substantially simultaneously, according to particular needs.

Figure 20:
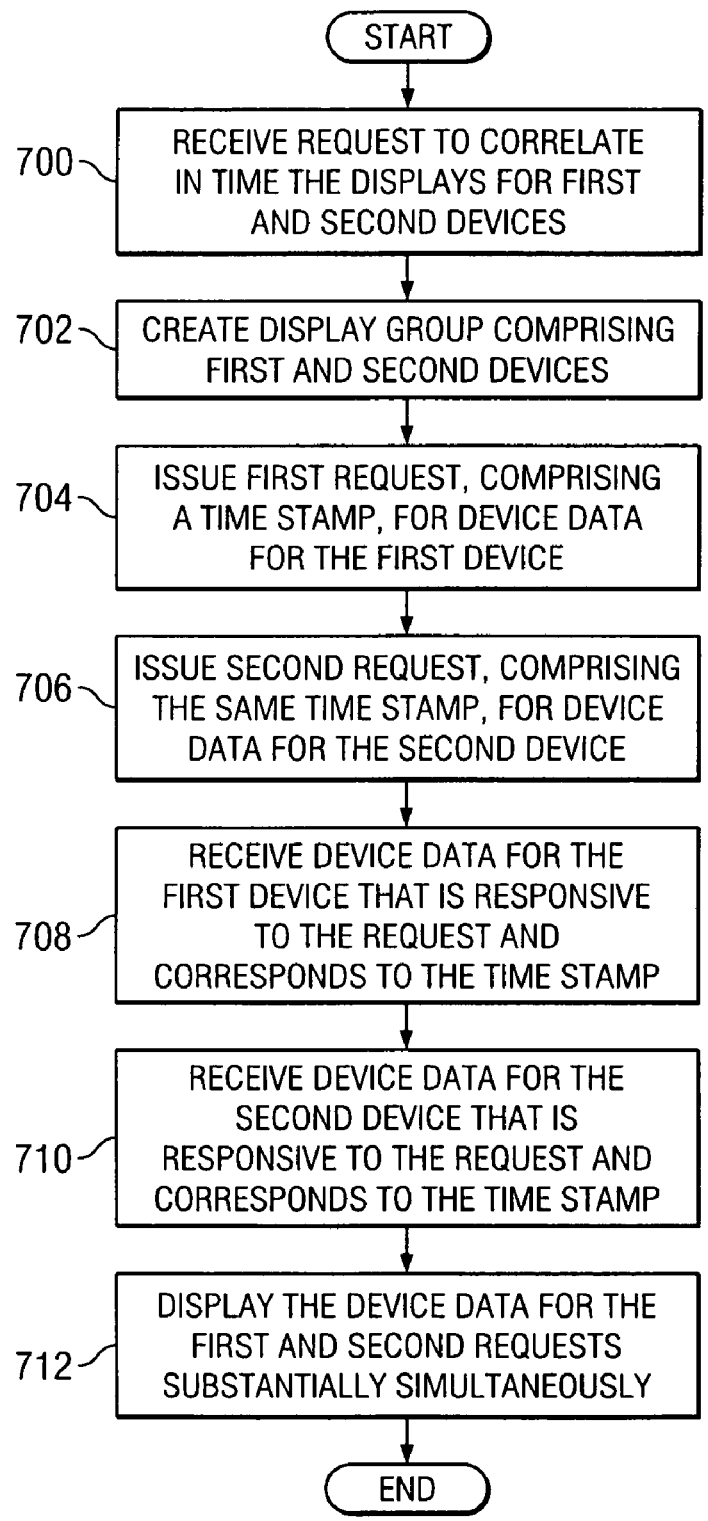
FIG. 20 illustrates an example method for correlating in time the displays at client system of device data for two or more devices.

FIG. 20 illustrates an example method for correlating in time the displays at client system 12 of device data for two or more devices 24. For example, client application 70 may display at client system 12 device data for each of a plurality of devices 24 each located at one or more of premises 16. The displays may each be provided in a corresponding window, such as windows 256 illustrated in FIG. 8. The device data for each device 24 may be displayed in a separate window on client system 12. A user may be able to correlate in time the displays of each device data. Although the example method described with respect to FIG. 20 involves correlating in time two displays of device data, the present invention contemplates correlating in time any number of displays of device data.

At step 700, client application 70 receives a request from a user of client system 12 to correlate in time first and second displays each corresponding to device data for first and second devices. For example, a user may submit a request to create a display group for the first and second devices. As another example, the first display may already be a member of a device group and the user may submit a request to add the second display to the display group of the first display. In certain embodiments, the user may right-click on the first or second display and make the request to correlate the two displays from a list of options.

At step 702, client application 70 creates a display group that includes the first and second displays. The manner in which client application creates the display group may depend on the request made by the user. For example, client application 70 may create a new display group for the first and second displays. As another example, client application 70 may add the first display to a current display group of the second display. As another example, client application 70 may add the second display to a current display group of the first display.

At step 704, client application 70 communicates a request for the first display, the request corresponding to a device 24 associated with the device data displayed in the first display and the request including a time stamp. For example, if the first display includes video data for a particular video device 26 at premises 16a, then a request may be communicated to premises 16a for video data corresponding to the time stamp and associated with particular video device 26. At step 706, client application 70 communicates request for the second display, the request corresponding to a device 24 associated with device data displayed in the second display and the request including the same time stamp as the time stamp included in the first request communicated at step 704. In certain embodiments, the one or more first and second requests communicated at steps 704 and 706 are communicated substantially simultaneously. Additionally, although the requests are described as being for displays that include device data associated with a single device 24, the present contemplates a display showing device data for multiple devices 24 (each at the same or different premises 16), and a request being communicated for device data associated with each of the devices 24 and each including the same time stamp.

At step 708, client system 12 receives the device data responsive to the first request, the device data being associated with the time stamp included in the request. At step 710, client system 12 receives the device data responsive to the second request, the device data being associated with the time stamp included in the request. At step 712, client application 70 may display the received device data responsive to the first request in the first display and the received device data responsive to the second request in the second display substantially simultaneously. In certain embodiments, using the above-described method may allow the first and second displays to be substantially correlated in time such that the device data displayed in the first display corresponds to the same time as the device data displayed in the second display.

While the steps of the example method described with reference to FIG. 20 are described in a particular order, the present invention contemplates the steps of the method being performed in any suitable order and substantially simultaneously, according to particular needs.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for remotely monitoring, controlling, and managing one or more remote premises, comprising:
   a server system operable to communicate with one or more remote client systems, the client systems being remote from the one or more premises;
   a database system associated with the server system and operable to store configuration information for a plurality of devices located at a remote premises, the plurality of devices comprising one or more camera devices and one or more facility management devices;
   the server system operable to:
      receive from the one or more premises device data for the one or more facility management devices located at the remote premises;
      initiate storage of at least a portion of the received device data in the database system; and
      communicate, in response to a request received from a particular one of the one or more remote client systems for device data for at least one facility management device, stored device data for the at least one facility management device responsive to the request to the particular client system.

2. The system of claim 1, wherein the server system is further operable to:
   receive, from the particular client system, a request to issue a command to a particular device at a particular premises, the command specifying an activity to perform with respect to one or more of the devices located at the particular premises; and
   communicate the command to a computer system at the particular premises, the computer system operable to execute the command by performing the activity with respect to the one or more devices.

3. The system of claim 1, wherein:

the database system is further operable to store a schedule specifying one or more times when a command should be communicated to a computer system at the particular premises, the command specifying an activity to perform with respect to one or more devices located at the particular premises and having been configured by a user of the particular client system; and the server system is further operable to communicate the command at the one or more times specified in the schedule to the computer system at the particular premises, the computer system operable to execute the command by performing the activity with respect to the one or more devices.

4. The system of claim 1, wherein:

the database system is further operable to store:

one or more media files associated with a particular premises; and a schedule specifying one or more times when a particular one of the media files should be played at the particular premises, the schedule having been configured by a user of the particular client system; and the server system is further operable to:

communicate the one or more media files to a computer system at the particular premises; and communicate to the computer system at the particular premises a command to play the particular media file at the one or more times.

5. The system of claim 1, wherein:

the database system is further operable to store configuration information for each of a plurality of alerts, each alert being associated with one or more of the devices located at the particular premises, the configuration information for each alert specifying an action to be performed by the server system in response to receiving a notification from a computer system at the particular premises that the alert has been triggered; and the server system is further operable to, in response to receiving a notification from the computer system at the particular premises that a particular alert has been triggered:

access the database system to determine the action to be performed in response to receiving the notification; and execute the action to be performed in response to receiving the notification.

6. The system of claim 5, wherein the action to be performed comprises one or more of:

communicating a notification that the particular alert has been triggered, the configuration information for the particular alert specifying a recipient for the notification; and communicating a command to a computer system at the particular premises, the command specifying an activity to perform with respect to one or more devices located at the particular premises, the computer system operable to execute the command by performing the activity with respect to the one or more devices.

7. The system of claim 1, wherein:

a particular one of the plurality of devices located at the particular premises comprises a point-of-sale (POS) device; and the server system is further operable to:

receive from a computer system at the particular premises POS data generated by the POS device; and store the received POS data in the database system.

8. The system of claim 7, wherein the server system is further operable to:

receive a request from the particular client system for POS data matching one or more parameters;

access the database system to retrieve POS data matching the one or more parameters; and communicate the POS data matching the one or more parameters to the particular client system.

9. The system of claim 1, wherein the one or more facility management devices each comprise one or more of:

a temperature sensor;

a chemical sensor;

a motion sensor;

a pressure sensor;

an input switch; and an output switch.

10. A method for remotely monitoring, controlling, and managing one or more remote premises, comprising:

storing configuration information for a plurality of devices located at a remote premises, the plurality of devices comprising one or more camera devices and one or more facility management devices;

receiving from the one or more premises device data for the one or more facility management devices located at the remote premises;

initiating storage of at least a portion of the received device data in the database system;

communicating, in response to a request received from a remote client system for device data for at least one facility management device, stored device data for the at least one facility management device responsive to the request to the client system, the client systems being remote from the one or more premises.

11. The method of claim 10, further comprising:

receiving, from the client system, a request to issue a command to a particular device at a particular premises, the command specifying an activity to perform with respect to one or more of the devices located at the particular premises; and communicating the command to a computer system at the particular premises, the computer system operable to execute the command by performing the activity with respect to the one or more devices.

12. The method of claim 10, further comprising:

storing a schedule specifying one or more times when a command should be communicated to a computer system at the particular premises, the command specifying an activity to perform with respect to one or more devices located at the particular premises and having been configured by a user of the client system; and communicating the command at the one or more times specified in the schedule to the computer system at the particular premises, the computer system operable to execute the command by performing the activity with respect to the one or more devices.

13. The method of claim 10, further comprising:

storing one or more media files associated with a particular premises; and storing a schedule specifying one or more times when a particular one of the media files should be played at the particular premises, the schedule having been configured by a user of the client system;

communicating the one or more media files to a computer system at the particular premises; and communicating to the computer system at the particular premises a command to play the particular media file at the one or more times.

14. The method of claim 10, further comprising:
  storing configuration information for each of a plurality of alerts, each alert being associated with one or more of the devices located at the particular premises, the configuration information for each alert specifying an action to be performed in response to receiving a notification from a computer system at the particular premises that the alert has been triggered; and
  in response to receiving a notification from the computer system at the particular premises that a particular alert has been triggered:
    determining the action to be performed in response to receiving the notification by accessing the stored configuration information; and
    executing the action to be performed in response to receiving the notification.

15. The method of claim 14, wherein the action to be performed comprises one or more of:
  communicating a notification that the particular alert has been triggered, the configuration information for the particular alert specifying a recipient for the notification; and
  communicating a command to a computer system at the particular premises, the command specifying an activity to perform with respect to one or more devices located at the particular premises, the computer system operable to execute the command by performing the activity with respect to the one or more devices.

16. The method of claim 10, wherein:
  a particular one of the plurality of devices located at the particular premises comprises a point-of-sale (POS) device; and
  the method further comprises:
    receiving from a computer system at the particular premises POS data generated by the POS device; and
    storing the received POS data.

17. The method of claim 16, wherein the method further comprises:
  receiving a request from the client system for POS data matching one or more parameters;
  retrieving POS data matching the one or more parameters; and
  communicating the POS data matching the one or more parameters to the client system.

18. The method of claim 10, wherein the one or more facility management devices each comprise one or more of:
  a temperature sensor;
  a chemical sensor;
  a motion sensor;
  a pressure sensor;
  an input switch; and
  an output switch.

19. A system for monitoring, controlling, and managing a premises, comprising:
  a computer system located at the premises and operable to communicate with a remote client computer and a remote server system;
  a plurality of devices located at the premises and comprising one or more camera devices and a plurality of facility management devices;
  the computer system operable to:
    poll one or more of the facility management devices at predetermined times to obtain device data associated with the facility management devices;
    communicate at least a portion of the obtained device data to the remote server system;
    collect video data corresponding to video images captured by the one or more camera devices;
    store at least a portion of the collected video data in a memory associated with the computer system; and
    in response to a request from the remote client system, communicate video data responsive to the request to the remote client system.

20. The system of claim 19, wherein:
  at least one of the facility management devices comprises a sensor;
  the device data obtained from the sensor comprises sensor data; and
  the computer system is operable to communicate the sensor data obtained from the sensor to the remote server system for storage at the remote server system at one or more predetermined times.

21. The system of claim 19, wherein:
  at least one of the facility management devices comprises an input switch having a state;
  the device data obtained from the input switch comprises the state of the input switch; and
  the computer system is operable to communicate the state of the input switch to the remote server system at one or more predetermined times.

22. The system of claim 19, wherein:
  at least one facility management device comprises an output switch operable to receive a command to affect a state of the output switch and to change its state in response to the command; and
  the computer system is operable to, in response to receiving a command from the remote server system, the command indicating that the state of the output switch should be changed, change the state of the output switch.

23. The system of claim 19, wherein:
  a particular one of the plurality of devices located at the premises comprises a point-of-sale (POS) device, the POS device operable to generate POS data associated with the premises, the POS data comprising one or more transactions; and
  the computer system is further operable to:
    receive the POS data from the POS device;
    parse the POS data to determine the one or more transactions; and
    communicate at least a portion of the POS data to the remote server system.

24. The system of claim 23, wherein the computer system is operable to:
  receive from the remote client system a request to receive POS data associated with the POS device in substantially real time; and
  communicate the portion of the POS data to the remote client system in substantially real time.

25. The system of claim 19, wherein the computer system located at the premises is operable to:
  collect the video data from a particular one of the one or more video cameras, the video data comprising one or more images captured by the particular video camera;
  associate each collected video image with a time stamp;
  determine whether to store each video image in a memory associated with the computer system located at the premises;
  if the computer system determines that a collected video image should be stored, store the video image and its associated time stamp in the memory; and
  if the computer system determines that a collected video image should not be stored, store the time stamp associated with the video image in the memory.

26. The system of claim 25, wherein the computer system located at the premises is operable to:
- receive a request from the remote client computer, the request being a request to receive video data from the particular camera device in substantially real time; and after receiving the request:
  - if the computer system determines that a video image should be stored, communicate the video image and its associated time stamp to the client computer; and
  - if the computer system determines that a video image should not be stored, communicate time stamp associated with the video image to the client computer.

27. The system of claim 25, wherein the computer system located at the premises is operable to:
- receive a request from the remote client computer to download video data collected by the computer system from the particular video camera, the request specifying a start time and an end time;
- determine which of the stored video images and stored time stamps should be communicated to the client computer based at least on the start time and the end time specified in the request;
- communicate the determined video images and their associated time stamp and the stored time stamps to the client system.

28. The system of claim 19, wherein the computer system located at the premises is further operable to:
- store in a memory associated with the computer system one or more alerts;
- determine whether any of the one or more alerts have been triggered;
- if it is determined that an alert has been triggered, communicate an alert notification to the remote server system, the notification comprising an identification of the triggered alert.

29. The system of claim 19, wherein the computer system located at the premises is further operable to:
- receive from the remote server system a command to play a media file; and
- initiate playback of the media file.

30. Software for monitoring, controlling, and managing one or more remote premises, each remote premises comprising a plurality of devices, the software embodied in a computer-readable storage medium and when executed operable to:
- communicate to a remote server system requests for device data associated with one or more facility management devices located at a first one of the one or more remote premises, the remote server system being remote from the one or more premises;
- receive from the remote server system device data responsive to the request;
- display the device data in a first window associated with a client system that is remote from the one or more premises and from the server system;
- communicate to a computer system located at a second one of the one or more remote premises requests for device data associated with one or more video devices located at the second remote premises, the device data comprising video data;
- receive from the computer system located at the second one of the one or more remote premises video data responsive to the request; and
- display one or more video images of the video data in a second window associated with the client system.

31. The software of claim 30, wherein:
- the device data displayed in the first window is associated with a first time stamp;
- the video data displayed in the second window is associated with a second time stamp; and
- the software is further operable to correlate in time the display of the device data displayed in the first window and the display of the video data displayed in the second window such that the time stamp associated with the device data displayed in the first window is substantially the same as the time stamp associated with the video data displayed in the second window.

32. The software of claim 31, wherein the first and second remote premises are remote from one another.

33. The software of claim 30, wherein the first and second premises comprise the same premises.

34. The software of claim 30, further operable to communicate to the remote server system a request for point-of-sale (POS) data associated with a POS device located at the second remote premises.

35. The software of claim 34, wherein:
- the request for POS data comprises a request to view POS data in substantially real time; and
- the software is further operable to receive POS data responsive to the request for POS data in substantially real time from the second remote premises.

36. The software of claim 34, wherein:
- the request for POS data comprises a request to view POS data stored at the remote server system, the POS data stored at the remote server system comprising historical POS data associated with one or more of the remote premises; and
- the software is further operable to receive POS data responsive to the request for POS data from the remote server system.

37. The software of claim 30, further operable to display a plurality of windows on a display of the client system, each window displaying one or more of:
- facility management device data associated with the first remote premises;
- POS data associated with the second remote premises; and
- video data associated with the third remote premises.

38. The software of claim 30, further operable to communicate configuration information to the remote server system, the configuration information specifying one or more configurations for a device associated with one of the remote premises.

39. The software of claim 30, further operable to:
- communicate a media file to the remote server system, the media file associated with at least one of the remote premises;
- communicate to the remote server system scheduling information specifying when the media file should be played at the at least one remote premises.

40. The software of claim 30, wherein:
- a device located at a particular remote premises comprises an output switch; and
- the software is further operable to communicate a command to the particular remote server system, the command specifying an operation to be performed with respect to the output device located at the particular remote premises.

41. The software of claim 30, further operable to:
- communicate a request to a the first premises to download video data collected by the computer system from a video camera at the first premises, the request specifying a start time and an end time;
- receive from the first premises a plurality of video images responsive to the request, the plurality of video images having been collected and stored by the premises, each video image having an associated time stamp.

* * * * *